US005751852A

United States Patent [19]
Marimont et al.

[11] Patent Number: 5,751,852
[45] Date of Patent: May 12, 1998

[54] IMAGE STRUCTURE MAP DATA STRUCTURE FOR SPATIALLY INDEXING AN IMGAGE

[75] Inventors: David H. Marimont; Leonidas John Guibas, both of Palo Alto, Calif.

[73] Assignee: Xerox Corporation, Stamford, Conn.

[21] Appl. No.: 639,606

[22] Filed: Apr. 29, 1996

[51] Int. Cl.[6] .................................................. G06K 9/00
[52] U.S. Cl. ........................................ 382/180; 382/203
[58] Field of Search ............................. 382/100, 101, 382/102, 108, 112, 113, 135, 137, 138, 159, 164, 165, 170, 171, 173, 176, 180, 181, 190, 191, 192, 193, 194, 195, 197, 198, 199, 201, 202, 203, 204, 205, 207, 208, 209, 224, 227, 228, 232, 241, 242, 243, 266, 282, 283, 284, 285, 286, 291, 293, 305, 306, 308, 309, 312

[56] References Cited

U.S. PATENT DOCUMENTS

| | | | |
|---|---|---|---|
| 4,490,848 | 12/1984 | Beall et al. | 382/121 |
| 4,631,690 | 12/1986 | Corthout et al. | 364/518 |
| 4,914,605 | 4/1990 | Loughmiller, Jr. et al. | 364/518 |
| 5,226,175 | 7/1993 | Deutsch et al. | 395/119 |
| 5,416,890 | 5/1995 | Beretta | 395/131 |
| 5,440,652 | 8/1995 | Ting | 382/165 |
| 5,485,568 | 1/1996 | Venable et al. | 395/155 |
| 5,499,322 | 3/1996 | Thirion et al. | 395/118 |
| 5,546,107 | 8/1996 | Deretsky et al. | 395/600 |
| 5,583,953 | 12/1996 | Harrington | 382/239 |

OTHER PUBLICATIONS

M. Kocher and M. Kunt, "Image data compression by contour texture modeling" in *Applications of Digital Image Processing*, Andre Oosterlink, Andrew G. Tescher, Eds., Proceedings of the SPIE, 1983, pp. 132–139.

Paul J. Besl and Ramesh C. Jain, "Segmentation Through Variable-Order Surface Fitting," in *IEEE Transactions on Pattern Analysis and Machine Intelligence*, vol. 10, No. 2, pp. 167–192, 1988.

Nahed, A., and Peroche, B., "A 21/2-D Hierarchical model based on planar maps", *Computer & Graphics*, vol. 20, No. 1, Jan./Feb. 1996 pp. 115–123.

Ketan Mulmuley, *Computational Geometry: An Introduction Through Randomized Algorithms*, Prentice-Hall, 1984, ch. 2, pp. 29–35, 52–55, 58–66, and 78–96; ch. 3, pp. 111–114 and 117–119; ch. 4, pp. 126–135, 140–149, and 162–167; and ch. 5, pp. 192–210.

(List continued on next page.)

*Primary Examiner*—Leo Boudreau
*Assistant Examiner*—Bijan Tadayon

[57] ABSTRACT

A data structure representation of an original image called an image structure map (ISM) accurately, compactly and explicitly represents the geometry, topology and signal properties of regions in an original image. In mathematical terms, the ISM is a partition of the original image induced by a set of image region boundaries. The ISM data structure includes, for each region in the original image, a region data item that indicates the region boundary data items that form the region and a signal property descriptor indicating the value of signals computed for or assigned to the region. Region boundary data items represent image region boundaries that are determined to occur in the original image as a result of analyzing signal properties of original image locations. Vertices (endpoints and intersections) of region boundary data items are represented in the ISM in machine representable values that result from modifying infinite precision vertex values using a rounding operation that mathematically ensures topological and geometric consistency with the original image. The image structure map includes a spatial image indexing data structure in the form of hierarchy of partitions of the original image of varying levels of detail that allows for efficient point location. An illustrated implementation of the data structure has the form of a vertical cell decomposition. The ISM may be implemented to permit dynamic modifications so that changes to regions resulting from the insertion or deletion of new or changed region boundaries may be made without recomputing the entire ISM.

33 Claims, 24 Drawing Sheets

OTHER PUBLICATIONS

Adobe Photoshop™ 2.5 for Macintosh, *User Guide and Tutorial*, pp. 15–29 and pp. 79–86; Adobe Systems Incorporated, Mountain View, California, 1993.

Colorize 2.0™ (DS Design Inc. of Cary, North Carolina), software product review in *MacWEEK*, p. 30, Jul., 24, 1995.

G. Koepfler, C. Lopez and J.M. Morel, "A Multiscale Algorithm for Image Segmentation by Variational Method," *Journal of Numerical Analysis of the Society of Industrial and Applied Mathmatics*, vol. 31, No. 1, Feb. 1994, pp. 282–299.

L. Guibas and D. Marimont, "Rounding Arrangements Dynamically," *Proceedings of the 11th ACM Symposium on Computational Geometry (SCG '95)*, Vancouver, B.C., Jun., 1995, no page number.

Daniel H. Greene and Frances F. Yao, "Finite–Resolution Computational Geometry,"*Proc. 27th Ann. Symp. on Foundations of Computer Science*, 1986, pp. 143–152.

Ketan Mulmuley, in "A fast planar partition algorithm I", *Journal of Symbolic Computation*, v. 10, 1990, pp. 253–280.

Ketan Mulmuley, "Randomized Multidimensional Search Trees: Dynamic Sampling," *Proceedings of the 7th ACM Symposium on Computational Geometry (SCG,)*1991, pp. 121–131.

H. Edelsbrunner, L. Guibas, J. Pach, R. Pollack, R. Seidel and M. Sharir, "Arrangements of Curves in the Plane–Topology, Combinatorics, and Algorithms", *Theoretical Computer Science* 92 (1992), pp. 319–336.

M. Gangnet, J–C Hervé, T. Pudet and J–M Van Thong, "Incremental Computation of Planar Maps," *Computer Graphics (SIGGRAPH '89)*, vol. 23, No. 3, 1989, pp. 345–354.

Malik, Jitendra, "Interpreting line drawings of curved objects" *International Journal of Computer Vision*, vol. 1, No. 1, pp. 73–103, 1987.

P. Vaxivière et al., "Celesstin: CAD Conversion of Mechanical Drawings," *IEEE Computer*, vol. 25, No. 7, Jul. 1992, pp. 46–54.

L. Boatto, et al., in "An Interpretation System for Land Register Maps," *IEEE Computer*, vol. 25, No. 7, Jul. 1992, pp. 25–33.

*Adobe Streamline 3.0 User's Manual*, Adobe Systems Incorporated, Oct. 1993, Chapters 1, 2, 4, and 5, and p. 62, no author.

M. Garland and P. Heckbert, "Fast Polygonal Approximation of Terrains and Height Fields,"*CMU Technical Report No. CMU–CS–95–181*, Carnegie Mellon University, Pittsburgh, PA, Sep., 1995.

L. de Floriani and E. Puppo, "Hierarchical Triangulation for Multiresolution Surface Description," *ACM Transactions on Graphics*, vol. 14, No. 4, Oct. 1995, pp. 363–411.

IMAGE STRUCTURE MAP DATA STRUCTURE FOR SPATIALLY INDEXING AN IMGAGE

CROSS REFERENCE TO RELATED APPLICATIONS

The present invention is related to inventions that are the subject matter of previously filed, commonly assigned U.S. patent applications having the same inventors as the subject application and having the following serial numbers and titles: Ser. No. 08/581,660, "User-Directed Interaction with an Image Structure Map Representation of an Image"; and Ser. No. 08/581,669, "Dynamic Computation of a Line Segment Arrangement Using Finite Precision Arithmetic." Each of these applications is hereby incorporated by reference herein as if set out in full.

BACKGROUND OF THE INVENTION

The present invention relates generally to a processor-based technique in the field of image understanding and representation, and more particularly, to a data structure representation of an original image that accurately captures geometric, topological and signal information about regions in the image to produce a compact, robust and resolution-independent image representation that permits efficient spatially indexing of the original image.

An image communicates information to a human viewer about objects, their spatial relationships (i.e., geometric and topological relationships), and the colors of their surfaces that the viewer is able to quickly and accurately recognize and understand because a human viewer of an image is typically able to compute geometric and topological information from the image robustly and efficiently. Representations of images in processor-controlled machines take on a variety of forms. One very common form is what is generally referred to as a raster image or pixel map, in which an image is represented as a two-dimensional array of image locations, each location indicating a color. Raster image representations do not explicitly represent the geometric and topological information contained in an image that a human viewer of the image is able to immediately comprehend. Providing a human viewer of an image with the ability to meaningful interact with an image stored in a processor-controlled machine may require explicitly capturing geometric and topological information from the image in a data structure representation of the image.

Image processing operations performed on a raster image representation are typically able to provide data from which it is possible to infer some information about the topology or geometry of the structures included in the image. This information in turn may permit an image in its raster form to be interactively edited or otherwise manipulated by a user. An example of such an application is Adobe Photoshop™ available from Adobe Systems Incorporated, of Mountain View, Calif. This application provides a variety of image interaction tools for editing raster images and permits a user to make selections of image areas, to adjust colors and to create complex image effects.

The image processing operations performed on an image in such applications, however, typically do not provide the degree of robust and efficient computation of geometric and topological information about an image that is comparable to the capabilities of a human viewer of the image. Image interaction tools provided with applications such as Adobe Photoshop™, for example, are typically implemented as pixel-based operations; that is, the tools operate directly on a data structure that explicitly represents little or no structural information about the objects in the image, their spatial relationships, or their colors or textures. This approach shifts the entire burden of computing the geometric and topological information in an image from the computer application to the human user, who must visually interpret the image and make object selections with the degree of precision required for the purpose.

The widespread use of, and need to interact with, images in computer-implemented applications has motivated efforts to develop alternative data structure representations of images. For example, Colorize 2.0™ available from DS Design Inc. of Cary, N.C. is an interactive image application that permits a user to color a displayed black and white image that has been scanned from an original black and white image. The application displays the black and white image in the display area of a display device, and the user is then able to apply color to areas of the image using brush and paint-to-edge tools. The application has the capability to keep color within broken lines, and includes an Erase Fragment tool, which uses an edge detection capability to permit a user to erase a particular shape in the displayed image. These features suggest that this colorizing tool creates a higher level representation of the image being colored and this higher level representation permits interactive editing by a user.

Adobe Streamline 3.0™, also available from Adobe Systems Incorporated, of Mountain View, California, is a computer graphics tool that converts raster images into high-quality PostScript™ language images. The software tool can be used to convert black-and-white line art, as well as color or grayscale images, including color photographic images, from the PostScript™ language image format into different line art formats such as Adobe Illustrator™, Aldus Freehand®, PICT or DFX; images can be acquired directly from a scanner and imported into Adobe Streamline™, saving a user the work of copying or tracing the image by hand. Because the file size of an image converted into its output format using Streamline™ is much smaller than the image in its raster form, the Streamline™ image is a convenient format to use for archiving and printing. Editing functions are also provided by the Streamline™ software which permit a few basic editing operations; for more complex editing functions, PostScript language artwork can be copied and pasted between the Streamline™ application and other compatible Adobe image editing tools. The PostScript™ language image format provides an inclusion tree of image contours indicating differences in image color intensity and gives a containment relationship between the contours, analogous to a topological map of a land surface. A significant disadvantage of this category of image tools is the lack of support by the data structure for a full range of dynamic editing operations.

Another common category of higher level image representations is a vector representation of an image. A vector representation most typically is simply a list of the positions of line segments in the image, and is most commonly produced from a line drawing image such as an illustration, an engineering drawing or a map. These line segments are either manually provided or automatically determined by an image analysis operation. A vector representation of an image will usually not indicate the positional or geometric relationships among the line segments.

Still another category of higher level image representations is an image "partition" which represents the spatial relationship of disjoint (nonoverlapping) structures in the image called regions. A partition data structure of an image indicates data describing both the geometric and the topological properties of a set of region boundaries (e.g., edges) that occur in the image. The geometric properties include the positions of the region boundaries in the image, typically specified by their endpoints (also called vertices), and the geometric definition of the region boundaries; the topological information indicates the incidence and adjacency of the vertices, region boundaries and regions that comprise the partition.

Partition data structures of images can vary widely in both the types of image operations they support and the amount of information they include about the image structures in the image. The particular organization of a partition data structure representing an image is designed to support the operations that are performed on the image by the application that uses the data structure. A partition data structure representing an image may be characterized by several properties including whether the partition is static or dynamic, and whether its image representation provides a mechanism for efficient spatial indexing of image structures in the partition that represent locations in the image.

A partition that is static is produced only for a given set of region boundaries that is known a priori. In order to add a region boundary to or to delete a region boundary from the partition, the entire partition must be reconstructed for each addition or deletion. In contrast, a dynamic partition allows for region boundaries to be added to and deleted from the partition one at a time, without the need for such reconstruction. Thus, a dynamic partition may be built for a single region boundary, and then updated with added or deleted region boundaries, with no requirement to know the locations of the entire set of region boundaries a priori. From an efficiency perspective, a dynamic partition is more likely to effectively support interactive image editing operations; a static partition may be suitable for image operations that do not involve image interaction.

Efficient spatial indexing is also required to effectively support interactive image editing operations. The term "indexing" as used herein as it applies to an image is the operation of locating in the partition of the image an image structure that contains a selected point in the original image. Image indexing may also be referred to as simply point location. Spatial indexing is an operation that is essential to an insertion operation, and to dynamic operations such as image editing. For many applications, a partition data structure must support such an operation efficiently.

Still another characteristic of a partition data structure is its robustness; that is, whether image locations are accurately represented in the data structure. Algorithms that construct partitions may use an infinite precision or a finite precision model of computer arithmetic when operating on image locations; using an infinite precision model produces image locations that may be inaccurate as a result of rounding errors which in turn results in a partition that is not topologically consistent with respect to the positions of and intersections among original region boundaries in the original image. For example, repeated rounding of the location of an intersection of two region boundaries that results from finite precision computations could produce a representation of the location of the intersection in the partition data structure that is unacceptably distant from the actual location of the intersection of the original region boundaries.

Examples of data structures that include geometric and topological image information can be found in several technical domains. L. Boatto, et al., in "An Interpretation System for Land Register Maps," *IEEE Computer*, Vol. 25, No. 7, July 1992, pp. 25–33 discloses a system that converts paper-based documents containing land register maps into digital form for integration into an existing data base. The digital representations of the land maps are used to produce automatic interpretations and descriptions of the semantic entities in the maps such as parcels, streets and bodies of water. After digitizing a map by a scanning device, the raster format image is converted to a graph representation that decomposes line-like structures in the land map into edges and nodes. During graph construction, the binary image is analyzed into connected sets of foreground pixels, each corresponding to a graph edge or a graph node, where the terms edge and node are used to mean the image pieces associated with the graph elements. After vectorization and symbol recognition processes are performed, a high level entity recognition process uses the vector graph representation of the image to recognize the high-level entities in the maps (e.g., the parcels, streets and bodies of water). Because automatic interpretation of the maps must produce no errors, an operator has complete supervision over all decisions made by the system. For example, Boatto et al. disclose that the process for recognition of higher level image entities appears to allow for operator interaction with the recognition process, presumably to correct entity recognition errors; it is not clear from the disclosure that there is operator interaction with the land map image itself, and so it is not clear that the data structure representation of a map supports dynamic interaction.

P Vaxivière et al., in "Celesstin: CAD Conversion of Mechanical Drawings," *IEEE Computer*, Vol. 25, No 7, July 1992, pp. 46–54, discloses a system that converts a mechanical engineering drawing into a format suitable for CAD (computer aided design) operations. The system emphasizes the recognition of technical entities such as screws, bearings, and gearboxes. Vaxivière et al. disclose a vectorization process that converts a raster image into a set of line segments of given thicknesses and intersections at line segment junction points. An interactive tool lets the user correct misinterpreted lines or change line attributes. A block analysis operation analyzes the vector data structure for basic elements called blocks, each of which is a minimum closed polygon made of thick lines, and produces a new complete description of the drawing as a set of blocks characterized by their technical attributes. A recognition process then uses blocks as its basic elements and combines them into more elaborate components to which it can give semantic labels. Vaxivière et al. disclose that its implementation of vectorization is probably less robust and efficient than vectorization facilities provided by commercial systems, implying that user correction of the results of the vectorization may involve a significant amount of time. It is also not clear from the disclosure that the data structure describing the block structure of the image supports dynamic editing operations.

M. Gangnet, J-C Hervé, T. Pudet and J-M Van Thong, in "Incremental Computation of Planar Maps," *Computer Graphics (SIGGRAPH '89)*, Vol. 23, No. 3, 1989, pp. 345–354, disclose the use of a planar map to represent a partition of curves in a plane. A planar map is defined as a figure formed by a set of intersecting lines and curves that captures both the geometrical and topological information implicitly defined by the data. The interest in planar maps is motivated by the practical concerns of computer-implemented graphic design and the need to interactively create and edit design images using 2D drawing software. They further disclose a data structure and algorithms for incremental insertion of new curves in the planar map, dynamically computing new intersections and updating the data structure using a finite precision implementation of a curve insertion algorithm. The planar map data structure disclosed by Gangnet et al. uses an inclusion tree as its spatial indexing mechanism and represents image regions as having irregular shapes. These features do not support an efficient spatial indexing mechanism for locating image structures in the planar map.

G. Koepfler, C. Lopez and J.M. Morel, in "A Multiscale Algorithm for Image Segmentation by Variational Method," *Journal of Numerical Analysis of the Society of Industrial and Applied Mathematics*, Vol. 31, No. 1, February 1994, pp. 282–299, disclose a fast and universal image segmentation algorithm that produces a hierarchy of image segmentations from fine to coarse scales. The algorithm computes a segmentation that is a partition of a rectangular image domain into a finite set of regions, each of which corresponds to a part of the image where a function g of the image is as constant as possible; the algorithm explicitly computes the region boundaries. The partition disclosed by Koepfler et al. has several disadvantages: It appears to support only region boundary deletion operations, which effectively result in region merging; such partitions are referred to as being semidynamic. There also does not appear to be any specific spatial indexing mechanism for supporting a point location operation. Moreover, even if point location were supported, the partition includes arbitrarily complicated and irregularly shaped regions which adversely affects search time when performing such an operation.

M. Garland and P. Heckbert, in "Fast Polygonal Approximation of Terrains and Height Fields," *Carnegie Mellon University Technical Report CMU-CS-95-181*, Carnegie Mellon University, Pittsburg, Pa., September, 1995, disclose a class of algorithms that take a height field as input, and approximate it with a mesh of triangles known as a triangulated irregular network (TIN). A triangulation is a partition in which each region has the standard shape of a triangle. A height field is a set of height samples over a planar domain. One common type of height field is referred to as terrain data, and is used in various computer graphics applications for flight and ground vehicle simulators, and in entertainment applications. An image having signals representing terrain data represents a rectangular section of terrain, and each pixel represents the height of the terrain at the pixel's x,y location. Several algorithms are disclosed and compared; each algorithm builds the triangulation incrementally by successively inserting vertices to create new triangles over multiple passes. Applications of the algorithm include fast rendering of terrain data for flight simulation using the triangulation, and the fitting of surfaces to range data in computer vision. FIGS. 7–10 at pp. 23–24 show the results of producing a triangulation of a digital elevation map (DEM), and FIGS. 24–26 at pg. 37 show the results of applying one of the algorithms to color image data. The algorithm produces a single-level data structure and so does not appear to be designed for efficient spatial indexing (e.g., point location) of the original image that is represented by the triangulation.

Higher level image representations facilitate image understanding and image manipulation tasks, and provide a bridge between the worlds of paper and digital images. The disadvantage of the image representations discussed above, and of other existing higher level image representations as well, is their inability to guarantee a robust, topologically consistent representation of the image while at the same time efficiently supporting dynamic image interaction operations, including efficient spatial indexing of the image being represented.

SUMMARY OF THE INVENTION

The data structure of the present invention is called an image structure map and is based on several fundamental design criteria. The first is that a higher level data structure representation of an image, to be truly useful in supporting interactive image operations, must support dynamic updating operations; a second criterion requires that dynamic updating operations be supported efficiently. Thirdly, a higher level data structure representation of an image must represent the geometric and topological information in the image accurately and robustly. The data structure of the present invention meets all of these design criteria and achieves the following results: computing the data structure from an image is efficient; the data structure is compact; computing information from the data structure is efficient; and the information computed from the data structure is accurate.

Computing the image structure map representation from an image is efficient because the image structure map is dynamically produced using a dynamic, incremental planar partition algorithm that partitions the image into regions according to a function of a smoothly varying property of the region as defined by input image region boundary data. The incremental nature of the operation that produces the image structure map means that the partition of the image into regions is built by adding one image region boundary at a time into the data structure; the dynamic nature of the operation that produces the image structure map means that the partition of the image is built without a priori knowledge of all the image region boundary data items that are eventually to be included in the partition, and that both the region structures as well as the signal property descriptors for the regions can be altered or edited at any time. Basic image interaction operations supported by the data structure of the present invention include insertion and deletion of image region boundaries, computation of and changes to signal properties of image regions, and queries about image structures. These basic operations may in turn be combined to accomplish more complex interactions. The data structure provides for much more powerful interaction with an image than is available to a user by merely manipulating the pixel data of the image.

Support of dynamic updating operations and other image interaction using the image structure map is efficient because the organization of the structures of the image in the image structure map facilitates efficient spatially indexing of the original image, thereby providing fast computation of original image information (e.g., point location) from the image structure map representation. Point location is the operation of determining the region data structure in the image structure map that contains a particular query point specified by its coordinates in the coordinate system of the original image. Support for an efficient point location operation is fundamental to region boundary insertion, which requires an efficient mechanism for tracking, through the image structures in the image structure map, the location of a region boundary that is to be inserted.

Spatial indexing is implemented in the present invention via three principles: the use of a partition to represent the topology of the image, the use of a specific type of partition of the image known as a trapezoidal decomposition, and an efficient indexing mechanism. A partition completely specifies the topology of the image; for any element of the partition, the data structure specifies all adjacent elements, either explicitly or in a manner that permits computing the order of these adjacent elements. Thus, every image structure in the image structure map knows what its neighboring structures are. Explicit representation of image topology is important to the support of efficient spatial indexing of the image.

The indexing mechanism is a critical component of efficient point location. An illustrated embodiment of the invention uses two or more partitions arranged in a hierarchy, starting with a very coarse one and ending with the full image structure map for the image. A bottom-level partition includes data structures collectively representing the most detailed partition of the original image; each intermediate level and the top level of the hierarchy include data structures collectively representing less detailed partitions of the original image than the bottom-level partition.

There are two key properties of such a hierarchy. Firstly, structures at successive levels are spatially closely related in a strong local sense. This means that once an image structure containing a given location is known at some level, an image structure containing the same given location can easily be located at the next finer level partition by at most a bounded local search in that next finer level. Secondly, the storage required by any given level of the hierarchy is smaller by some factor as compared to the next finer level. This second property guarantees both that the overall space needed by the hierarchy is comparable to the size of the most detailed partition, and that the hierarchy is shallow, i.e., it has a number of levels which is roughly logarithmic in the size of the full resolution structure. Point location is done by tracing a point through this hierarchy by starting at the coarsest level and proceeding successively to locate the same point at each finer level. The cost of going from one level to the next is small, because of the first property of the hierarchy structure. Since the second property of the hierarchy structure implies that the number of levels is only logarithmic, the search for the correct image structure will terminate quickly. This means that once an image structure containing a given location is known at some level, an image structure containing the same given location can easily be located at the next finer level partition by at most a bounded local search in that next finer level.

Representing image structures as a trapezoidal decomposition results in image regions being represented in the image structure map at two distinct levels. A region data structure indicates information that applies to and defines an entire image region, regardless of its shape. The region data structure, in turn, indicates subdivided areas of the region, each of which is referred to as a "bounded complexity region", or a cell. A bounded complexity region has a standardized geometric shape having a fixed or predetermined number of boundaries forming the geometric shape of the region, or cell. One way of implementing bounded complexity regions is to add structures called attachments to locations within an image region to divide the image region into cells when the image region has an irregular, nonstandard geometric shape. The representation of image regions in the image structure map as a collection of cells provides a predictable level of efficiency for performing a search operation such that searching for an intersection location of a line segment with a side of an image region is performed in a fixed amount of time per cell searched for the intersection location. The representation of image regions in the image structure map at two distinct levels, that of region and that of cell, provides for additional flexibility in querying and manipulating image structures. Image information computed from the image structure map representation, such as the locations of structures and their geometric and topological relationships to other structures, is accurate because the operation that builds the partition of the image insures that intersections and endpoints of image region boundaries have locations specified in machine representable numbers. Two important operations are needed to accomplish this: First, locations of the intersections and the endpoints of input region boundaries are rounded to representable points using a mathematically rigorous rounding operation. The rounding operation perturbs all vertices of the image partition to lie on representable points on an integer grid. One consequence of this perturbing is the breaking up of an original image boundary into pieces, called fragments. In order to ensure that the perturbed partition has a topology consistent with the original image, additional points on image boundaries in the partition are perturbed to the grid as well; the rounding operation specifies which points these are and to which representable points they should be perturbed. In the end, all vertices, edges, and faces of the resulting perturbed partition have exact representations with finite arithmetic. Secondly, the original locations of the input region boundaries are stored in the image structure map data structure to ensure that the rounded image region boundaries are topologically consistent with the original input region boundaries.

A feature of the image structure map that is critical to ensuring that it is topologically consistent with the image it represents during dynamic region boundary insertion operations is storage of the original unrounded image region boundaries in the data structure. During an insertion operation, intersection locations of the new image region boundaries with existing image region boundaries in the data structure are determined using data indicating previously inserted unround region boundaries rather then their rounded fragment counterparts. Using the unrounded region boundaries to determine intersection locations prevents the region boundaries from "drifting" to locations in the image structure map that are no longer topologically consistent with the location of the region boundary in the original image. Once the image structure map representation of an image has been dynamically created, if no further dynamic editing of the image or of the data structure is to take place, the unrounded image region boundaries may be removed from the data structure.

The image structure map representation is compact in comparison with an original image data structure because the image structure map represents a smoothly varying signal property of each image region in a very compact form, thus eliminating much redundancy in the image signal. When an image is characterized by having homogeneous regions with sharp boundaries, such as a full color image, an image structure map representation represents the color for an entire region of pixel locations with a single value or with a matrix of parameters. The advantages of a compact image representation are achieved without significant loss of image information content; because the image structure map makes the geometric and topological structure of an image explicit, an image rendered from the image structure map still conveys substantial information about the objects in the original image, their spatial relationships to each other, and the signal properties of their regions.

The image structure map of the present invention represents image regions in a separate region data structure that is, in turn, subdivided into cells having a standardized geometric shape. In contrast to partitions of images that represent regions exclusively as having a standard geometric shape, the present invention preserves a higher level region structure that, in many of the types of images suitable for representation as image structure maps, corresponds to an area of the image that is perceptually significant to a human viewer of the image. Thus, an object in an image that has an irregular shape that makes it perceptually identifiable to a human viewer of the object and that has a smoothly varying signal within that irregular shape, will be represented in the image structure map by a region data structure that indicates the irregular shape, but that is also further subdivided in the data structure into subregions having a standard geometric shape to facilitate dynamic operations on the data structure. Representation of these irregular shapes that occur in images that have perceptual significance to a user maintains a connection to a human viewer of the image, giving the image structure map data structure the flexibility to serve as both an efficient and compact image representation and as a mechanism for image interaction by a human user. Therefore, in accordance with one aspect of the present invention, there is provided a data structure stored on a storage medium capable of being accessed and read by a processor-controlled machine. The data structure, referred to as an image structure map, represents an original image definition data structure, referred to as an original image, that includes image regions each having a topology and a geometry with respect to neighboring image regions. A machine suitable for using the image structure map includes storage medium access circuitry for accessing and reading the image structure map data structure stored in the storage medium, and a processor connected for accessing instruction data for operating the machine. The image structure map data structure comprises a plurality of region data items each representing a respective one of a plurality of image regions determined to be included in the original image, and a signal property descriptor indicated by each region data item. The signal property descriptor has a value indicating a smoothly varying function of signals indicated by locations in the respective image region of the original image.

The image structure map data structure further comprises a plurality of region boundary data items indicated by each respective region data item indicating all adjacent image region boundaries forming the image region represented by the respective region data item, and a plurality of vertex data items each indicating a vertex location. A vertex location refers to an endpoint location of a respective one of the image region boundaries or an intersection location between two image region boundaries. Each vertex data item indicates all of the region boundary data items representing image region boundaries adjacent to its vertex location, and each has a machine representable value when stored in the image structure map. The machine representable value is computed by applying a rounding operation to an infinite precision value for the vertex location of the respective image region boundary and modifying the infinite precision value to produce the machine representable value, with the result that modifying the vertex location of an image region boundary produces a rounded image region boundary represented by the region boundary data item.

The region data items, the region boundary data items and the vertex data items collectively represent the original image in the image structure map data structure as a partition of a two-dimensional (2D) plane induced by the image region boundaries into one or more disjoint image regions tiling the 2D plane. The region data items, the region boundary data items and the vertex data items are arranged in the image structure map so as to represent the topology and the geometry of the image regions determined to be included in the original image.

The image structure map data structure further includes an unrounded image region boundary data item indicated by each region boundary data item, each of which represents the respective image region boundary in the original image. To insure topological consistency with the original image, the unrounded image region boundary data item is used in place of the rounded image region boundary to determine an unrounded vertex of an intersection location with a second unrounded image region boundary data item. The rounding operation modifies the unrounded vertex to produce the machine representable value of the intersection location according to a set of one or more rounding rules that preserve topological and geometrical consistency between unrounded locations in the original image and rounded locations in the image structure map.

The image structure map data structure supports an insertion operation for inserting a new image region boundary into the image structure map. When the new image region boundary intersects at a new unrounded vertex location with an unrounded image region boundary stored in the image structure map, the new unrounded vertex location is represented in the image structure map as a rounded vertex location having machine representable values produced by applying the rounding operation to the new unrounded vertex location. The rounding operation divides the unrounded image region boundary into two boundary fragments at the rounded vertex location such that the region boundary data item representing the portion of the unrounded image region boundary prior to the insertion operation is modified to produce a region boundary data item for each of the two boundary fragments produced by applying the rounding operation.

In accordance with another aspect of the present invention, the image structure map data structure comprises a plurality of region data items collectively representing the original image as a partition of a 2D plane induced by the intersecting image region boundaries into one or more disjoint image regions tiling the 2D plane, and a signal property descriptor indicated by each respective region data item. The plurality of region data items explicitly represents the topology and the geometry of the image regions determined to be included in the original image such that each respective region data item indicates all adjacent image region boundaries forming the image region represented by the respective region data item, and each respective one of a plurality of vertex data items indicates all of the image region boundaries adjacent to a vertex location.

Each region data item further indicates at least one subregion referred to as a cell. A cell has a standardized geometric shape having a predetermined number of boundaries, and all of the cells indicated by a region data item collectively represent the respective image region represented by the region data item. The representation of image regions in the image structure map as a collection of cells provides a predictable level of efficiency for performing a search operation such that searching for an intersection location of a line segment with a side of an image region is performed in a fixed amount of time per cell searched for the intersection location. When the shape of each cell is a trapezoid, the image partition represented by the image structure map is referred to as a trapezoidal decomposition. When the shape of each cell is a triangle, the image partition represented by the image structure map is referred to as a triangulation.

The novel features that are considered characteristic of the present invention are particularly and specifically set forth in the appended claims. The invention itself, however, both as to its organization and method of operation, together with its advantages, will best be understood from the following description of the illustrated embodiments when read in connection with the accompanying drawings. In the Figures, the same numbers have been used to denote the same component parts or steps.

DETAILED DESCRIPTION OF THE INVENTION

Figure 1:
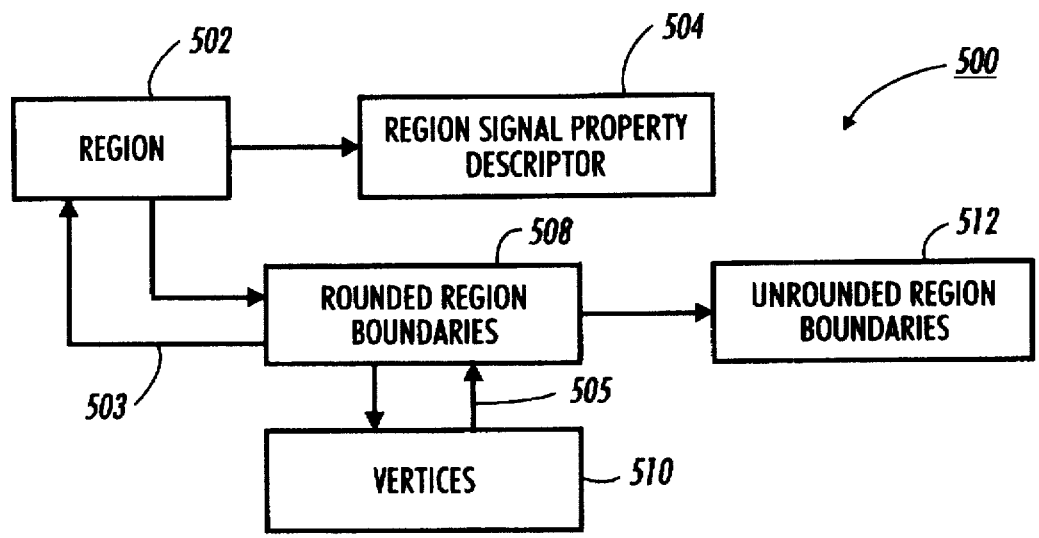
FIG. 1 is a block diagram of the image structure map data structure of the present invention.

The detailed description below is organized as follows: the first section provides a conceptual framework for understanding the invention and the terminology used to describe the invention. The second section describes the general features of the image structure map data structure. The third section provides a procedural description of an illustrated embodiment of the image structure map, including a description of an implemented embodiment of the image structure map data structure. The next section provides a description of the machine environment of the present invention, and the final section discusses various miscellaneous features of the present invention.

A. Conceptual Framework.

The present invention relates to operating a machine or system including a processor, and to processing electrical or other physical signals to produce other desired physical signals. The detailed descriptions which follow are presented largely in terms of symbolic representations of operations of data within the memory of the system. These operations require physical manipulations of physical quantities such as electrical or magnetic signals that are capable of being stored, transferred, combined, compared, and otherwise manipulated. For convenience, these physical signals will be referred to herein variously as bits, values, image locations, or pixels. Further, the operations performed on the signals, referred to in terms such as adding, comparing, locating or determining, while commonly associated with mental operations performed by a human user, are performed exclusively by a processor of a suitable machine, and require no human capability, apart from supplying, when appropriate, input interaction signals. In addition, the algorithmic descriptions of the invention that are presented herein for operating the system are not inherently related to any particular processor, machine, or other apparatus. The machine or system may be specially constructed for the required purposes or it may comprise a general purpose computer selectively activated or reconfigured by a computer program stored in the computer. Useful machines for performing the operations of the present invention include general purpose digital computers or other similar devices configured as described below and in the claims.

The following terms provide the framework for describing the embodiments of the claimed invention illustrated in the accompanying drawings. These terms have the meanings indicated below throughout this specification and in the claims, rather than any meanings that may occur in other sources, such as, for example, documents, if any, that are incorporated by reference herein elsewhere in this description.

The term "data" or "data item" refers herein to physical signals that indicate or include information. "Data" includes data existing in any physical form, and includes data that is transitory or is being stored or transmitted. For example, data could exist as an electromagnetic or other transmitted signal or as a signal stored in electronic, magnetic, or other form. Data items can be combined into a "data structure" such that the data structure "includes" the combined data items; thus, a "data structure" is any combination of interrelated data. A data structure may also include other data structures. An item of data "indicates" a thing, an event, or a characteristic when the item has a value that depends on the existence or occurrence of the thing, event, or characteristic or on a measure of the thing, event, or characteristic. A first item of data "indicates" a second item of data when the second item of data can be obtained from the first item of data, when the second item of data can be accessible using the first item of data, when the second item of data can be obtained by decoding the first item of data, or when the first item of data can be an identifier of the second item of data. For example, a region data item 502 in FIG. 1 indicates a rounded region boundary data item 508. When an item of data can indicate one of a number of possible alternatives, the item of data has one of a number of "values." For example, signal property descriptor 504 in FIG. 1 indicates a value of the signal property for the image region pointing to the descriptor. Thus, when the signal property of an image region is its color, region signal property descriptor 504 indicates a color value for the region. An item of data "includes" information indicating a thing, an event, or a characteristic if data indicating the thing, event, or characteristic can be obtained by operating on the item of data.

A "processor" is any machine, component or system that can process data, and may include one or more central processing units or other processing components. Any two components of a machine or system are "connected" when there is a combination of circuitry that can transfer data from one of the components to the other. A processor "uses" data in performing an operation when the result of the operation depends on the value of the data. An "instruction" is an item of data that a processor can use to determine its own operation. A processor executes a set of instructions when it uses the instructions to determine its operation, and an "operation" results from the processor executing the set of instructions. Thus, a set of instructions may be considered to be an operation. To "obtain" or "produce" data is to perform any combination of operations that begins without the data and that results in the data. Data can be "obtained" or "produced" by any operations that result in the data. Data can be "obtained from" or "produced from" other data by operations that obtain or produce the data using the other data. "Memory" is any component, combination of components, circuitry, or system that can store data, and may include local and remote memory and input/output devices. A processor "accesses" data in memory by any operation that retrieves or modifies the data, such as by reading or writing a location in memory that includes the data. A processor can be "connected for accessing" data by any combination of connections with local or remote memory or input/output devices that permits the processor to access the data. An example of memory is a storage medium access device with a data storage medium that it can access.

An "image" is a pattern of light. Data "defines" an image when the data includes sufficient information to produce the image, such as by presenting it on a display. An "image definition data structure" includes data indicating a one-to-n dimensional signal sampled from an image in a two-dimensional (2D) domain in a regular fashion. The signal may indicate, for example, a color, a grayscale value, multispectral values, or range data. The term "original image" is used herein to refer to an image definition data structure defining the image that is represented according to the novel data structure of the present invention. An "image region" is an area or portion of an image definition data structure in which some property of the image signals in the area is smoothly varying over the area. An "image region boundary" indicates an area or portion of an image definition data structure between two image regions. Examples of image region boundaries are curves and line segments. By definition herein, an image region does not include its image region boundaries. The detection of an image region boundary or an image region in an image definition data structure is therefore a function of the particular signal analysis operation used to analyze the signals in the image definition data structure to find the smoothly varying signal property, and different signal analysis operations may produce different sets of image region boundaries and image regions when analyzing the same image definition data structure. Thus, an image region boundary or an image region is said to be "determined to be included in the original image" to indicate the dependence of the presence and extent of the boundary or region on the result of the signal analysis operation. Although not a requirement, the signal analysis operation may seek to detect a smoothly varying property of the signal in the image definition data structure that is perceptible to a human user viewing the image such that the image regions determined correspond to image regions perceptible to the user.

A "vertex" is an image region boundary endpoint or an intersection between two image region boundaries. An image region boundary is "adjacent to" a given image region when the image region boundary is an image region boundary of that image region; a vertex is adjacent to an image region or to an image region boundary if the vertex is contained in the image region boundary.

A "partition data structure" includes data indicating the vertices, image region boundaries and image regions of an original image, the vertices adjacent to each image region boundary, and the image region boundaries and vertices adjacent to each image region. A partition data structure will also be referred to as simply a "partition." A partition of an original image indicates data describing both the geometric and the topological properties of the set of region boundaries determined to be included in the original image. The geometric properties include the positions of the region boundaries determined to be included in the image, typically specified by their endpoints, and the geometric definition of the region boundaries; the topological information indicates the incidence and adjacency of the vertices, region boundaries and regions that comprise the partition. A process, operation or algorithm is said to "produce" or "build" a partition. The partition produced for a given original image is a function of the image region boundaries provided as input to the partition building process; thus, an original image may be represented by different partitions, and there is no single unique partition for a given original image. A partition of a whole or part of the original image into image regions is said to be "induced" by a given set of image region boundaries.

An "image structure map data structure" or "image structure map," abbreviated ISM, is a data structure that indicates a partition of an image definition data structure into image regions and, for each image region, includes a "signal property descriptor," defined below. An image structure map is said to "represent" an original image when the image structure map indicates a partition of the original image. A "region data item" represents an image region in an image structure map data structure. A "region boundary data item" or "region boundary" represents an image region boundary in an image structure map. An "image structure" refers to a data item in an image structure map data structure that represents an image region, an image region boundary or a vertex determined to be included in the image definition data structure.

Each region data item representing an image region indicates a "signal property descriptor" which is defined herein as a data item that indicates the value assigned to signals in the image region represented by the region data item. Computing signal property descriptors is described in more detail below. Determining the signal property descriptor indicated by a region data item is done independently of determining image region boundaries and vertices.

An image structure map "spatially indexes" an image definition data structure when it supports the operation of locating in the partition of the image an image structure that contains a selected point in the original image.

An "unrounded image region boundary," also referred to as an "unrounded line segment," and referred to herein in an abbreviated manner as an "ursegment," is an image region boundary that is input to a rounding operation (defined below) and that may have the values of the coordinates of each of its endpoints in the plane specified as real numbers. An "unrounded vertex," including both endpoints and intersections of unrounded image region boundaries, has the values of the coordinates of its location in the plane specified as real numbers.

A "rounding operation" is one or more operations that takes as input either an unrounded image region boundary or an unrounded vertex or both and produces a rounded vertex perturbed to an integral point that is determined by the operation(s). A rounding operation may also be referred to as a "set of rounding rules," or a "rounding scheme." The rounding operation makes use of a conceptual Euclidean plane that is tiled into unit squares, each of which is referred to as a "pixel." The plane is assigned coordinates so that pixel centers have integral coordinates; a pixel center is called an "integral point," or a "representable point." The pixels and integral points form a grid in the plane. A "hot pixel" is a unit square (pixel) in a grid of pixels that contains an unrounded vertex (i.e., either an ursegment endpoint or the intersection point of two ursegments.) A point having real coordinates on an image region boundary, such as an unrounded vertex, is said to be "perturbed to" or "rounded to" an integral point when the real coordinates of the point are replaced by integer coordinates; an unrounded vertex that is perturbed to an integral point may be referred to as a "rounded vertex" or a "perturbed vertex." "To perturb" an unrounded vertex means to replace its real coordinates with integer coordinates.

A "polysegment" is the polygonal image region boundary that results when all of the vertices in an unrounded image region boundary (i.e., an ursegment) are perturbed to integral points. A polysegment includes one or more image region boundaries, each of which is called a "fragment." When the endpoints of an ursegment are the only points of the ursegment perturbed to integral points, the polysegment contains only one fragment. By definition above, a point on an image region boundary having real coordinates that is not a vertex, referred to herein as a "nonvertex point", may also be perturbed to an integral point; perturbing a nonvertex point produces a rounded vertex in place of the point on the image region boundary.

A "rounded partition of the original image" for a given input set of region boundaries has all of its vertices specified as machine representable points. Specifying vertices in this manner takes an input image region boundary and produces a "rounded region image boundary." Each vertex in a rounded partition is referred to as a "rounded vertex." An "unrounded partition of the original image" is a partition in which vertices are not guaranteed to be specified as machine representable points. An unrounded partition is also referred to herein as an "ideal partition of the original image." A rounded partition of an original image into image regions is "topologically consistent" with an ideal partition of the original image when each rounded vertex retains the same orientation with respect to any particular rounded region boundary as the corresponding ideal vertex has with respect to the corresponding input region boundary.

A "trapezoidal decomposition" as used herein is a partition of an original image in which the representation of each image region in the data structure is subdivided into areas, referred to as cells, each having a standardized geometric shape of a trapezoid, such that a data structure describing a cell requires a fixed amount of memory space. The image structure map of the present invention may include a partition of the original image in which regions are subdivided into cells that are all of a standardized geometric shape as well as a partition of the original image in which regions have irregular shapes. An "attachment" or "attachment boundary" is a special type of image boundary that is added to a location within an image region to divide the image region into one or more cells when the set of image region boundaries determined to form an image region has an irregular, nonstandard geometric shape. An "attachment boundary data item" is a data item included in the image structure map that represents an attachment. The cells in trapezoidal decompositions have at most four sides and may have three sides, in the case of a triangle which is considered to be a degenerate form of a trapezoid. As used herein, when a cell in a trapezoidal decomposition is referred to as having a "predetermined" number of sides, it is understood that the cell is a standard geometric shape having a fixed number of four sides, but includes degenerate shapes having three sides. The present invention is intended to include partitions where regions are subdivided into cells having other standardized geometric shapes, such as triangles (producing partitions called triangulations), hexagons, and octagons.

Figure 18:
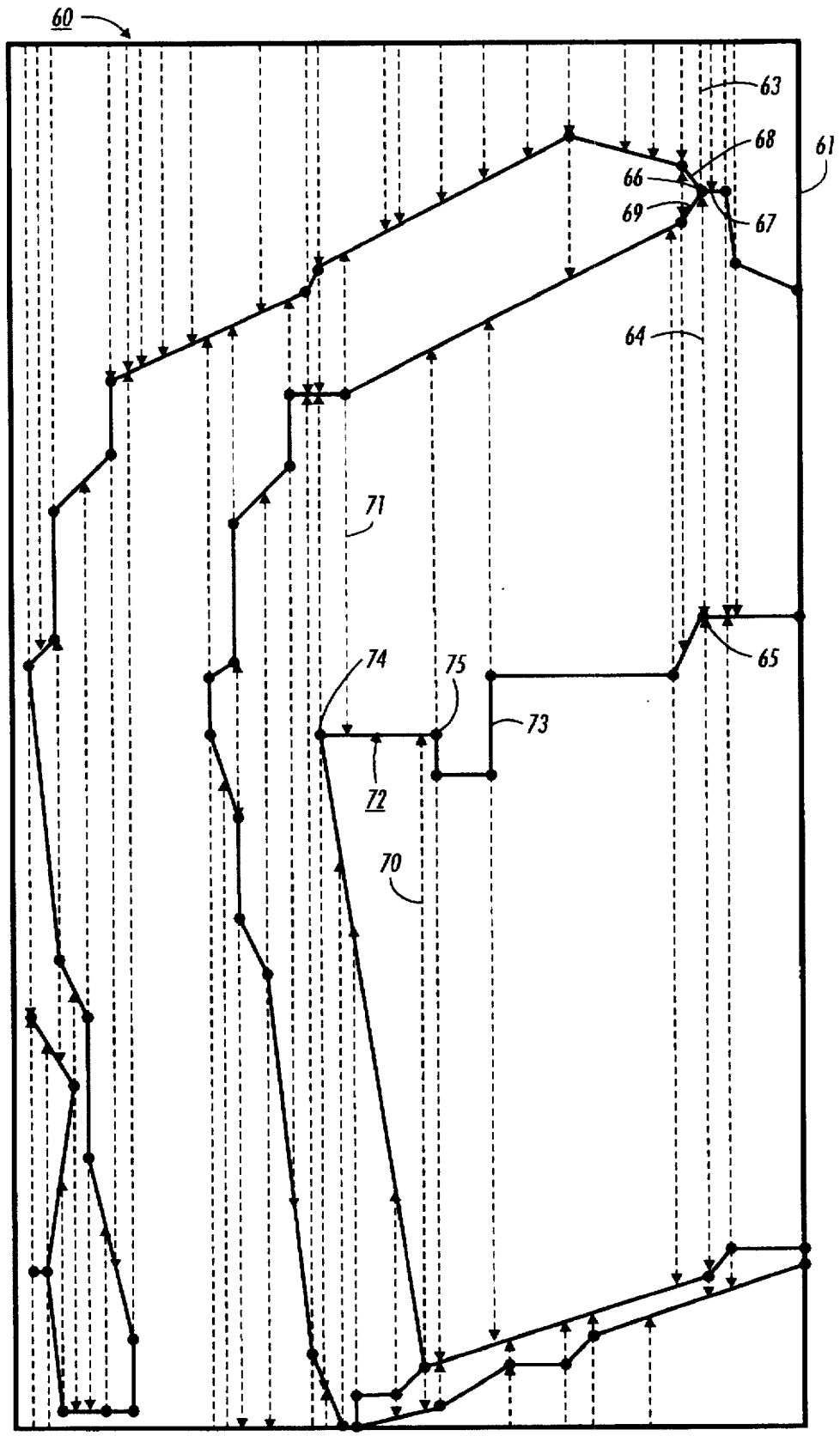
FIG. 18 is an image rendered from the image structure map data structure representation of the image of FIG. 11, for the portion shown in FIG. 13, and showing the vertical cell decomposition for the image portion shown in FIG. 13, produced according to the illustrated embodiment of the present invention.

A "vertical trapezoidal decomposition of an original image" is a trapezoidal decomposition of the original image in which the regions are subdivided into one or more trapezoids having either two parallel vertical sides or at least one vertical side and a vertex. A vertical trapezoidal decomposition is also referred to as a "vertical cell decomposition" or "VCD." A vertically-oriented attachment boundary, called a "vertical attachment," is added to a location within an image region to divide the image region into one or more vertical cells. FIG. 18 shows rendered image 60 which presents a visual representation of the vertical cell decomposition of portion 4 of original image 2 shown in FIG. 11. In FIG. 18, a vertex is represented by a filled circle, a region boundary with a solid line, and a vertical attachment by a dashed line with an arrow that points to the region boundary at one end of the attachment. The addition of vertical attachments to a partition of an image partition produces cells that are all trapezoids, generally with a total of four sides with two sides being vertically oriented, and allowing for degenerate cells such as triangles, which have three sides, one of which is vertical.

Figure 14:
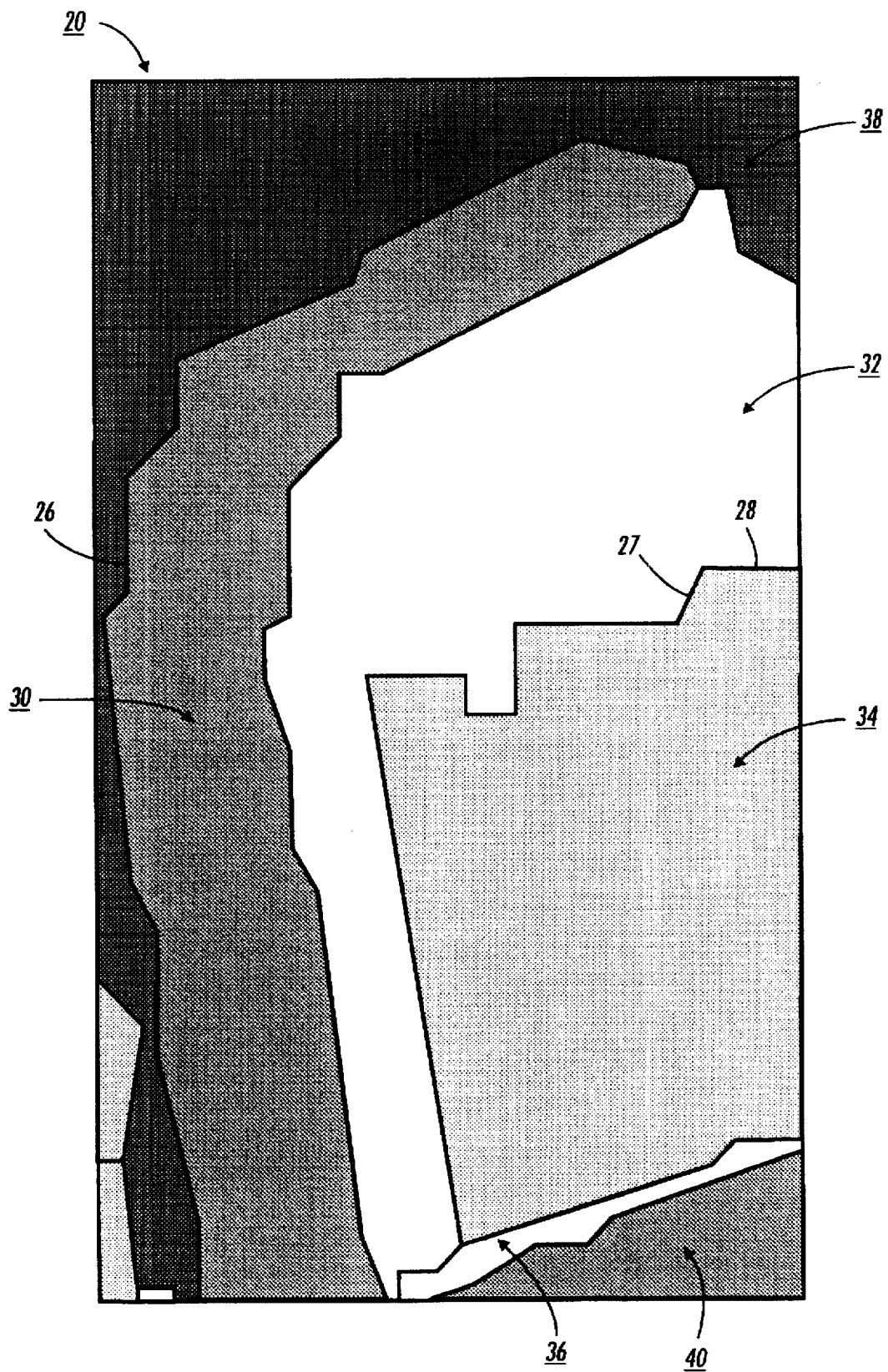
FIG. 14 illustrates an image rendered from the image structure map data structure representation of the image of FIG. 11, for the portion shown in FIG. 13, and showing regions, region boundaries and visual representations of signal property descriptors.

The term "display feature" refers to any human perception produced by a display device, and includes a single display feature and also may include plural display features that together form a pattern of display features in an image. A "display object" is a display feature that is perceptible as a coherent unity. An image "includes" a display feature or display object if presentation of the image can produce perception of the display feature or display object. A common characteristic of processor-controlled machines that display images is a mapping between items of data within the memory of the machine and display features included in the image presented by the processor. A display feature "represents" a data item or a body of data when the display feature can be mapped to the data item or to data items in the body of data. A display feature "represents" the item of data to which it can be mapped. Similarly, an item of data "is represented by" a display feature to which it is mapped. A "rendered image" as used herein is an image produced using the image structure map of an original image; a "rendering operation" maps data items in the image structure map to display features or display objects in the rendered image. For example, FIG. 12 shows a rendered image of the image structure map representation of original image 2 of FIG. 11. FIG. 14 is a rendered image 20 showing the image structure map data structure representing portion 4 of original image 2 of FIG. 11. In FIG. 14, display feature 28 represents an image region boundary data item in the image structure map.

Some of the drawings illustrating the present invention represent the image structure map data structure as a set of labeled rectangular blocks connected by arrows. This representation is intended as a convenient way to show the type of information, as illustrated by the labels in the boxes, conveyed by signals indicating data stored in memory, and how those signals are related, as illustrated by the lines and arrows connecting pairs of boxes. The drawings illustrating the present invention further include several images rendered from the image structure map. These rendered images provide the best way to illustrate some of the features of the image structure map data structure of the present invention, but it is to be understood that the data structure of the present invention is useful and novel independently of whether an image is rendered therefrom, and a rendered image in no way forms part of the invention as embodied in the claims appended hereto.

B. General Features of the Invention.

1. General features of an image structure map data structure.

FIG. 1 illustrates a general block diagram of the image structure map data structure 500 of the present invention for representing an image as a partition in a 2D plane induced by a set of image region boundaries that are determined to be included in the image. At the top level of data structure 500, each region identified in the image is represented by a region data structure 502 that indicates a region signal property descriptor 504. Each region data structure 502 indicates the image region boundaries adjacent to the region; each of these image region boundaries is represented by a region boundary data structure 508. Each region boundary 508 also indicates the regions to which it is adjacent, shown by arrow 503 pointing from region boundary 508 back to region 502. Each region boundary 508 indicates the vertices adjacent to boundary 508; each of these vertices is represented by a vertex data structure 510, and each vertex also indicates the region boundaries to which it is adjacent, shown by arrow 505 pointing from vertex 510 back to region boundary 508.

Each region boundary data structure 508 points to vertices (endpoints) whose coordinate values are computed and stored as machine representable numbers using a rounding operation. Thus, region boundary data structure 508 is referred to in FIG. 1 as a rounded region boundary data structure. Each rounded region boundary data structure further indicates the endpoint coordinates of its original image region boundary, which is referred to as unrounded region boundary 512. As explained in more detail below in the discussion of the rounding operations, unrounded region boundaries are used for purposes of computing intersections with original image region boundaries that are being inserted into the image structure map 500.

The data that is explicitly represented in each of these data structures is an implementation choice determined primarily by the operations that image structure map 500 is designed to support. This implementation choice, in turn, must take into account the efficiency of the access to the image structures in data structure 500 in comparison with the storage requirements of the data structure. It may be determined experimentally that explicitly representing certain data in the data structure will result in faster access to image structures than could otherwise be achieved by computing the same information from other data in the data structure. Efficient access time may be a requirement for some types of operations with image structure map 500, particularly for operations involving image interaction with a displayed view of the image being represented by the ISM.

2. An example of an image represented as an image structure map.

Figure 2:
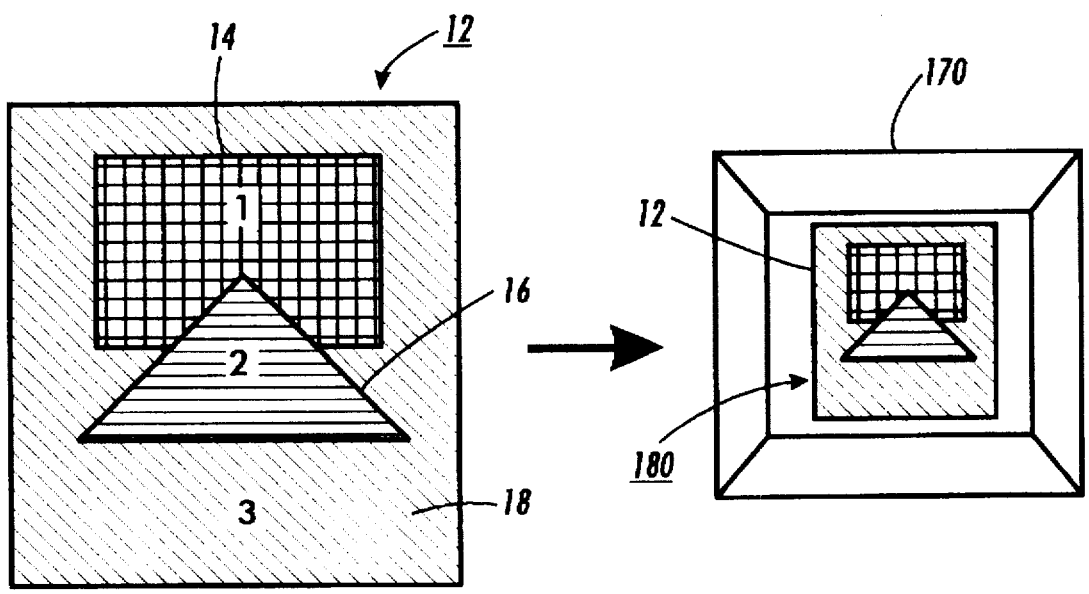
FIG. 2 illustrates an example of an original image that is suitable for representation as an image structure map according to the present invention.
Figure 3:
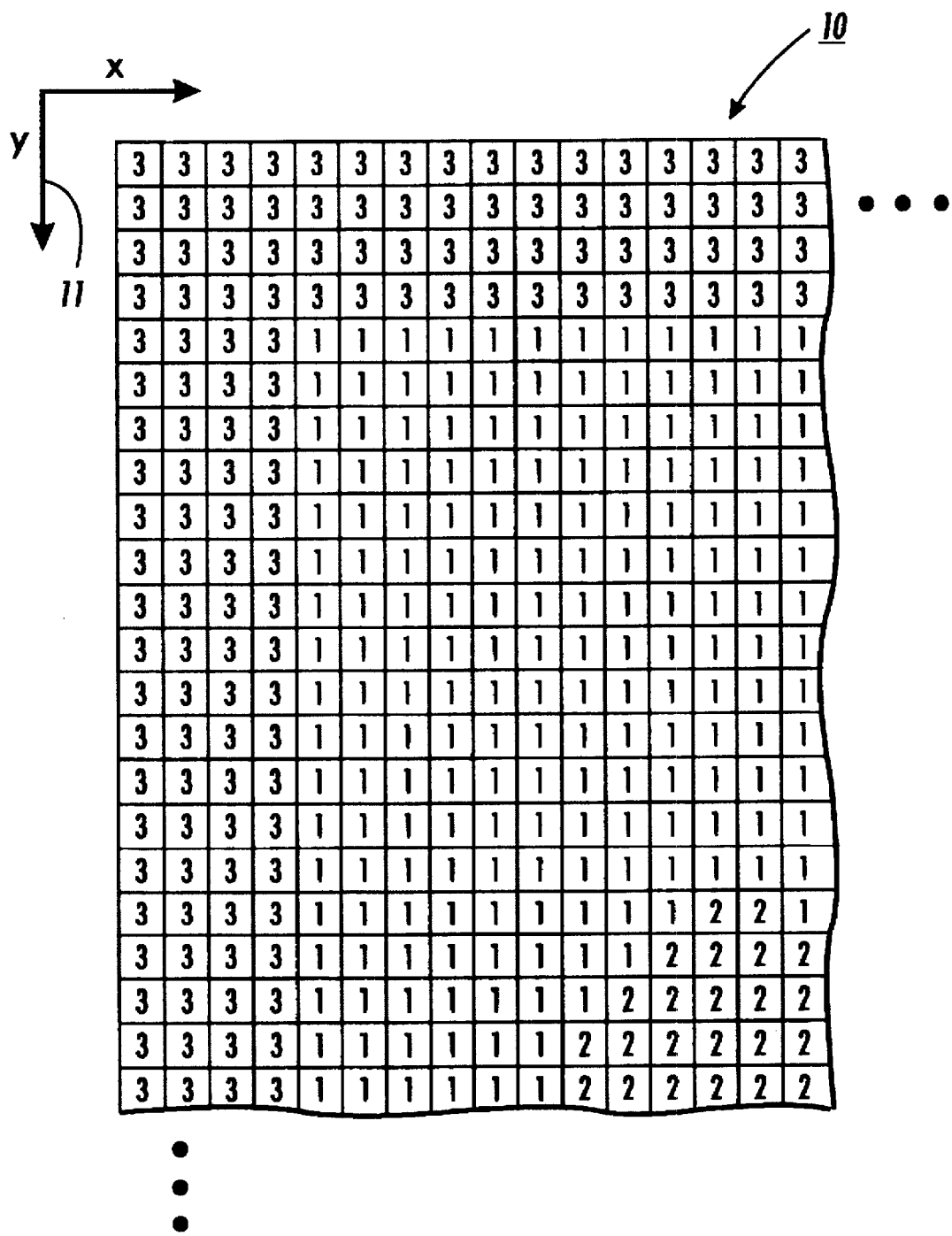
FIG. 3 illustrates a portion of an image definition data structure from which the original image of FIG. 2 is produced.

FIG. 2 illustrates displayed original image 12 displayed for viewing in display area 180 of display device 170. FIG. 3 schematically illustrates a portion of image definition data structure 10 as a two dimensional array of signal values; a rendering operation (not shown) uses image definition data structure 10 as input and produces displayed original image 12 for display in display area 180. Display features indicating different hatching styles in original image 12 are used in FIG. 2 to visually represent different signals stored in image definition data structure 10. Each different set of signals visually presents a distinct image region to a viewer of displayed original image 12. For simplicity, the numbers "1", "2" and "3" have been used as signal values in image definition data structure 10. Region 14 is an irregularly shaped region formed by signals having a value of "1;" region 16 is a triangular shaped region formed by signals having a value of "2;" and region 18 is an irregularly shaped region formed by signals having a value of "3." The numbers that appear in the version of displayed original image 12 on the left side of FIG. 2 are shown there for the purposes of labeling the regions by signal value and are not part of the image, as can be seen in displayed original image 12 in display area 180. The portion of image definition data structure 10 illustrated in FIG. 3 shows the signal values "1", "2" and "3" distributed according to the regions shown in displayed original image 12. Note that solid outlines of regions 14 and 16 are shown in displayed original image 12 in FIG. 2 for the convenience of distinguishing these regions from one another in the image as it appears in a printed or displayed drawing; signals representing these solid outlines are not actually present in image definition data structure 10.

Figure 4A:
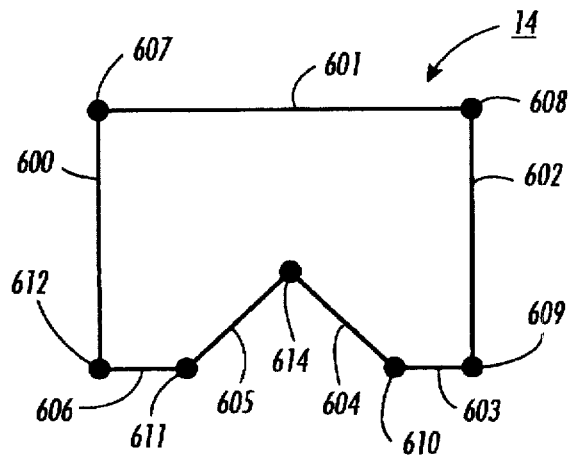
FIGS. 4A, 4B and 4C illustrate the individual image regions of the image of FIG. 2, with their image region boundaries and vertices labeled.
Figure 4B:
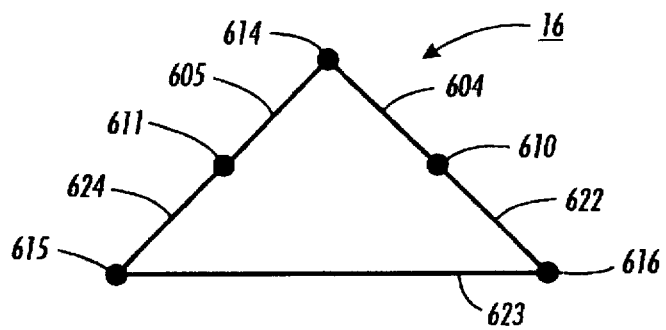
Figure 4C:
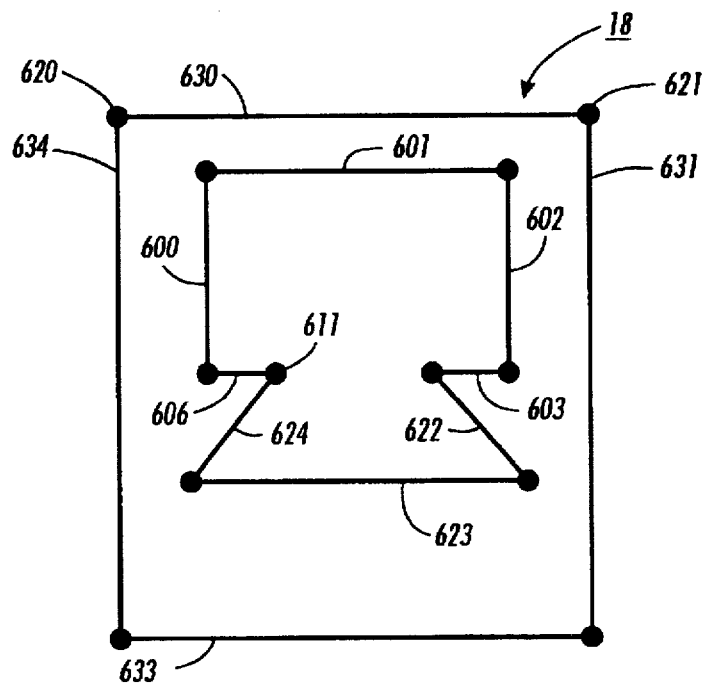

FIGS. 4A, 4B and 4C show the individual image regions 14, 16 and 18 in displayed original image 12, with their respective vertices (endpoints and intersections) and image region boundaries labeled. Vertices are shown as small filled dots in these figures, and most have been labeled with reference numerals. Region 18 is composed of the image area surrounding rectangular image region 14 and triangular image region 16, and is defined by the four image region boundaries 630, 631, 633, and 634 and their vertices that form a rectangular border-like structure and the interior image region boundaries that form the outline of the rectangular and triangular regions.

Figure 5:
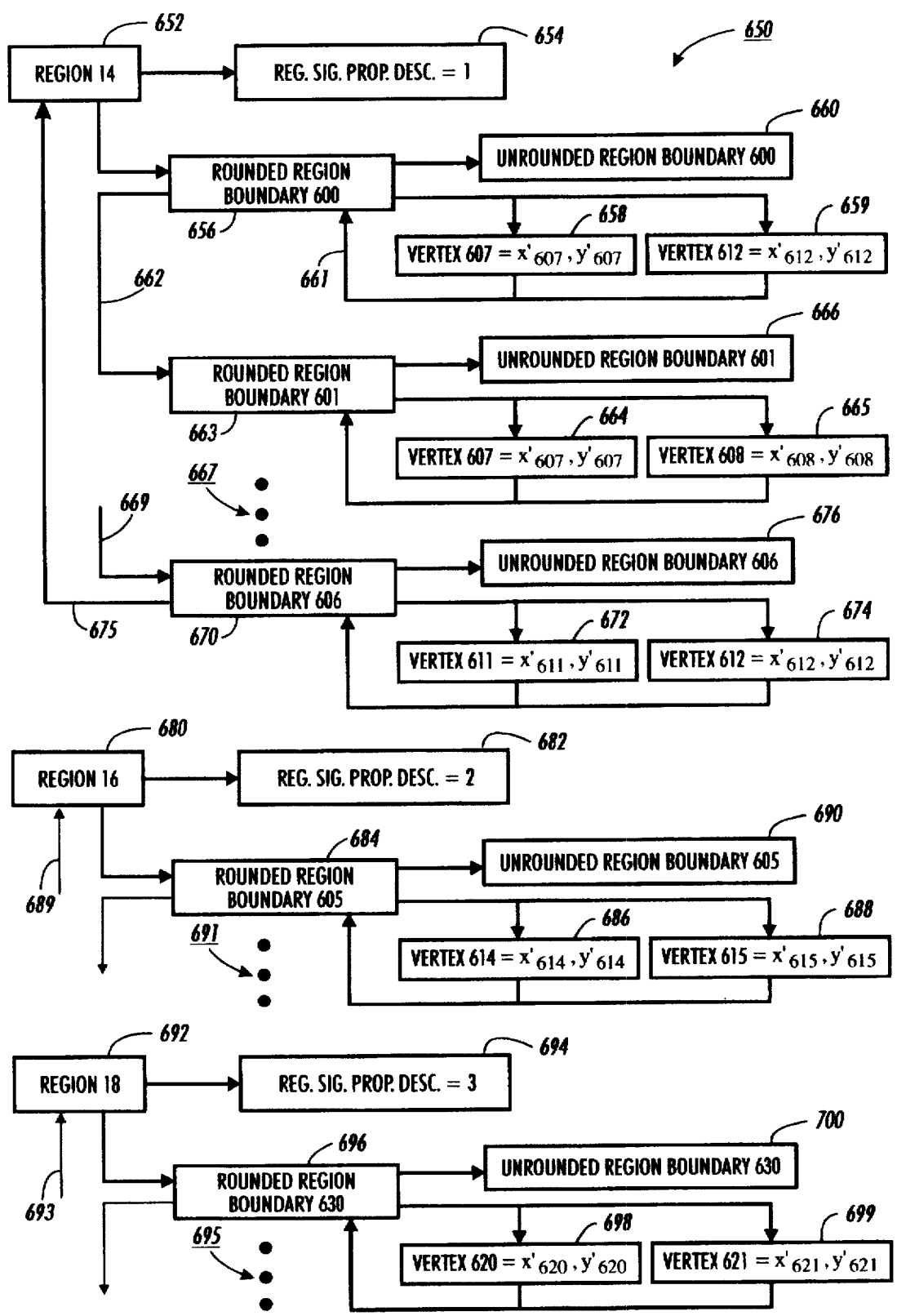
FIG. 5 schematically illustrates the image structure map data structure representation of the image of FIG. 2 using the image region boundaries and vertices labeled in FIGS. 4A, 4B and 4C.

FIG. 5 shows a schematic block diagram of a portion of the image structure map 650 representing the image regions of displayed original image 12, as shown in FIGS. 4A, 4B and 4C. Region 14 data structure 652 indicates regional signal property descriptor data item 654 showing a signal value equal to "1". Region 14 data structure 652 indicates rounded region boundary 600 data structure 656 which points to data items 658 and 659 indicating the coordinate values of rounded vertices 607 and 612. The coordinate values are shown as x', y' pairs to distinguish the coordinate system of the ISM from the conventional x,y coordinate system of the original image data structure 10. Each of these vertices indicate the region boundary to which they are adjacent, as shown by the line and arrow 661. Rounded region boundary 600 data structure 656 also indicates the coordinate values of original, unrounded region boundary 600.

Line and arrow 662 in FIG. 5 shows that rounded region boundary 600 data structure 656 further indicates data structure 663 representing adjacent region boundary 601 in region 14 of FIG. 4A. Rounded region boundary 601 data structure 663 indicates vertices 607 and 608 of region boundary 601 and the coordinate values of original, unrounded region boundary 601. The three large vertically positioned dots labeled with reference numeral 667 indicate that the data structures representing remaining region boundaries 602, 603, 604, and 605 shown in FIG. 4A are omitted from this figure. The data structure representing region boundary 605 in region 14 of FIG. 4A indicates data structure 670 representing adjacent region boundary 606 in region 14 of FIG. 4A, as shown in FIG. 5 by line and arrow 669.

Regions 16 and 18 are represented with data structures similar to those shown for region 14 in FIG. 5. The two sets of three large vertically positioned dots labeled with reference numerals 691 and 695 indicate that the data structures representing the remaining region boundaries in regions 16 and 18 respectively, as shown in FIGS. 4B and 4C, are omitted from this figure.

Lines and arrows 675, 689 and 693 in FIG. 5 illustrate that the last region boundary data structure in the list of region boundary data structures for a region indicates the region data structure representing the entire region. Thus, locating any one region boundary data structure or any one vertex in image structure map 650 allows for locating the region to which it belongs and all other region boundaries and vertices that define the image region to which it belongs. The value of the signal property descriptor for the region may also be obtained by locating the region boundary data structure representing an image region boundary.

Figure 6:
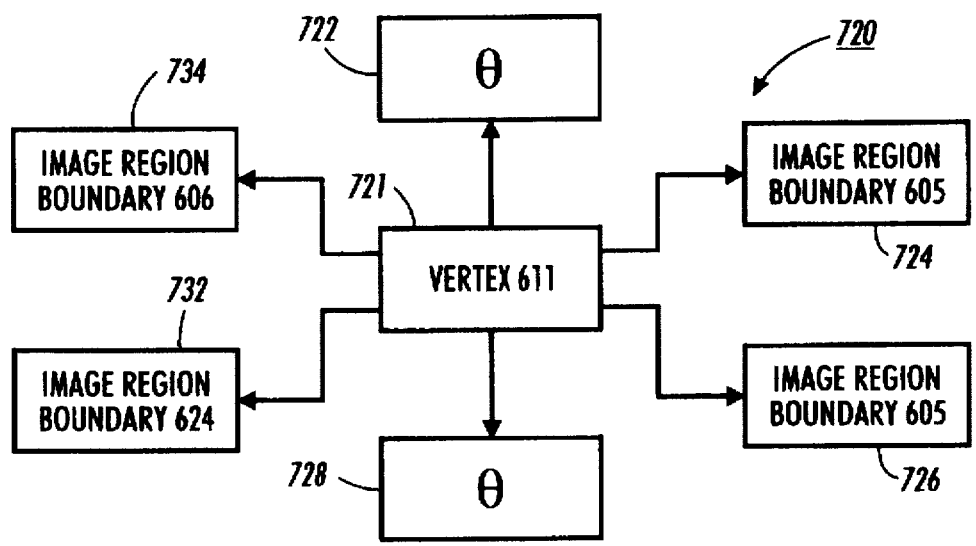
FIG. 6 schematically illustrates a vertex data structure that is part of the image structure map data structure of FIG. 5, representing a vertex that occurs in the original image of FIG. 2.

FIG. 6 illustrates vertex data structure 720 representing vertex 611 in displayed original image 12. Vertex 611, shown in FIGS. 4A, 4B and 4C, has three adjacent image region boundaries 606, 605 and 624 represented by region boundary data structures. Vertex data structure 720 indicates the region boundary data structures representing these image region boundaries in the positional order in which they occur in the original image. Data items 722, 724, 726, 728, 732 and 734 are visually arranged in the figure to represent orientations from which an image region boundary may be positioned with respect to vertex 611; these orientations are named using a conventional directional naming system, such that data item 722 is referred to as the data item representing the region boundary having the northernmost position with respect to vertex 611, while data item 728 represents the region boundary having the most southerly position with respect to vertex 611. The null symbol is used to represent the fact that no region boundary exists at a given position. Data items 724 and 726 show the same region boundary 605; when there is a single region boundary positioned with respect to a vertex in a given direction, both positional data items indicate the same region boundary. Data item 732 shows that image region boundary 624 is the southwestern-most boundary positioned with respect to vertex 611; and data item 734 shows that image region boundary 606 is the northwestern-most boundary positioned with respect to vertex 611. Vertex data structures of the type shown in FIG. 6 for each vertex show all adjacent region boundaries, and provide a fast way to locate structures in the ISM.

It can be seen from the general schematic view of an image structure map data structure illustrated in FIG. 1, and from examples of an ISM for a specific image in FIGS. 5 and 6, that an ISM represents complete geometric and topological information about an image, showing image regions, all region boundaries defining an image region, the adjacency relationships between image region boundaries, vertices and the adjacency relationships between each vertex and its adjacent image region boundaries.

3. The rounding operation and storing machine representable coordinate values for vertices.

The image structure map data structure of the present invention is designed to support dynamic, incremental creation of the image representation from an original image. When image structure map 500 (FIG. 1) is initially created, it is initially defined as having a single region with a default or empty signal property descriptor. The single image region is bounded by four image region boundaries forming a rectangular border-like structure analogous to a picture frame; this border is illustrated in FIG. 4C. The ISM is constructed incrementally by inserting image region boundaries into the single image region. An important aspect of this dynamic data structure creation is that region boundary data may be added to, or deleted from, image structure map 500 without needing to know all of the region boundary data items that are to be included in the data structure a priori.

Inserting image region boundaries requires computing intersections of region boundaries. Such computation may yield a real number that is only able to be represented to a processor according to its finite precision model, resulting in a rounding or truncation operation of the actual location of the intersection. Subsequent computations using the rounded or truncated intersection location may result in moving the intersection, or another intersection, an unacceptable distance from its actual location, or may move it to a location that is topologically inconsistent with the actual location of the intersection in the original image. To prevent these problems, the present invention produces an ISM in which all vertices of image region boundaries (endpoints and intersections) have locations specified in machine representable numbers, and computes intersections of a new image region boundary with existing image region boundaries using the original unrounded image region boundaries, not their rounded versions.

Two important rounding operations are needed to accomplish this: First, locations of the intersections and the endpoints of input region boundaries are rounded to machine representable numbers using a mathematically rigorous rounding operation. Secondly, the original locations of the input region boundaries provided by a user or by an automatic image segmentation operation are stored in the ISM to ensure that the rounded image region boundaries are topologically consistent with the original input region boundaries.

The rounding operation employed in the illustrated implementation of the present invention includes a set of rounding rules that are mathematically provable as producing a rounded partition that is topologically consistent with the partition of their original image region boundaries. These rounding rules are used during region boundary insertion operations to ensure that locations of vertices are stored in the ISM as representable points. The first rounding rule states that when a vertex occurs within the boundary of a grid square, called a "hot pixel," the vertex is perturbed to the integral point of the hot pixel. The second rounding rule states that when an unrounded image region boundary, referred to as an "ursegment," passes through a hot pixel, it is perturbed to pass through that pixel's integral point. Perturbing an image region boundary so that an intersection that lies on it is rounded to an integral point breaks up the original image region boundary into smaller pieces, called "fragments." The rules provide that a fragment is added to an ursegment only where a vertex of the partition lies on the segment, or where the ursegment passes "near" an integral point which will become a vertex of the rounded partition, where "near" is defined as being within the boundary of the hot pixel.

Figure 7:
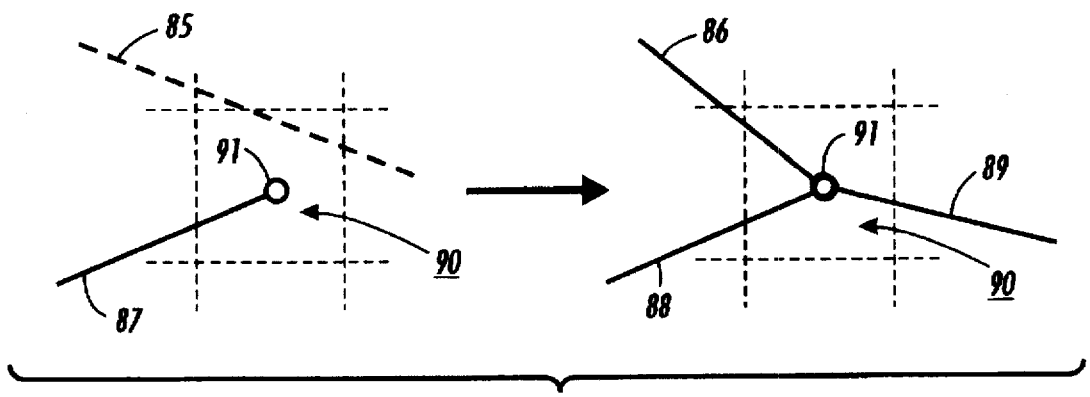
FIG. 7 illustrates the first of two rules used to represent vertices in the image structure map data structure as machine representable points according to the present invention.
Figure 8:
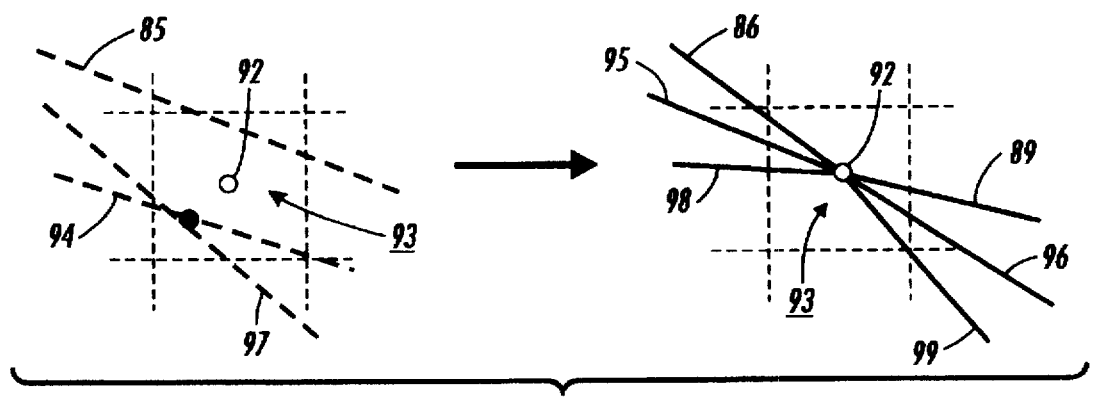
FIG. 8 illustrates the second of two rules used to represent vertices in the image structure map data structure as machine representable points according to the present invention.

FIGS. 7 and 8 illustrate the two rounding rules. With reference to FIG. 7, the left side of FIG. 7 shows two ursegments 85 and 87 in a portion of a plane that includes pixel 90; ursegment 87 terminates in pixel 90, such that pixel 90 includes a vertex (the endpoint), thus making pixel 90 a hot pixel; ursegment 85 passes through the hot pixel. The right side of FIG. 7 shows the result of applying the two rules. It can be seen that the first rule results in ursegment 87 being perturbed to integral point 91; ursegment 87 thus becomes perturbed segment 88. The second rule results in ursegment 85 being divided into two fragments 86 and 89 of what is now a polysegment; this is required in order to perturb ursegment 85 to integral point 91. Note that ursegment 87 may also be divided into two (or more) fragments, depending on whether the remaining portion of ursegment 87 not shown in FIG. 7 passes through one or more additional hot pixels; if only the endpoints of ursegment 87 are perturbed, the rounding operation produces a polysegment having only one fragment.

FIG. 8 illustrates the rounding rules applied to a hot pixel that contains an intersection of two ursegments and an ursegment that passes through a pixel containing an intersection. The left side of FIG. 8 shows three ursegments 85, 94 and 97 in a portion of the plane that includes pixel 93; the ursegments are distinguishable by the patterning used to draw them. Pixel 93 contains integral point 92. Ursegments 94 and 97 intersect in pixel 93, thus making pixel 93 a hot pixel; ursegment 85 passes through pixel 93. The right side of FIG. 8 shows the result of applying the rounding rules to ursegments 85, 94 and 97. As in FIG. 7, ursegment 85 is divided into two fragments, labeled 86 and 89, of what is now a polysegment. The vertex formed by the intersection of ursegments 94 and 97 is shown perturbed to integral point 92 on the right side of FIG. 8. This results in each ursegment being divided into fragments of a polysegment; ursegment 94 is divided into fragments 98 and 96, and ursegment 97 is divided into fragments 95 and 99.

When rounding is accomplished according to the set of rounding rules illustrated in FIGS. 7 and 8, several other topological properties of the rounded partition are also guaranteed: no fragments intersect except at their endpoints; if ursegment r intersects ursegment s and then ursegment t, then polysegment p cannot intersect polysegment τ before polysegment σ; and if a vertical line I through pixel centers intersects ursegment s and then ursegment t, then l cannot intersect polysegment τ before polysegment σ.

The rounding operations ensure that image region boundaries are inserted into the image structure map data structure in a manner that is topologically consistent with the locations of the boundaries in the original image. The ISM may then be used as an accurate spatial index of the original image in order to be able to locate a structure in the ISM that contains an original image location.

4. Computing Signal Property Descriptors.

When to compute signal property descriptors is an implementation decision, and several implementation alternatives are available. As image region boundaries are inserted into the ISM and new regions are created, an actual value of the signal property descriptor may be computed at the time it is determined that a new region has been added to the ISM. Or, alternatively, a default value for the signal property descriptor may be used at the time of creation, computing a signal property descriptor may be deferred to some later event or time, and an actual value computed only at the request of a user of or by a process that uses the ISM data structure, or automatically during a subsequent processing cycle, such as during rendering of an image from the ISM.

How a signal property descriptor value is computed also depends upon the particular implementation of an ISM. When the ISM representation of an original image is intended to capture image region signal information in the original image, the signal property descriptor of each region data item indicates the value of a smoothly varying property of the signals indicated by the image locations included in the image region of the original image being represented by the respective region data item. Computing the signal property descriptor in that case means locating those image region signals in the original image and computing a signal value. When the ISM representation is not necessarily intended to capture the signal information in the original image, a user or some other operation may assign a signal value to a signal property descriptor.

Computing a signal property descriptor from signals in the original image requires as input an image region for which the signal property descriptor is to be computed. There may also be provided as input a signal property descriptor function. Depending on the type of signal, a signal property descriptor may be able to be specified or computed in different ways, which may be controlled by a function. For example, when the signal property descriptor is a color, the color that appears in a region may be a constant color, or the color may appear in the region of a rendered image as varying over the region according to some color dimension. For some images, a varying color gives a preferred or more realistic appearance, or varying the color may create a desired special effect.

To locate the source data from the original image that is required for computing a signal property descriptor, the two-dimensional extents of the region identified in the ISM are used to determine the image locations in the original image that correspond with the region in the ISM. The signal values of these original image locations are used to compute the signal property descriptor for the region. This computation is performed according to the input signal descriptor function, if one is provided. The region data structure for the identified region in the ISM is then updated with the value for the signal property descriptor. Note that computing the signal property descriptor in this case may also further include using other image signal values in the computation, such as the signal values of adjacent image regions. For example, when the signal property descriptor is a color, it is known that the human perception of a target color is influenced by colors surrounding the target color, and may be perceived differently when surrounded by different colors; computing a signal property descriptor may take into account color signal values in adjacent image regions.

When the ISM representation of an original image is intended to capture image region signal information in the original image, the signal property descriptor of each region data item contains the information necessary to compute an approximation of the image signal at every point of the region. Two common types of approximations are constant and linear approximations. Depending on the type of image, the signal can be a scalar or a vector. Scalar image signals include:

(1) intensity: the strength of the light striking each pixel in the image;

(2) range: at each pixel, the distance from the center of the camera along a line through that pixel to a point in the scene;

(3) height field: at each pixel, the distance, or height, of a point in the scene from a fixed horizontal plane; a common type of height field is referred to as terrain data; an image using this type of image signal is called a digital elevation map (DEM); and (4) disparity: given a stereo pair of images, where both cameras are facing the same direction, and the displacement between the cameras is horizontal (relative to the cameras) and orthogonal to that direction, a disparity image measures the horizontal distance between the two pixels, one from each camera, at which a point in the scene is imaged.

Vector image signals include:

(1) color: an ordinary color image has a vector of three elements per pixel; the elements correspond to the amount of light in the red, green, and blue regions of the electromagnetic spectrum arriving at the pixel;

(2) optical flow: given two consecutive images in an image sequence, an optical flow image is computed by finding the translation in the horizontal and vertical directions of each scene point from the first image to the second. Each pixel in the optical flow image is a vector containing the two translations for the corresponding pixel in the first image;

(3) texture: a measure of texture in an image can be computed at each pixel in an image by a set of filters or nonlinear functions, which yields a vector at each pixel. Each pixel in the texture image is a vector containing the texture measures; and (4) multispectral: a multispectral image is a generalization of a color image that generally has more than three elements per pixel, where each element measures the amount of light in some region of the electromagnetic spectrum arriving at the pixel. These regions can include nonvisible parts of the spectrum, for example, infrared and ultraviolet light.

The computed value of the signal descriptor may itself include a function that indicates a value when computed later, for example, during a rendering operation of an image from the ISM. In the illustrated embodiment of the present invention described below, the signal property descriptor is a color descriptor for the region. A region color may be represented in two different ways: the rendered image may show a constant color for the region, or the rendered image may show a color that varies linearly within the region. In the case of the constant color, no input function need be specified, and the region signal property descriptor indicates an actual color value. In the case of the linearly varying color in the region, the input function specifies that the color is a linear fit over the region, and the signal property descriptor indicates a three-by-three (3×3) matrix of parameters, from which the color of each rendered image location may be computed.

5. Producing an Image Structure Map from an Input Original Image

Image region boundaries may be obtained from a user, or from a process or operation. An automatic image segmentation operation may be used that analyzes original image definition data structure 10 and automatically determines image region boundary locations in original image 12. In the illustrated embodiment described below, the automatic image segmentation program is able to produce segmentations of the original image at different levels of detail that are controlled by a user of the operation.

Figure 9:
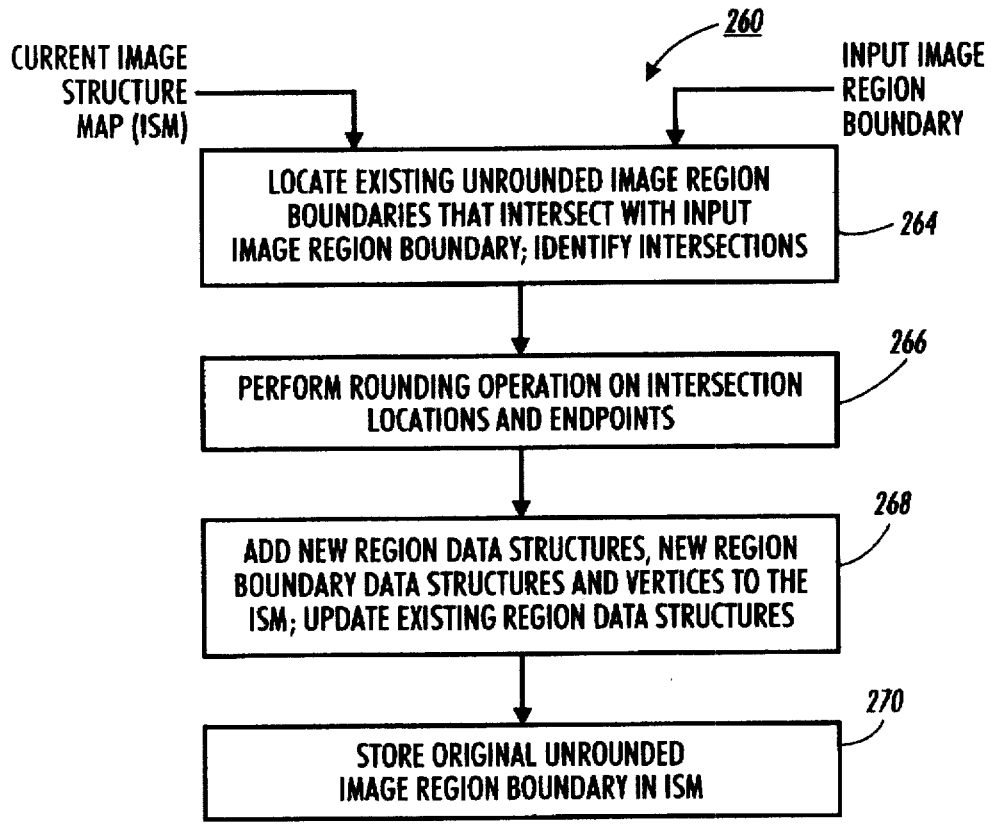
FIG. 9 is a flowchart illustrating the operation for constructing the image structure map data structure of the present invention.

The flowchart of FIG. 9 shows the broad functions of operation 260 for inserting an image region boundary into an existing ISM. In box 264, existing unrounded image region boundaries that intersect with input image region boundary are located, and intersection locations are identified. A rounding operation of the type illustrated in FIGS. 7 and 8 is performed, in box 266, on intersection locations and endpoints of the image region boundary being inserted. Inserting a new image region boundary may result in new regions being formed or the need to modify existing region boundary data structures as a result of creating new fragments; new region data structures, new region boundary data structures and vertices are added to the ISM, and existing region boundary data structures are updated as needed, in box 268. The original unrounded image region boundary is stored in the ISM, in box 270, so that it is available for determining intersection locations with subsequently inserted image region boundaries.

6. An Image Structure Map in the form of a trapezoidal decomposition.

Figure 10:
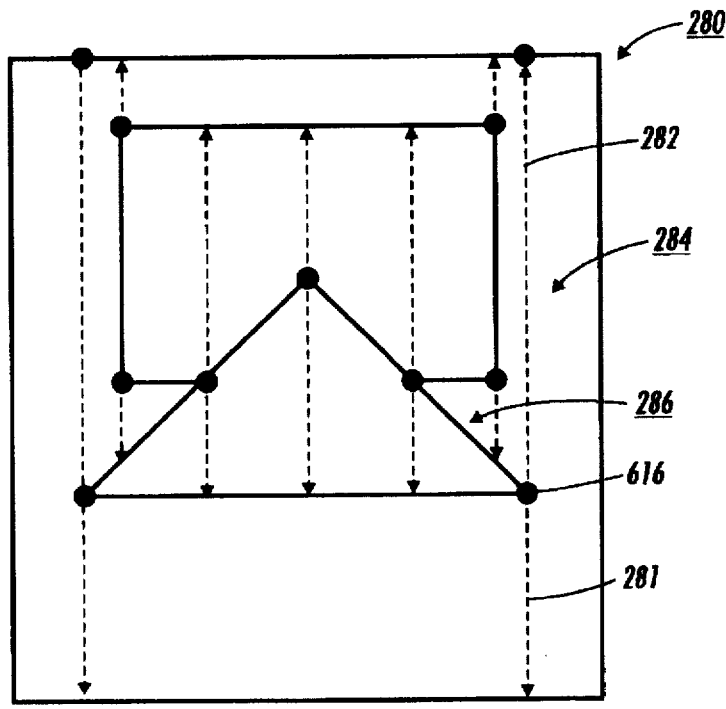
FIG. 10 is an image rendered from an image structure map representing the original image of FIG. 2 as a vertical cell decomposition.

FIG. 10 shows an image 280 rendered from an image structure map representation of original image 12 (FIG. 2) in which the ISM is a special type of partition known as a trapezoidal decomposition. Each of the three image regions has been further divided into smaller subregions called cells each having a standard geometric shape with a fixed or predetermined number of sides. Each of these cells is what is referred to as bounded complexity region. Any standard shape may be used. If the standard shape selected is a triangle, the partition is referred to as a triangulation. If the standard shape selected is a trapezoid, the partition is referred to as a trapezoidal decomposition. In FIG. 10, each cell is a trapezoid formed by adding boundaries called vertical attachments; this type of trapezoidal decomposition is a vertical cell decomposition in which most cells have four sides. Cell 284 is formed by adding vertical attachments 282 and 281 extending in opposite directions from vertex 616 until each reaches another image region boundary, in this case, the region boundaries that form the border of the image. In some cases, the cell is a triangle, a degenerate form of a trapezoid. Thus each cell in a vertical cell decomposition has at most three or four sides.

Representing an image as a trapezoidal decomposition provides certain performance efficiencies when inserting image region boundaries into the ISM. When an image region is represented in the ISM as a collection of cells, searching for an intersection location of a line segment with a side of an image region is performed in a fixed amount of time per cell searched for the intersection location. Thus, the trapezoidal decomposition provides a predictable level of efficiency for performing the search operation.

7. An image structure map as a compressed image representation.

An ISM can be stored in a file by storing the ursegments (the unrounded image region boundaries), the signal property descriptors, and some additional information to associate the signal property descriptor with its respective region in the ISM. To evaluate an ISM as a technique for compressing images, one computes the compression ratio, the ratio of the size of the image file to the size of the ISM file.

The compression ratio depends on a number of factors that include the level of detail in the image relative to the image's resolution, and how much of that detail is captured in the ISM. The detail in the image is a function of the number of image regions, and the length and the smoothness of the region boundaries, where the shorter and smoother the boundary, the fewer line segments required to represent them. How much of that detail is captured in the ISM depends on the automatic segmentation algorithm used, the parameters supplied to the automatic segmentation, and the amount of manual segmentation, if any, performed by a user after the automatic segmentation.

Figure 11:
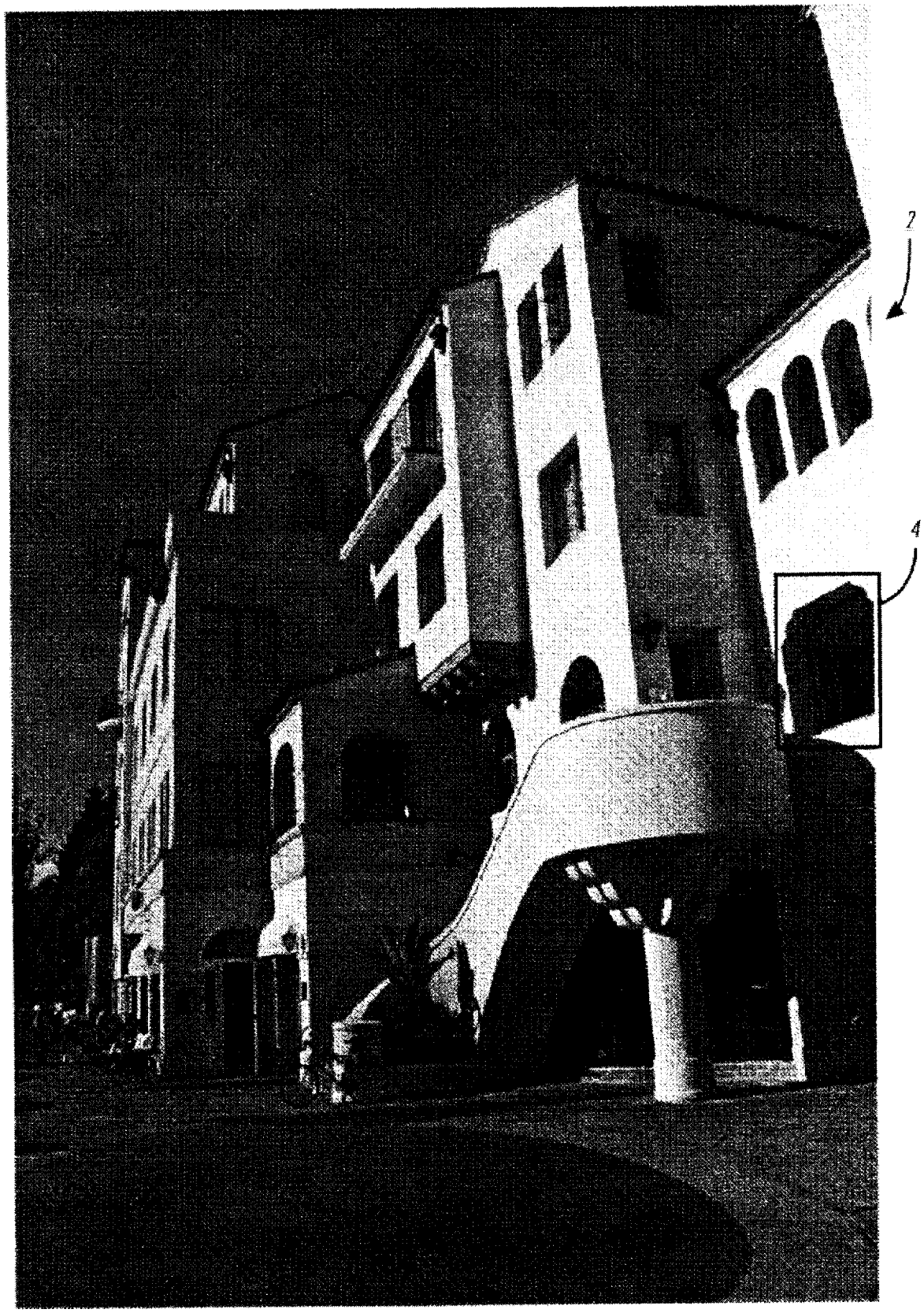
FIG. 11 illustrates an example of another original image that is suitable for representation as an image structure map according to the present invention.
Figure 12:
FIG. 12 illustrates an image rendered from the image structure map data structure representation of the image of FIG. 11, showing regions and region boundaries.

In the discussion of an illustrated embodiment that follows below, the photographic image 2 in FIG. 11 is used to illustrate the construction of an ISM. Image 2 has 512 by 768 pixels, with 24 bits per pixel of color information, and requires 1180 KB (kilobytes) to store. The image structure map representation of image 2 has 5969 ursegments and 1424 regions, which along with the information to associate the signal property descriptor, in this case a region color descriptor, with its respective region in the ISM, requires 187 KB to store. The compression ratio is therefore 6.3:1.

C. An Illustrated Embodiment of the Invention.

An embodiment of the ISM of the present invention has been implemented in software programs on a Silicon Graphics Indigo Elan computer running the Irix operating system, available from Silicon Graphics, Inc. (SGI) of Mountain View, Calif. The software programs implementing the invention are written in Allegro Common Lisp, a compiler for which is available from Franz Inc. of Berkeley, Calif.; the implementation uses the standard SGI Graphics Library supplied with the Irix operating system and a Common Lisp interface to the Graphics Library that Franz distributes. It will be apparent to those of skill in the art that a variety of programming languages and hardware configurations could readily be used in place of those in the illustrated embodiment based on the description herein without departing from the scope and intended utility of the present invention.

The description of this illustrated implementation presumes a knowledge of the fundamental principles of planar partition algorithms in general, and of algorithms for constructing trapezoidal decompositions in particular. One of many useful texts in this regard is *Computational Geometry: An introduction Through Randomized Algorithms*, by Ketan Mulmuley (Prentice-Hall, 1994). Several sections of that text discuss trapezoidal decompositions; several other sections of that text are useful as background; in particular, chapter 2 at pp. 29–35, 52–55, 58–66, and 78–96; chapter 3 at pp. 111–114 and 117–119; chapter 4 at pp. 126–135, 140–149, and 162–167; and chapter 5 at pp. 192–210 are all hereby incorporated herein by reference as if set out in full.

The present invention makes use of a method for dynamically producing a planar partition induced by a set of line segments, invented by the named inventors herein. While many of the details of this method are discussed below, additional information about this method may be found in Ser. No. 08/581,669, "Dynamic Computation of a Line Segment Arrangement Using Finite Precision Arithmetic." In addition, further information about this dynamic partition method may also be found in L. Guibas and D. Marimont, "Rounding Arrangements Dynamically," in *Proceedings of the 11th ACM Symposium on Computational Geometry* (SCG '95), Vancouver, B.C., June, 1995, which is hereby incorporated by reference herein as if set out in full.

1. Original and rendered images used in the illustrated implementation.

The present invention accepts a wide variety of digital images as an input original image. FIG. 11 shows image 2 which is a continuous tone image; the image definition data structure of image 2 was produced by using a film scanner to scan a film negative image to produce a digital image definition data structure in Kodak® PhotoCD format which was then stored on an optical storage medium. Other types of original image data include data from continuous-tone printed images captured by a scanning operation, or produced directly by a digital camera, or produced from hardware that digitizes image data from a video camera. Data indicating a synthetic, or computer-generated, image is also suitable as an original image. Printed halftone images may also be suitable, provided that a suitable blurring function can be applied to the image signals to produce smoothly varying signals in image regions.

Original image 2 of FIG. 11 indicates what may be referred to as a photorealistic, or natural, scene. While the image structure map of the present invention is particularly suited to representing natural images, the present invention is not limited to representing only natural images. Images that indicate other types of subject matter, such as those containing graphical objects, may also be suitable. For example, maps, engineering drawings, architectural renderings, scientific illustrations, presentation and business graphics, and digitized artwork are all types of images suitable for being represented as image structure maps.

FIG. 12 shows rendered image 24, a displayed image that is produced by a rendering operation using data from the image structure map data structure that represents the image. There are substantial visual similarities between rendered image 24 and image 2 of FIG. 11; the visual similarity between rendered image 24 and original image 2 is a dependent on the level of detail and accuracy of the region data that is included in the image structure map representation of the image. FIG. 12 shows the image regions only, and does not show the values of the signal property descriptors in the image regions. Rendered image 24 resembles a line drawing version of original image 2; it can be seen that this version of original image 2 shows the shapes of the regions and their relative positions to one another, conveying a great deal of information about original image 2.

Figure 13:
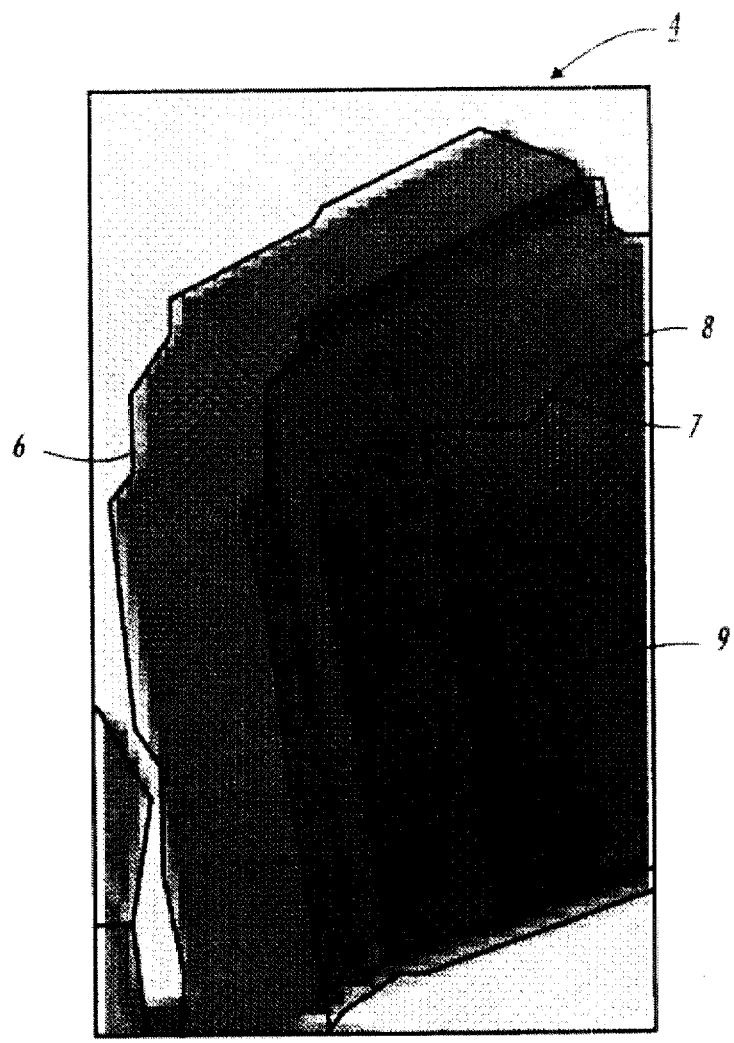
FIG. 13 illustrates a portion of the image of FIG. 11 that is used to illustrate features of the present invention.

FIG. 13 shows enlarged portion 4 of original image 2 of FIG. 11, the arched opening in the building in image 2, at the far right side. FIG. 14 shows rendered image 20, which is rendered from an image structure map data structure produced for original image 2, and which shows only the portion of the image structure map data structure that corresponds to original image portion 4. FIG. 14 shows several image regions, including regions 30, 32, 34, and 36. Rendered image 20 also shows portions of regions 38 and 40 which may have boundaries beyond the extent of rendered image 20 in FIG. 14. Regions 30, 32, 34, and 36 are shown with visible region boundaries, the thin line segments visible between the regions. For example, line segments 26, 27 and 28 are region boundaries. Rendered image 20 also shows regions 30, 32, 34, and 36 each having an interior region color, shown as a shade of gray in the figure, which indicates the signal property descriptor of the region.

The original image may also be displayed with image structures of the ISM rendered and superimposed on it. Image 4 of FIG. 13 shows the region boundaries between the regions found in the ISM data structure as thin line segments superimposed on original image portion 4 in image positions specified by the ISM. For example, image region boundaries 6 and 8 correspond to image region boundaries 26, 27 and 28 in FIG. 14. Close inspection of the region boundaries in image 4 show the shapes of regions 30, 32, 34, and 36, and show that these shapes correspond to color changes in original image 4.

2. Image structure map data structures of the illustrated embodiment of the invention.

The implemented embodiment of the present invention builds a partition data structure of the original image having the form of a vertical trapezoidal decomposition, also referred to as a vertical cell decomposition (VCD.) This data structure is built dynamically and incrementally, inserting one input region boundary into the partition at a time; the partition is capable of being edited after each insertion. The initial state of the partition of the original image, prior to the insertion of the first region boundary, consists of a set of four boundary ursegments with integral endpoints arranged in a rectangular boundary that represents the rectangular extents of an input original image as it would be printed or displayed. Each of these boundary ursegments has one fragment.

Figure 15:
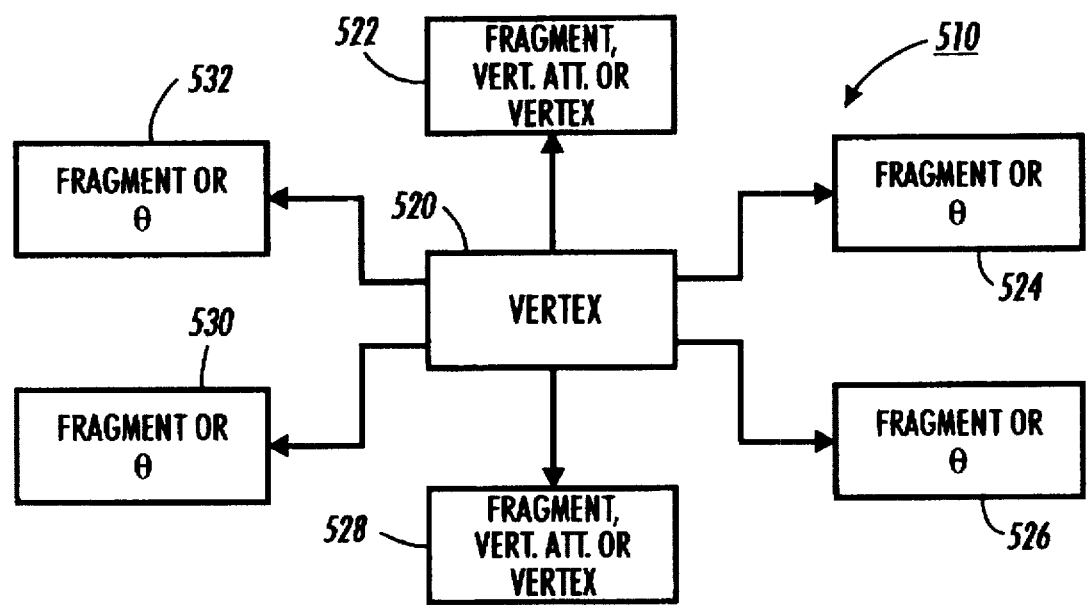
FIG. 15 schematically illustrates a vertex data structure that is part of the image structure map data structure representing the original image and produced according to the illustrated embodiment of the present invention.
Figure 16:
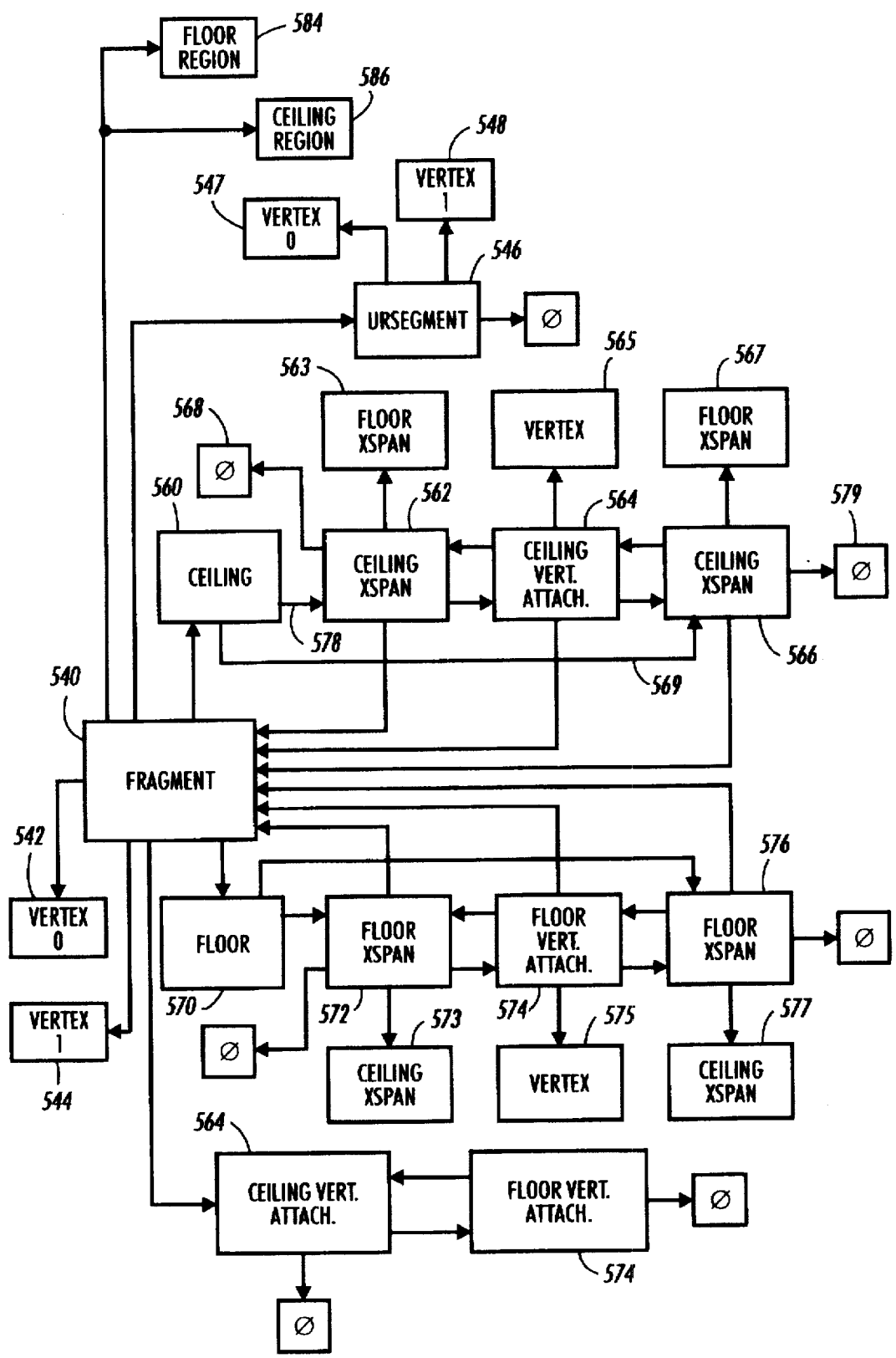
FIG. 16 schematically illustrates a representative fragment data structure that is part of the image structure map data structure representing the original image and produced according to the illustrated embodiment of the present invention.
Figure 17:
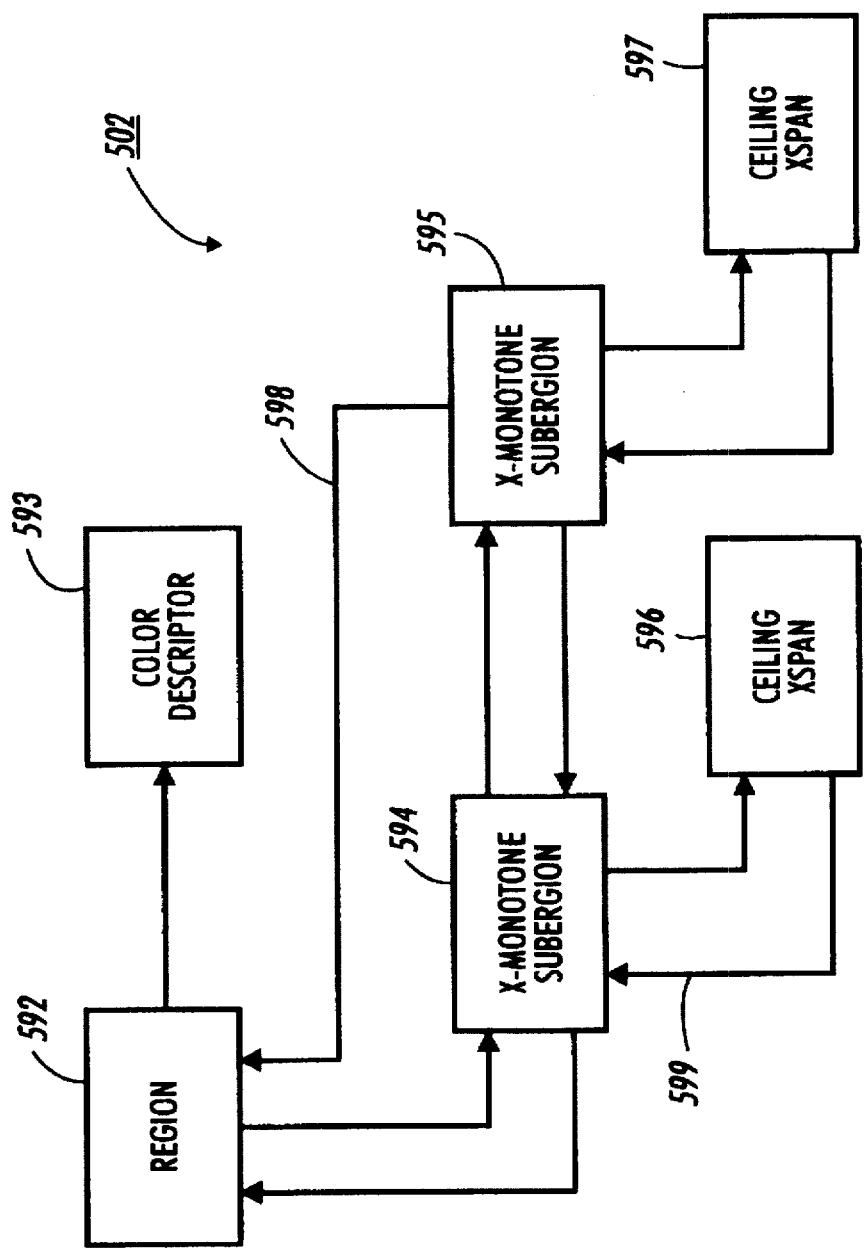
FIG. 17 schematically illustrates a representative region data structure that is part of the image structure map data structure representing the original image and produced according to the illustrated embodiment of the present invention.

FIGS. 15, 16 and 17 schematically illustrate three of the data structures that define an ISM in the form of a VCD produced according to the illustrated embodiment of the present invention. Data items in the data structure are represented by labeled boxes in the figures. Descriptions of these data structures are referenced to rendered image 60 of FIG. 18, which shows a rendered view of the image structure map data structure for original image portion 4 of FIG. 13. Note that the portion of vertical ursegment 61 shown in FIG. 18 forms the right vertical boundary of original image 2 (FIG. 11.) In rendered image 60, vertices are shown as filled circles, fragments are shown as solid black lines, and vertical attachments are shown as dashed lines with arrows. Note that each region in rendered image 60 is divided into a number of cells, each of which has parallel vertical sides, except for degenerate cells such as triangles. FIG. 15 shows the vertex data structure; each vertex in the original image is represented by a vertex data structure of the type shown in FIG. 15. FIG. 16 shows a representative fragment data structure for a nonvertical fragment; each of the nonvertical fragments that result from inserting and rounding an image region boundary from the original image is represented by a fragment data structure of the type shown in FIG. 16. FIG. 17 shows a representative region data structure for an image region in the original image; each region in the original image is represented by a region data structure of the type shown in FIG. 17. There is a third data structure, not shown in the figures, for representing information about a vertical attachment, and a separate data structure, also not shown for representing information about vertical fragments. In FIG. 18, rendered image 60 shows vertical attachments as dashed lines with a single arrow at one end, for a single vertical attachment, and arrows at both ends for a double vertical attachment. Examples of single vertical attachments illustrated in FIG. 18 include vertical attachments 70 and 71; an example of a double vertical attachment is identified by reference numeral 64. Fragment 73 is an example of a vertical fragment. The region, vertex, vertical and nonvertical fragment and vertical attachment data structures collectively represent the VCD of the original image that is built by the illustrated embodiment of the present invention. The entire image structure map data structure is accessed by a pointer to the left vertex of the bottom horizontal boundary ursegment.

a. The vertex data structure.

With reference to FIG. 15, vertex data structure 510 includes vertex location 520 of a vertex in the original image. Vertex 520 includes pointers to all other structures in the VCD that are adjacent to vertex 520, as shown by the arrows that point to boxes 522, 524, 526, 528, 530 and 532. The vertex pointers in the illustrated embodiment are defined according to the geometry of the partition, such that box 522 points to a fragment, vertical attachment or another vertex that is positioned vertically above vertex 520 in the partition, while box 528 points to a fragment, vertical attachment or another vertex that is positioned vertically below vertex 520 in the partition. Note that a vertex points to a vertical attachment when that vertical attachment is directed away from the vertex, represented by the arrowheads at the end of the vertical attachments shown in FIG. 18. When vertices are vertically aligned, each has a vertical attachment directed to the other, which form a double vertical attachment. Each vertex of the pair of vertically aligned vertices points to the other vertex in box 522 or box 528.

Boxes 524, 526, 532 and 530 indicate fragments in the partition that are adjacent to vertex 520. Box 524 indicates the top-most fragment of all fragments positioned to the right of vertex 520, while box 532 contains the top-most fragment of all fragments positioned to the left of vertex 520 in the partition, referred to as the top right and top left fragments. respectively. Similarly, boxes 526 and 530 indicate the bottom-most fragments in the partition that are positioned to the right and left, respectively, of vertex 520 in the partition, called the bottom right and bottom left fragments. Note that these data items indicate the relationship only of the positions of these fragments with respect to vertex 520 and to each other, and do not indicate any information related to the direction or angle of a fragment in the partition. There may be other fragments adjacent to vertex 520 in between the top and bottom fragments pointed to by vertex 520. These other fragments are located using a portion of the fragment data structure called the floor and ceiling lists, described in more detail below, since the ceiling list of the bottom fragment points to structures on the floor list of a fragment located above the bottom fragment, and thus these intermediate fragments can be located. Note that if there is only one fragment located to the right or to the left of a vertex, both top and bottom fragments point to the same fragment. Analogously, if no fragment is present at the right or left of a vertex, both top and bottom pointers are empty.

With reference to FIG. 18, vertex data structure 510 representing vertex 66 in the top right corner of rendered image 60 contains the location of vertex 66 in box 520; box 522 indicates a pointer to vertical attachment 63 (the top of which is not visible in rendered image 60,) and boxes 524 and 526 indicate a pointer to fragment 67. Vertical attachment 64 in FIG. 18 illustrates a double vertical attachment, and so box 528 indicates a pointer to vertex 65. Box 530 indicates fragment 68, and box 530 indicates fragment 69.

b. The fragment data structure.

With reference to FIG. 16, the fragment data structure indicates information about each nonvertical fragment 540 in the image structure map. Fragment data structures of the type shown in FIG. 16 are examples of an implementation of region boundary data structure 508 in FIG. 1. Fragment 540 points to the endpoints of the fragment, shown as left vertex 542 (labeled Vertex 0) and right vertex 542 (labeled Vertex 1). Nonvertical fragments typically have a sequence of structures above and below them, which are represented with two doubly linked lists called the "ceiling" (for the structures above) and "floor" (for those below) lists of the fragment. In addition to facilitating vertical motion from a nonvertical fragment, the ceiling and floor lists make it easy to move horizontally along the fragment. Nonvertical fragments 67, 68 and 69 in the upper right corner of rendered image 60 of FIG. 18, and nonvertical fragment 92 in the center of rendered image 60 of FIG. 18 are examples of the type of nonvertical fragments that are represented by the fragment data structure shown in FIG. 16. Fragment 72 in particular is a representative fragment that is stored in the fragment data structure illustrated in FIG. 16. In order to illustrate the image structures associated with fragment 72 in more detail, a portion of rendered image 60 in FIG. 18 is reproduced in FIG. 19 and includes nonvertical fragment 72 extending from left vertex 74 to right vertex 75 and its associated structures.

Figure 19:
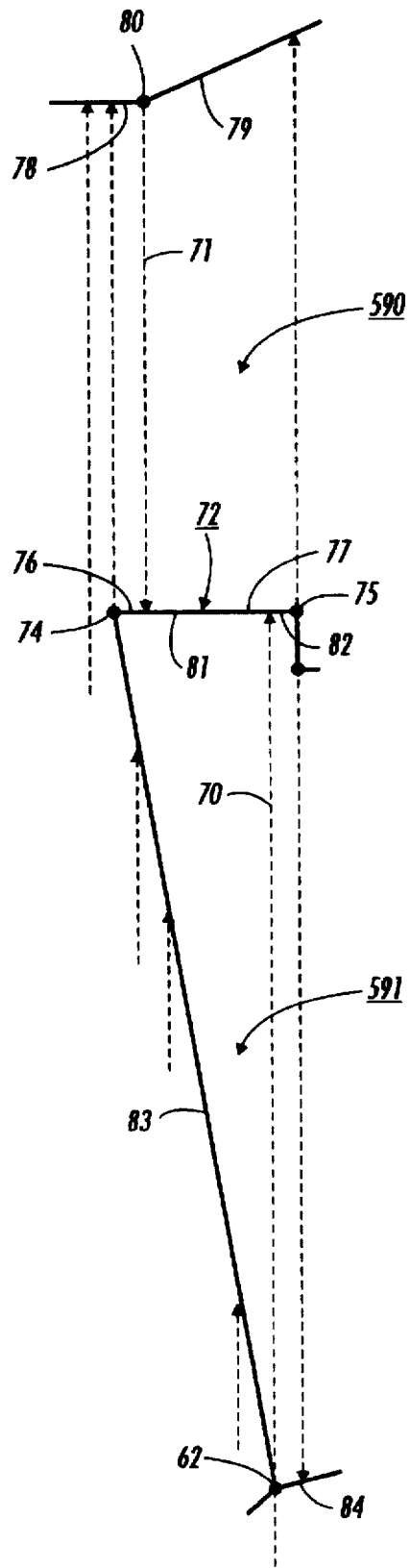
FIG. 19 is a portion of the vertical cell decomposition illustrated in FIG. 18, illustrating structures in the vertical cell decomposition that are included in the fragment data structure of FIG. 16.

A vertical attachment that is directed to a fragment defines a portion of the interval in x occupied by the fragment. This portions of the fragment in x is represented by a structure called an "xspan". When an xspan occurs as a structure above the fragment, it is called a "ceiling xspan;" similarly, when an xspan occurs as a structure below the fragment, it is called a "floor xspan." Each trapezoid in the VCD is bounded below by a ceiling xspan (belonging to the fragment at the bottom of the trapezoid) and above by a floor xspan (belonging to the fragment at the top of the trapezoid). For example, trapezoid 590 in FIG. 19 is bounded below by the second ceiling xspan 77 of fragment 72, and above by the first floor xspan 79 of the fragment that begins at vertex 80 and extends out of FIG. 19. The floor and ceiling xspans that bound a trapezoid point to each other, which makes it possible to move vertically across a trapezoid.

The locations of the xspan structures are stored in data structures referred to as ceiling lists and floor lists. FIG. 16 illustrates ceiling list 560 and floor list 570 of representative nonvertical fragment 540. Each of the ceiling and floor lists in a fragment data structure includes an xspan, followed by zero or more sequences of a vertical attachment followed by an xspan divide the remainder of the fragment. Each of the ceiling list 560 and floor list 570 in the fragment data structure of FIG. 16 are illustrated to include an xspan 562 or 572, followed by one sequence of a vertical attachment 564 or 574 followed by an xspan 566 and 576. The doubly-linked structure of the ceiling and floor lists is illustrated in the ceiling list by arrows 578 and 569, pointing to the head and tail of the lists, respectively, and by empty list items 568 and 579 at the end of each list path. Ceiling xspan 562 bounds the bottom of a trapezoid in the VCD and points to the floor xspan 563 that bounds the top of that trapezoid. Ceiling vertical attachment 564 points to the vertex data structure 565 from which ceiling vertical attachment 564 extends. Floor list 570 is organized in an analogous manner.

FIG. 19 in conjunction with FIG. 16 shows fragment 72 in more detail, and illustrates with a specific example the data contained in the ceiling list 560 and floor list 570 (FIG. 16) of a fragment. The structures on the top, or ceiling, of fragment 72 in FIG. 19 include ceiling xspan 76, followed by ceiling vertical attachment 71, followed by ceiling xspan 77. In the fragment data structure 540 of FIG. 16 for fragment 72, ceiling list 560 will include these structures as ceiling xspan 562, ceiling vertical attachment 564, and ceiling xspan 566, respectively. In addition, in FIG. 19 it can be seen that the structure opposite and above ceiling xspan 76 is floor xspan 78; ceiling vertical attachment 71 extends down from vertex 80; and the structure opposite and above second ceiling xspan 77 is floor xspan 79. Ceiling list 560 in the fragment data structure 540 of FIG. 16 for fragment 72 will also include these structures as floor xspan 563, vertex 565 and floor xspan 567, respectively, such that ceiling xspan 76 points to floor xspan 78, ceiling vertical attachment 71 points to vertex 80, and second ceiling xspan 77 points to floor xspan 79.

Similarly, the floor list 570 of fragment 72 in FIG. 19 is constructed in an analogous manner using the structures shown on the bottom, or floor, of fragment 72. These structures include floor xspan 81, followed by floor vertical attachment 70, followed by floor xspan 82. In the fragment data structure 540 of FIG. 16 for fragment 72, floor list 570 will include these structures as floor xspan 572, floor vertical attachment 574, and floor xspan 576, respectively. In addition, in FIG. 19 it can be seen that the structure opposite and below floor xspan 81 is ceiling xspan 83; floor vertical attachment 70 extends up from vertex 62; and the structure opposite and below second floor xspan 82 is ceiling xspan 84. Floor list 570 in the fragment data structure 540 of FIG. 16 for fragment 72 will also include these structures as ceiling xspan 573, vertex 575 and ceiling xspan 577, respectively, so that floor xspan 81 points to ceiling xspan 83, floor vertical attachment 70 points to vertex 62, and floor xspan 82 points to ceiling xspan 84. Note that ceiling xspan 83 is actually a complete fragment since cell 591 bounded by fragments 72 and 83 and vertical attachment 70 has the shape of a triangle and has only one vertical side.

In order to locate regions quickly from a fragment data structure, fragment data structure 540 in FIG. 16 also points to the regions above and below the fragment, in floor region pointer 584 and in ceiling region pointer 586. In the case of fragment 72 in FIGS. 18 and 19, it can be seen from FIG. 14 that fragment 72 is an image region boundary between region 32 above and region 34 below.

Two other linked lists are maintained with each fragment in the fragment data structure: a vertical attachment list and an ursegment list. To cross from the floor of a nonvertical fragment to its ceiling (or vice versa), fragment 540 points to a doubly linked list consisting of all vertical attachments on the floor and ceiling lists. In FIG. 16, a representative vertical attachment list shows ceiling vertical attachment 564 and floor vertical attachment 574 on this list; these correspond to vertical attachments 71 and 70 in FIG. 19.

Because rounding can cause two or more ursegments to share the same fragment, each fragment may be part of more than one ursegment; each fragment maintains a list of ursegments that it represents. Extensive experimentation has shown that these lists rarely have more than five ursegments. An ursegment points to the vertices at its endpoints. Fragment 67 in FIG. 18 may be an example of a fragment that belongs to two original image region boundaries.

c. The region data structure.

FIG. 17 illustrates region data structure 502 of the illustrated implementation of image structure map data structure 500 (FIG. 1) of the present invention. Region structure 592 points to color descriptor 593, which is the signal property descriptor for a region in the illustrated implementation. A color descriptors is either a single color, representing a constant fill color for the region when the image is rendered from the ISM, or the color descriptor is a 3×3 matrix of parameters, which produces a color that linearly varies in intensity within the region. Region structure 592 points to a list of structures called x-monotone subregions. FIG. 17 shows region structure 592 pointing to two x-monotone subregions 594 and 595. Each x-monotone subregion points to its containing region, as illustrated in FIG. 17 by arrow 598, and to a list of ceiling xspans, ordered by ascending x-coordinate, which represent the bottom xspans of the cells in the subregion. FIG. 17 shows each x-monotone subregion 594 and 595 pointing to a single ceiling xspan 596 and 597, respectively. Each xspan in turn has a pointer to the subregion that contains it, as illustrated by arrow 599.

Figure 20:
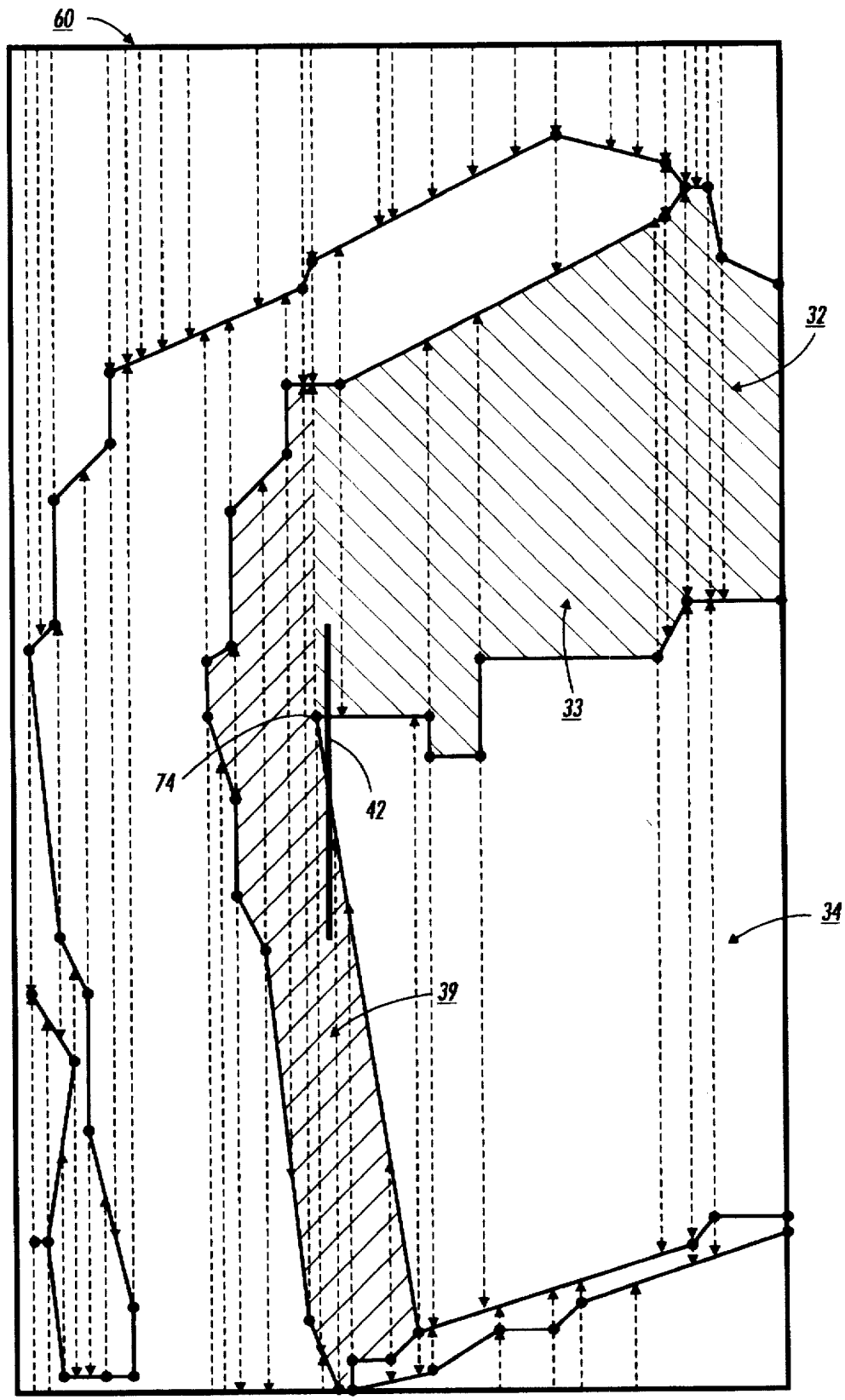
FIG. 20 is the rendered image of FIG. 18 illustrating the concept of an x-monotone subregion of an image region that is part of the region data structure illustrated in FIG. 17.

Each x-monotone subregion has the property that any intersection of the subregion with a vertical line is a single vertical line segment, or the empty set. X-monotone subregions divide the region, and each subregion's cells further divide the subregion, so the union of cells in all of a region's subregions divide the region. FIG. 20 illustrates the concept of an x-monotone subregion. FIG. 20 illustrates rendered image 60 (first shown in FIG. 18) with image region 32 shown in heavy outline and with two types of cross-hatching. Region 32 surrounds region 34 above and to the left. Region 32 is an example of an image region with two x-monotone subregions. It can be seen that the intersection of vertical line 42 with the region 32 results in two line segments, and so the intersection is neither a single vertical line segment, nor the empty set. This means that region 32 cannot be a single x-monotone subregion, and must be divided. At all x positions at or to the left of vertex 74, and at all x positions to the right of vertex 74, the intersection of vertical line 42 with the respective portion of region 32 is a single vertical line segment, and thus vertex 74 and its associated vertical attachment mark the dividing line between the two subregions 33 and 39, which are shown with differt diagonal cross-hatching.

d. Other data structures.

The two data structures not shown, the vertical attachment data structure and the vertical fragment data structure, are organized as follows. A vertical attachment data structure, such as ceiling vertical attachment 564 of FIG. 16, indicates its originating vertex, whether it is a ceiling or a floor vertical attachment, and the fragment with which it is associated. A vertical fragment data structure, indicates its vertices and a list of the ursegments that it represents. Fragment 73 in the center of rendered image 60 of FIG. 18 would be represented in the ISM by a vertical fragment data structure.

3. Image Structure Map Operations

Figure 21:
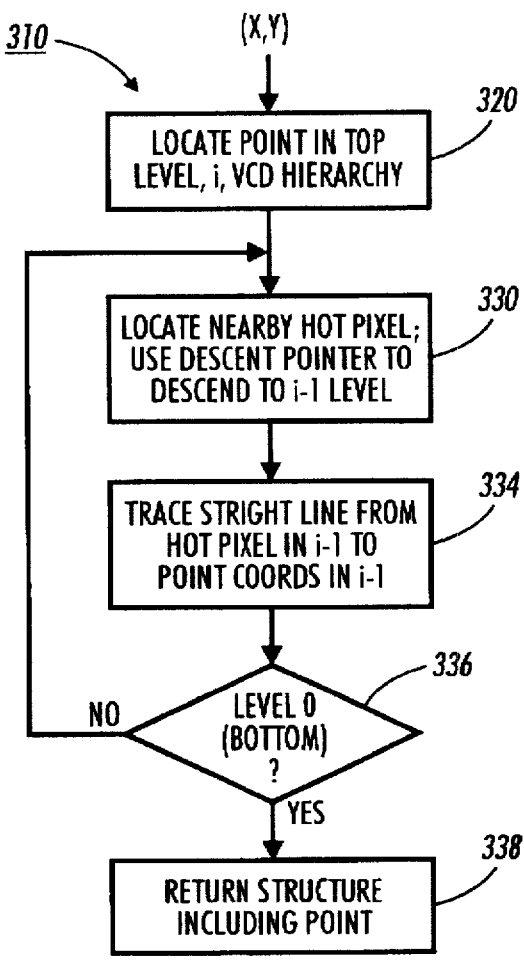
FIG. 21 is a flowchart showing the process for locating a point in the hierarchical image structure map data structure according to an illustrated embodiment of the present invention.
Figure 22:
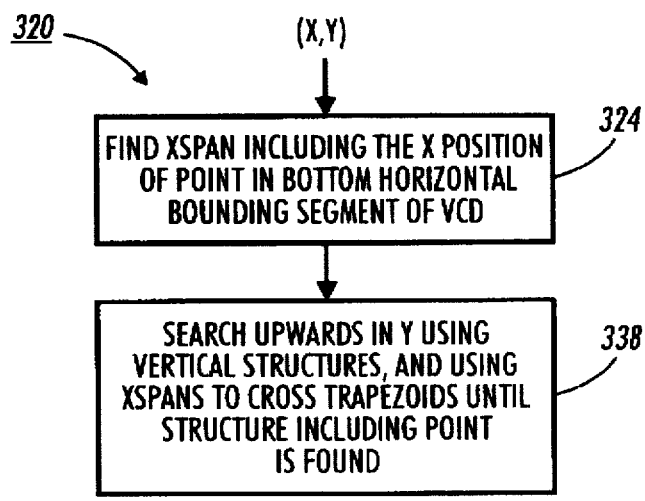
FIG. 22 is a flowchart illustrating point location in a single level of the image structure map data structure according to an illustrated embodiment of the present invention.
Figure 27:
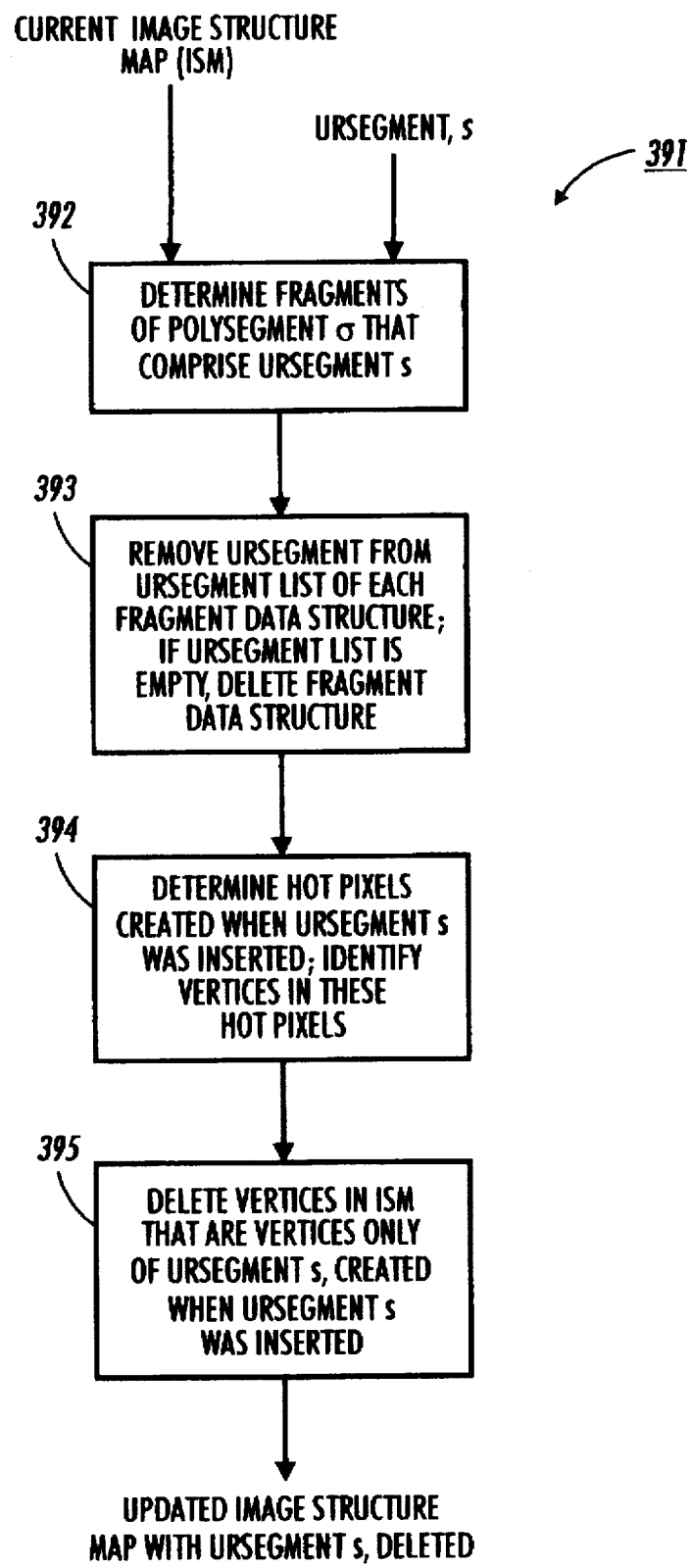
FIG. 27 is a flowchart showing the processing operations for deleting a line segment from the image structure map according to an illustrated implementation of the present invention.
Figure 28:
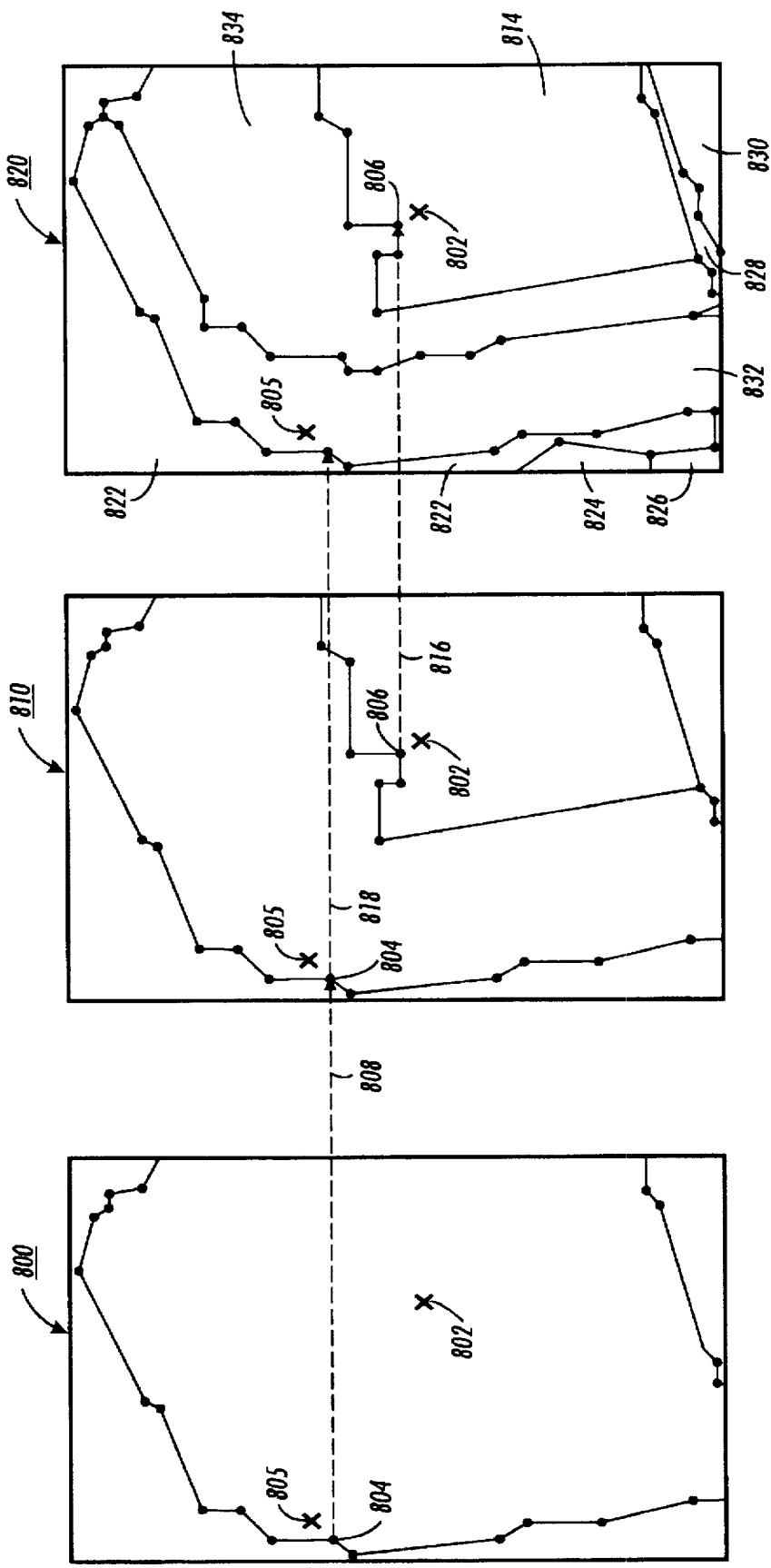
FIG. 28 shows a sequence of three images rendered from an image structure map data structure that schematically illustrates an image structure map hierarchy according to an illustrated implementation of the present invention.

The discussion now turns to a description of implementations of several image structure map operations, using the image structure map data structure illustrated in FIGS. 15, 16 and 17. Specifically, an implementation of a point location operation is illustrated in FIGS. 21 and 22; an implementation of an image region boundary insertion operation is illustrated in FIGS. 23, 24, 25 and 26; and an implementation of an image boundary deletion operation is illustrated in FIG. 27. The description of these operations reference an image structure map data structure hierarchy. The illustrated embodiment of the image structure map of the present invention produces a hierarchy of vertical cell decompositions of the image, where the lowest level (level zero) contains all the ursegments, and each successively higher level contains a subset of the ursegments present one level down. An example of an image structure map hierarchy is shown in FIG. 28, and the organization of the hierarchy is discussed in more detail below in the discussion accompanying FIG. 28.

a. Point location.

The data structures of the ISM make it easy to move both vertically and horizontally in an ISM. Moving vertically from a vertex, vertical fragment, or vertical attachment is straightforward because each can have only one structure above and one below. Movement both vertically and horizontally is facilitated by the xspan structures. FIG. 21 is a flowchart showing point location 400 for locating a point in the ISM data structure hierarchy; FIG. 22 illustrates point location in a single level. The point location operation illustrates how the data structures representing the ISM are used.

A point in the image may be located at a vertex, at a position on a fragment, at a position on a single or double vertical attachment, or in the interior of a trapezoid. Point location operation 400 takes as input a set of x, y coordinates that define a point in the coordinate system of the ISM; this point could have been provided as an image location in either the rendered or original image, and transformed to the coordinate system of the ISM prior to the calling of point location operation 400. Point location operation 400 returns a vertex if the point is at a vertex, a floor and ceiling list entry that includes the point if the point is on a fragment, a vertical attachment if the point is on a vertical attachment, and, if the point is in the interior of a trapezoid, the ceiling (bottom) xspan of the trapezoid. Point location operation 400 may also be implemented to return a region.

With reference to FIG. 21, to locate a point at the bottom (most detailed) level of the hierarchy of the vertical cell decompositions that comprise the ISM, first locate it in the top (least detailed) VCD in the hierarchy, say at level i, in box 410. FIG. 22 shows a technique for locating a point in a level of the hierarchy in the illustrated embodiment. First, in box 414, the xspan containing the x coordinate of the point is found by linearly searching the ceiling list of the horizontal fragment that defines the bottom of the ISM's bounding rectangle. Then, in box 418, an upward search in y is carried out, using the vertical structures in the ISM (i.e., the vertices, vertical attachments and vertical fragments) and using xspans to cross trapezoids, until the image structure that contains the point is found.

Returning to FIG. 21, once the structure containing the point is found, a nearby vertex, which by definition is in a hot pixel, is found next, in box 420 using the image structure found by technique 410 and that structure's pointers; this nearby hot pixel is never more than a pointer or two away, because every cell has at least two hot pixels on its boundary. The descent pointer of the nearby hot pixel is then used in the box 420, to locate the corresponding hot pixel in the ISM one level down, at level i-1. To locate the point from a vertex (in a hot pixel) at level i-1, a straight line is traced through the ISM from the hot pixel to the point, in box 424. The current level is tested, in box 426, to see if the bottom level of the hierarchy of partitions has been reached; if so, the structure that includes the point can be found using the pointers in the vertex data structure and the coordinates of the traced line, and this structure is then returned, in box 428. If the bottom level has not yet been reached, steps 420 and 424 are repeated until the bottom level of the hierarchy has been reached. Point location within an ISM hierarchy is illustrated in the discussion accompanying FIG. 28.

b. Inserting ursegments in the illustrated embodiment of the present invention.

As noted earlier, the image structure map data structure of the present invention is designed and implemented to support dynamic updating of the image structures included in the data structure. Dynamic updating requires that image region boundaries be able to be inserted in and deleted from the ISM in an incremental manner, without the need to know a priori all of the image region boundaries that will ultimately be included in the ISM; this in turn requires that insertion and deletion operations 240 and 250, respectively, of FIG. 3, be implemented as dynamic operations.

Figure 23:
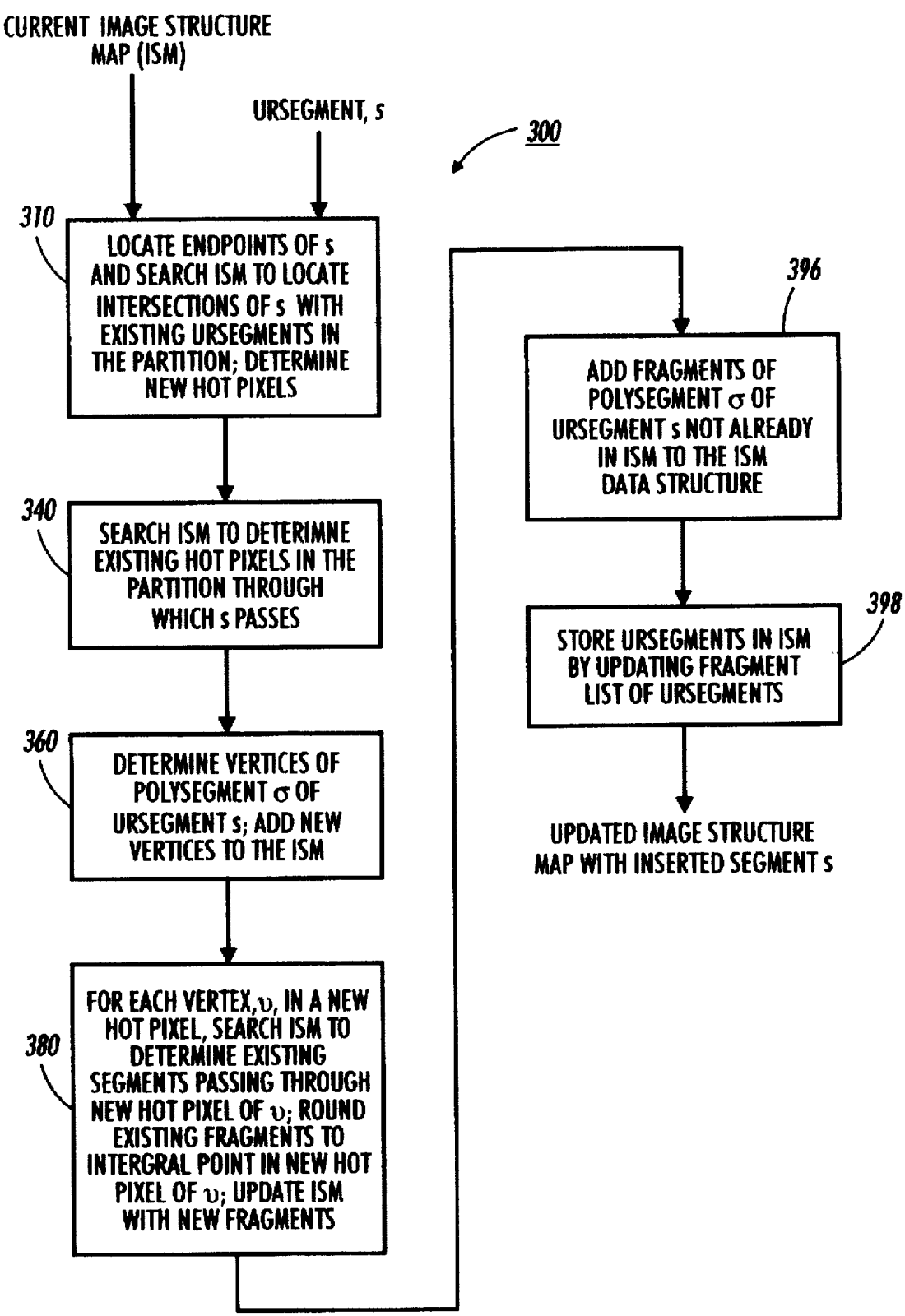
FIG. 23 is a flowchart illustrating the operation of inserting an image region boundary into the image structure map according to an illustrated embodiment of the present invention.

FIG. 23 illustrates operation 300 for inserting an unrounded line segment s into the image structure map data structure according to the illustrated embodiment of the present invention. Insertion operation 300 involves two general concepts: first, the polysegment, σ, of s and all of its fragments must be determined so that fragment data structures of the type illustrated in FIG. 16 can be inserted into the image structure map data structure. Secondly, the insertion of s creates new hot pixels through which pass existing ursegments stored in the ISM; to complete the insertion of s according to the rounding operation rules of the illustrated embodiment, these existing ursegments must be rounded to the integral points of the respective new hot pixels through which they pass.

The illustrated embodiment of the present invention uses three different searches in the image structure map data structure to accomplish insertion. Two of these searches, in boxes 310 and 340 of FIG. 23, locate the new and existing hot pixels that new ursegment s passes through. Ursegment s is rounded to the integral points of these new and existing hot pixels, creating vertices on s. The polysegment σ of s is defined by the vertices of the new and existing hot pixels found in these two searches. Once the vertices of σ are known, they are added to the ISM, in box 360.

Existing ursegments may pass through the new hot pixels created by inserting ursegment s into the ISM data structure. For each vertex, v, of a new hot pixel, the search in box 380 locates the existing ursegments that pass through v's new hot pixel and perturbs the fragments of these ursegments to the integral point of the new hot pixel of v. The new fragments that result from this rounding are identified and new fragment data structures for the new fragments are added to the ISM. For a fragment that is already in the ISM data structure, only the ursegment it represents is required to be add to the existing fragment's list of ursegments.

Then, in box 396, those fragments of the polysegment σ of s not already in the ISM are added to the ISM, in box 396. These new fragment data structures have the new ursegment s as the only member of the fragment's list of ursegments. By the topological consistency properties of the rounding operation of the illustrated embodiment, these fragments intersect no others, which makes the insertion straightforward. For a fragment of σ that is already in the image structure map data structure, only the new ursegment is required to be add to the existing fragment's list of ursegments. Storing ursegments in the ISM, in box 398, simply requires adding the ursegment to the appropriate fragment's list of ursegments.

Figure 24:
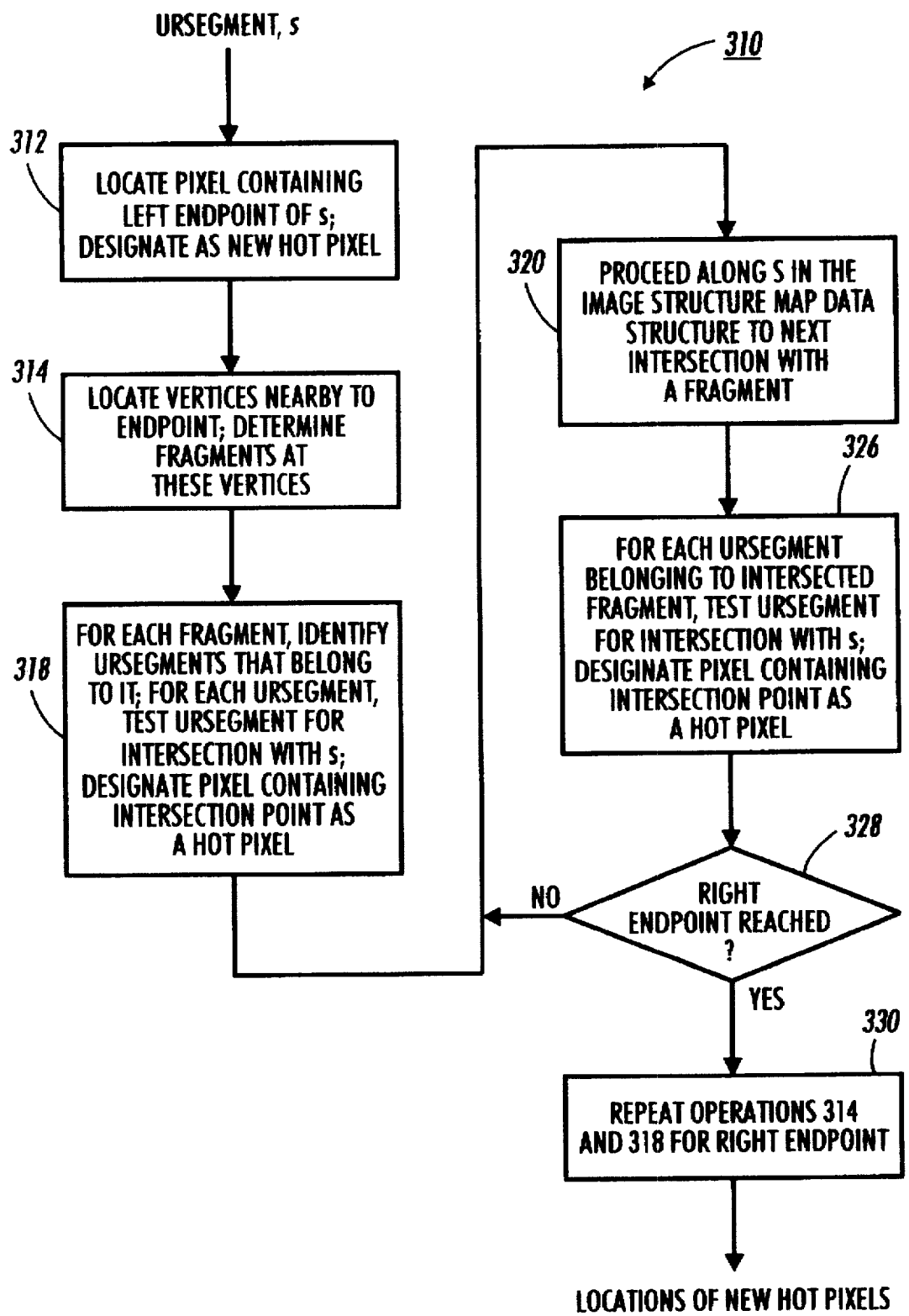
FIG. 24 is a flowchart illustrating one of the searches of the image structure map data structure illustrated in FIG. 23 to locate new hot pixels created by a newly inserted region boundary, according to an illustrated embodiment of the present invention.
Figure 25:
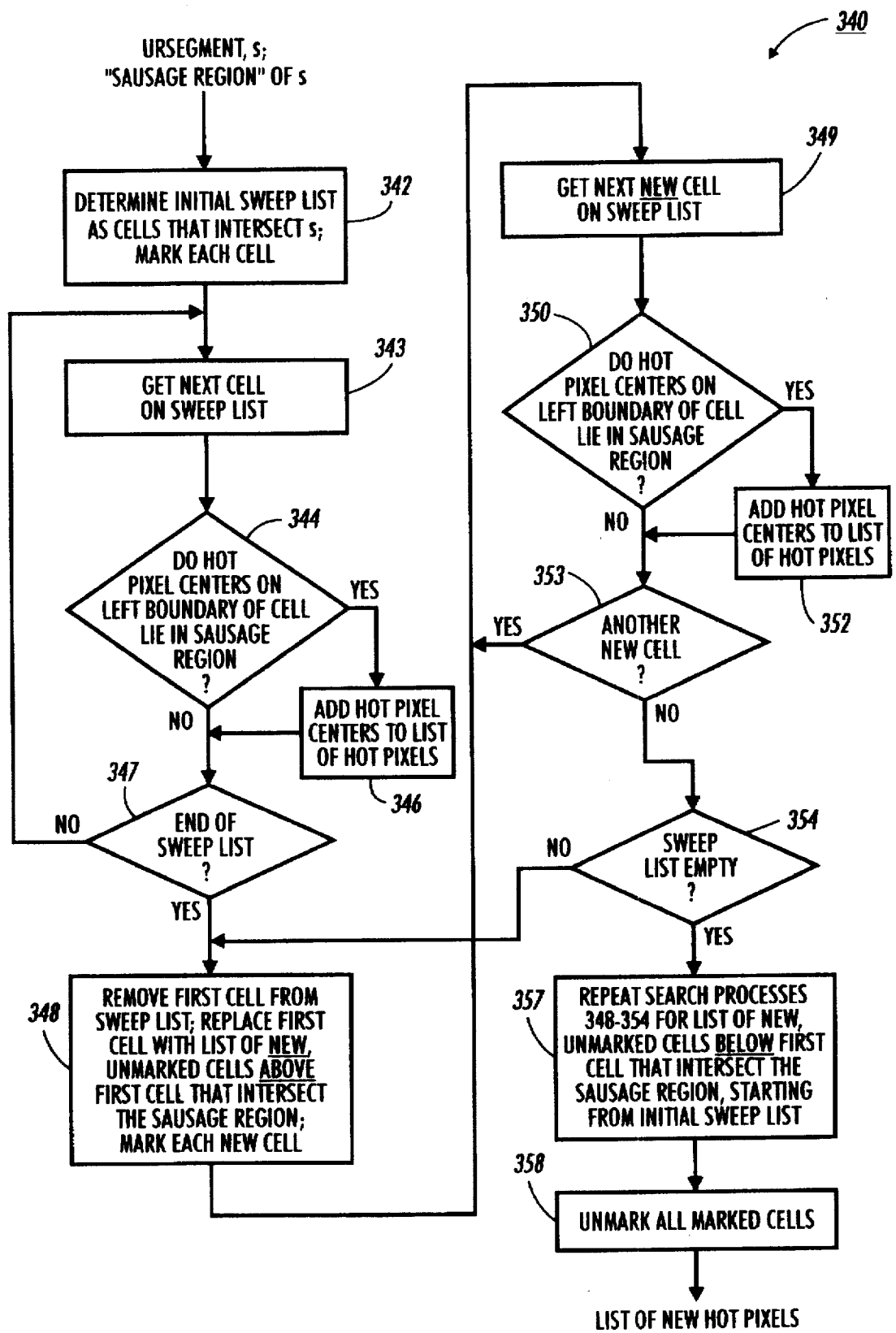
FIG. 25 is a flowchart illustrating another one of the searches of the image structure map data structure illustrated in FIG. 23 to locate existing hot pixels through which a newly inserted region boundary passes, according to an illustrated embodiment of the present invention.
Figure 26:
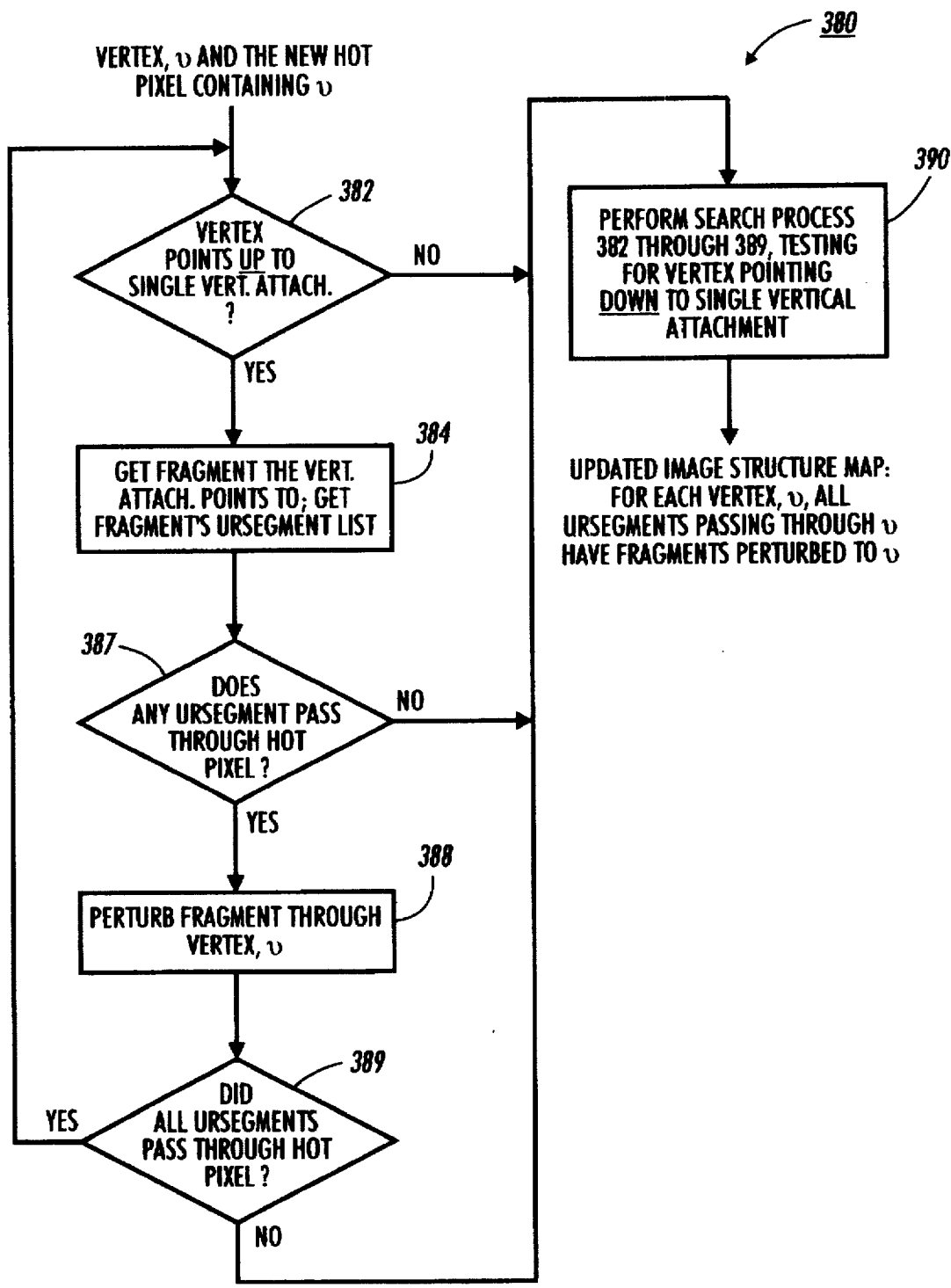
FIG. 26 is a flowchart illustrating a third search process shown in FIG. 23 through the image structure map data structure to find existing region boundaries that pass through new hot pixels, according to an illustrated embodiment of the present invention.

The discussion now turns to a description of each of these searches, which are illustrated in FIGS. 24–26.

i. Image structure map traversal for locating the ursegments that intersect new ursegment s.

With reference now to FIG. 24, search 310, called "VCD traversal," produces a list of the locations of the new hot pixels in the ISM that result from the endpoints of s and from the ursegments that intersect s. The VCD traversal starts in the ISM at the location of the left endpoint of s, in box 312. This pixel is designated as a new hot pixel. Then, the vertices near the left endpoint are located, and the fragments near each of these vertices are determined, in box 314. For each fragment, the ursegments that belong to it are identified, in box 318; for each ursegment identified, the ursegment is tested for an intersection with s, and each pixel containing an intersection is designated as a new hot pixel. Next, s is followed through the image structure map data structure to its next intersection with a fragment, in box 320. When s intersects a fragment, each ursegment belonging to the intersected fragment is tested, in box 326, for an intersection with s, and the pixel containing the intersection point is designated as a new hot pixel. A test is then made in box 328 to see if the right endpoint of the new ursegment has been reached. If it has not, the VCD traversal continues to the next intersection of s with a fragment, in box 320. If the right endpoint has been reached, the pixel containing the right endpoint is designated as a new hot pixel, and the endpoint operations in boxes 314 and 318 are repeated, in box 330. The new hot pixels are those containing the endpoints of s and its intersections with existing ursegments.

ii. The cell sweep search.

The operations of the second of the three searches, referred to as the "cell sweep search," are illustrated in FIG. 25; search 340 locates existing hot pixels through which s passes. First, a small region surrounding the length of ursegment s is defined as a search area; if an existing hot pixel is within this search area, the new ursegment s being inserted is required to be rounded to the integral point of that hot pixel by the rounding scheme. This search area is referred to as the "sausage region "of s, and is defined to be the Minkowski sum of s with a pixel centered at the origin. Search 340 is based on the following premises: If s passes through a hot pixel, the vertex at the pixel's center must lie in the sausage region of s. If a cell intersects the sausage region, the vertices contained in the cell may lie inside the sausage region. To find the hot pixels through which s passes, therefore, each cell that intersects the sausage region must be tested to determine whether the vertices that lie on the cell boundary are inside the sausage region. The search is carried out in the upward direction to the top of the sausage region, and then in the downward direction to the bottom of the sausage region.

With reference now to FIG. 25, the input to the cell sweep search 340 is the new ursegment s being inserted, and the sausage region of s. First, the cells that intersect s are determined, in box 342; these cells make up the initial sweep list, and each cell on this initial sweep list is marked to show that it has been searched. For the next cell on the sweep list (this is the first cell the first time through) obtained in box 343, the cell is tested, in box 344, to determine whether the hot pixel centers on the left boundary of the cell lies in the sausage region. If so, the hot pixel centers is added to the list of existing hot pixels through which s passes, in box 346, and control passes to the test in box 347. If the hot pixel centers on the left boundary of the cell does not lie in the sausage region, a test is made, in box 347, to determine whether the end of the initial sweep list has been reached. If not, control passes to box 343 to get the next cell on the sweep list; each cell on the initial sweep list is processed in the same manner, in boxes 344, 346 and 347 until the end of the initial sweep list is reached.

Next, in box 348, the upward part of the cell sweep begins; the first cell is removed from the sweep list, and replaced with a list of new, unmarked cells that lie vertically above the first cell and that intersect with the sausage region. If this first cell is called cell i, then for cell j to be above cell i, part of cell j's bottom boundary must coincide with part of cell i's top boundary. Note, however, that cells that are completely outside the sausage region are excluded from the sweep list. Note also that if there are no new cells to be added to the sweep list because none meet the criteria for adding, then the cell that is now the current first cell on the sweep list is removed and replaced with a list of new, unmarked cells that lie vertically above this current first cell and that intersect with the sausage region; thus, the cell sweep, in addition to sweeping up and down, is sweeping horizontally, along the ursegment s until all the cells that intersect s are processed.

Also in box 348, each of the new cells just added to the sweep list is marked. Then the cell testing operations are made, in boxes 349, 350, 352 and 353 until all of these new cells have been tested. When all of these new cells have been tested, a test is made in box 354 to determine if the sweep list is empty. If not, control returns to box 348, when the current first cell on the sweep list is removed, and replaced with a list of new, unmarked cells above the first cell that intersect with the sausage region, and this new set of cells is tested in the same manner. Thus, first cells are removed and replaced with cells above, if there are any, until the sweep list is empty.

Then, the downward part of the cell sweep begins, in box 357; it is entirely analogous to the upward cell sweep. At the conclusion of the downward cell sweep, marked cells are all unmarked, in box 358, and the list of hot pixels found in the search is returned. These are the existing hot pixels through which s passes, and, together with the new hot pixels that contain the vertices of the endpoints and intersections of s, they are used to determine the polysegment σ of s. The cost of the cell sweep is proportional to the number of cells that intersect the sausage region of s.

iii. The image structure map range search.

The VCD traversal search 310 (FIG. 24) produces a list of all of the vertices in the new hot pixels of s. These vertices may be conveniently used to find existing ursegments that pass through each new hot pixel. The search to find these existing ursegments is called a "vertical range search" and is illustrated in the flowchart of FIG. 26 as search 380. Search 380 takes as input a vertex v of a new hot pixel of s, and thus is repeated for each such new vertex. Search 380 is also divided into an upward and downward search in the ISM. For the upward search, the input vertex v is tested, in box 382, to determine whether it points up to a single vertical attachment. If not, the upward portion of the search is complete, and control passes to the downward search, in box 390. If vertex v does point up to a single vertical attachment, the fragment that the vertical attachment points to is obtained, in box 384, and the ursegment list pointed to by that fragment is obtained.

The ursegments on the fragment's list are then tested, in box 387, to determine whether any one of the ursegments passes through the hot pixel of v. If any one does, the ursegment's fragment is perturbed to pass through v. Note that one of the consequences of perturbing this fragment is, of course, to divide it into two fragments; another consequence is that the vertical attachment that pointed to that fragment collapses, and there is now a vertical attachment extending up from the new vertex to the fragment above the one that was just perturbed. The ursegments for the fragment being tested is checked, in box 389, to see if all ursegments passed through the hot pixel. If so, this means that there is a new vertical attachment that may point up to another fragment that passes through the hot pixel of v; thus, control passes back to the text in box 382 to determine if there is such a vertical attachment. If at least one of the ursegments on the fragment list did not pass through the hot pixel of v, the upward search is complete, and control passes to the downward search, in box 390.

When it is determined, in box 387, that none of ursegments of the fragment being tested pass through the hot pixel of v, the upward search is complete, and control thus transfers to the downward search, in box 390.

Downward search 390 is completely analogous to the upward search illustrated in boxes 382 through 389 in FIG. 26. Completion of the upward and downward searches for existing ursegments that pass through a new hot pixels of a vertex v of s produces an updated ISM where the existing ursegments found have fragments rounded to v.

iv. Inserting an ursegment in the image structure map hierarchy.

A new ursegment is inserted into the l bottom-most levels of the hierarchy, where l is computed independently for each ursegment and equals the number of trials of flipping a coin until tails is obtained. To insert the ursegment, locate an endpoint at all levels of the hierarchy as above, and then insert the ursegment at the bottom-most l levels independently using insertion operation 300 of FIG. 23. At each level, the descent pointers of the ursegment and of any new vertices created by the insertion are linked to the corresponding ursegments and vertices one level down.

c. Deleting ursegments in the illustrated embodiment of the present invention.

An ursegment is deleted from the hierarchy of vertical cell decompositions that comprise the ISM by deleting it independently from each level. FIG. 27 illustrates the basic processes of implementation 391 of deletion operation 250 of FIG. 3. Deletion operation 391 takes as input an ursegment s that is to be deleted from an existing ISM, and the current ISM. Since ursegment s is represented in the ISM as a polysegment, which shall be referred to as polysegment a, the first process in the deletion operation is to determine the fragments that comprise polysegment σ of the ursegment that is to be deleted, in box 392. Those fragment data structures that are not included in any other ursegment are then deleted from the ISM, in box 393, by removing s from each fragment data structure's list of ursegments. When an ursegment list of a fragment data structure becomes empty, no existing ursegment stored in the ISM makes use of this fragment any longer, so the fragment data structure itself can then be deleted.

Certain fragments and vertices of existing ursegments were created when those ursegments passed through the hot pixels of ursegment s when s was originally added to the ISM; thus, the hot pixels created when s was added to the ISM need to be determined, in box 394; the vertices of σ in these new hot pixels are deleted from the ISM, in box 395, if their inclusion in the ISM is the result solely of s having ended or intersected another ursegment in the pixel when s was added to the ISM. Determining these vertices can be decided efficiently by using the order in which the ursegments enter or leave each pixel determined to be a new hot pixel of s. Collectively, these deletion operations leave the ISM in the state in which it would have been had s never been inserted.

4. The data structure hierarchy.

The image structure map of the present invention includes an auxiliary data structure that provides for efficient spatial indexing of the original image, to facilitate point location. As already noted above, the illustrated embodiment of the image structure map of the present invention includes a hierarchy of vertical cell decompositions (VCDs) of the image, where the lowest level (level zero) contains all ursegments determined to be included in the original image, and each successively higher level contains a subset of the ursegments that are present one level down. Adjacent levels are linked through their hot pixels and ursegments; each hot pixel or ursegment at level i has a "descent" pointer down to the corresponding hot pixel or ursegment at level i-1. Hot pixels and ursegments are the structures chosen to link VCDs at adjacent levels because, unlike either fragments or vertical attachments, hot pixels and ursegments form a strict hierarchy: once a hot pixel or ursegment appears at a level, it must appear at all lower levels. Note that the entire hierarchy is accessed by a single pointer to the left vertex of the bottom horizontal ursegment in the top (zero) level of the hierarchy.

FIG. 28 schematically illustrates the concept of the image structure map hierarchy using a sequence of three images rendered from an ISM that represents portion 4 shown in FIG. 13 of image 2 shown in FIG. 11. The vertical attachments and shading indicating the value of the region color descriptors have been omitted from these images to simplify the illustration. Image 800 illustrates the highest level of the hierarchy, referred to as level 2, showing a selection of image boundary fragments. The partition at level 2 includes vertex and region boundary data structures that provide the topology and geometry for the image boundary fragments represented there. Each hot pixel at level 2 has a "descent" pointer down to the corresponding hot pixel at level 1, illustrated by a single descent pointer represented as dashed line 808. Similarly, image 810 illustrates the middle level of the hierarchy, referred to as level 1, showing a larger number of image boundary fragments. The partition at level 1 includes all the vertex and region boundary data structures for representing the topology and geometry of these image boundary fragments, and also has "descent" pointers down to corresponding hot pixels at level 0, illustrated by descent pointers represented as dashed lines 816 and 818. Image 820 illustrates the lowest level of the hierarchy, referred to as level 0 and representing the most detailed level, showing still more image boundary fragments that form all of the known image regions in this portion of the partition of the original image. The partition at level 0 includes all of the data structures for each of these regions, including the highest level region data structures. Note that region data structures need not be represented at higher levels of the hierarchy, and are not represented in the illustrated embodiment.

The hierarchy of VCDs is randomized in the sense that the number of levels of the hierarchy in which a given ursegment appears is determined randomly. That is, each ursegment appears in the bottom N levels of the hierarchy, where N is computed by simulating tossing a coin until the coin comes up tails; N is the number of coin tosses required. As a consequence, the expected number of ursegments at each level is twice that of the next higher level. The highest level typically contains only a few ursegments.

Alternative methods for determining the number of levels at which an ursegment appears could take into account the ursegment's length, position, proximity to existing ursegments, or other aspects of the distribution of existing ursegments in the hierarchy of VCDs. The point of taking into account these other factors would be to increase the efficiency of the algorithm for point location, which uses the hierarchy. These alternative methods could be completely deterministic, or could have have a random component in addition to the other factors.

With reference to FIG. 28, point location is accomplished by tracing a point through the hierarchy starting at the coarsest level and proceeding successively through the levels by doing a local, inexpensive search, also referred to as a bounded search, to locate the same point at each finer level. To identify the region in the image structure map represented by the images in FIG. 28 that contains a point in original image 2 (FIG. 11) having image coordinates that transform to point 805 in FIG. 28, ISM level 800 is searched first to locate an image structure that contains point 805. Locating an image structure means locating the fragment, vertex or vertical attachment point 805 is on, or the cell point 805 is in, using the standard point location operation 400, described above in the discussion accompanying FIGS. 21 and 22. Point location operation 400 returns a vertex if the point is at a vertex, a floor and ceiling list entry that includes the point if the point is on a fragment, a vertical attachment if the point is on a vertical attachment, and, if the point is in the interior of a trapezoid, the ceiling (bottom) xspan of the trapezoid. The local search at level 2 proceeds as follows: the xspan containing the x coordinate of point 805 is found by linearly searching the ceiling list of the horizontal fragment that defines the bottom of the ISM's bounding rectangle. Then, an upward search in y is carried out, using the vertical structures in the ISM (i.e., the vertices, vertical attachments and vertical fragments) and using xspans to cross trapezoids, until the structure that contains point 805 is found. Once the structure containing point 805 is found, a nearby vertex 804, which by definition is in a hot pixel, is found next, using the structure and its pointers; as noted earlier, this nearby hot pixel is never more than a pointer or two away, because every cell has at least two hot pixels on its boundary. The descent pointer of the vertex 804 is then used to locate the corresponding hot pixel in the ISM one level down, at level 810. To locate point 805 from a vertex (in a hot pixel) at level 810, a straight line is traced through the structures of the ISM from the hot pixel to point 805. Then the steps of locating the structure point 805 is in and one of the vertices of that structure are repeated, and the descent pointer is used to descend to bottom level 820. The image structure that includes point 805 can be found at level 820 by repeating the same search strategy as used for level 810 and by using the pointers in the vertex data structure and the coordinates of the traced line; this search results in returning region 832 as the region in which point 805 is contained. The process for locating the region containing a point in original image 2 having image coordinates that transform to point 802 in the ISM represented by the images in FIG. 28 is exactly the same.

5. Automatic image segmentation as a source of input image region boundaries.

The illustrated implementation of the present invention uses automatic image segmentation software to locate image region boundaries in an original input image definition data structure. This software is called MegaWave2, and is available by license for research purposes from Ceremade. URA CNRS 749 de l'Universite Paris-IX Dauphine, 75775 Paris cedex 16, France, and carries a copyright for the preprocessor of ©1988–1994 Jacques Froment, Paris-IX Dauphine University, and a copyright for the software modules of ©1993–1994 Jacques Froment and Sylvain Parrino, Paris-IX Dauphine University.

MegaWave2 includes a collection of image processing algorithms described as C functions that operate without any assumption about the context in which the modules are executed. A MegaWave2 compiler is comprised of a MegaWave2 preprocessor followed by a standard C compiler that creates from a module a run time command, a function of a library or a function to be run under a window-oriented interpreter. The licensed software includes the source code of the modules, the system libraries (object code only), the preprocessor (in executable form), documentation, and some utilities. The libraries and preprocessor are available for Hewlett Packard HP-UX A.09 and Sun Microsystems Sparc SunOS 4.1. machine architectures and operating systems.

MegaWave2 includes a module that implements the color image segmentation algorithm described in G. Koepfler, C. Lopez and J.M. Morel, in "A Multiscale Algorithm for Image Segmentation by Variational Method," *Journal of Numerical Analysis of the Society of Industrial and Applied Mathematics*, Vol. 31, No. 1, Feb. 1994, pp. 282–299. This paper, which is briefly described above, is hereby incorporated by reference herein as if set out in full.

The color image segmentation software provided by MegaWave2 takes as input a color image, the number of regions desired for the segmentation, and three weights on the RGB components of the image that are used to compute an error measure. The software searches for the minimum of an objective function that takes into account the error in the constant color approximation to the color image and the length of the boundaries between the regions, with a goal toward keeping the error and length as small as possible. Each pixel in the input (original) image is initially assigned to its own region; the regions are then merged. Each pair of neighboring regions is a candidate for merging; a pair is merged when its contribution to the objective function is smaller than that of any other pair. Merging continues until the total number of regions is less than or equal to the number requested. The boundaries of these regions are then written to a file. The boundaries are actually the edges between the pixels, so they include many short segments and "staircases." In the illustrated implementation described herein, the MegaWave2 color image segmentation module was modified to accept more image formats, and so that it would write out the region boundaries in a more convenient form.

The output of the image segmentation performed by MegaWave2 produces a list of vertices that make up the polygonal arcs that form the region boundaries in the image. The edges specified by this output is somewhat simplified before it is provided as individual line segments to the insertion operation illustrated in FIGS. 23–26 to create an ISM for the original image. Simplification can be accomplished by any one of a number of known methods. In one embodiment, the output directly provided by the color image segmentation software is inserted into an ISM for purposes of refining it. The rendering operation of the present invention makes it possible to render an image of the image structure map data, from which it possible to detect small rectangular regions that are only a pixel high or wide. These regions are removed, and the line segments that remain are collected an "arc" at a time. An arc is a collection of line segments for which all interior vertices are of degree two (where the degree of the vertex is the number of line segments that end there) and the vertices at the two ends of the arc are not of degree two. Each arc is segmented into a smaller number of line segments by the method of recursive subdivision. This method finds the vertex that lies the greatest distance from the line through the arc's endpoints; if the distance is below a threshold (one pixel in this case), the output is a segment that has the arc's endpoints. Otherwise the arc is divided into two at that vertex, and each piece of the arc is segmented the same way. The output is an arc of line segments between the vertices at which a subdivision occurred. No vertex on the subdivided arc is further away from the original arc than the threshold. The subdivided arcs are the line segments used as input to the dynamic insertion operation described in FIGS. 23–26 that create the ISM. In another implementation, line segments are simplified using a shortest path algorithm.

D. The Software Product of the Invention.

Figure 29:
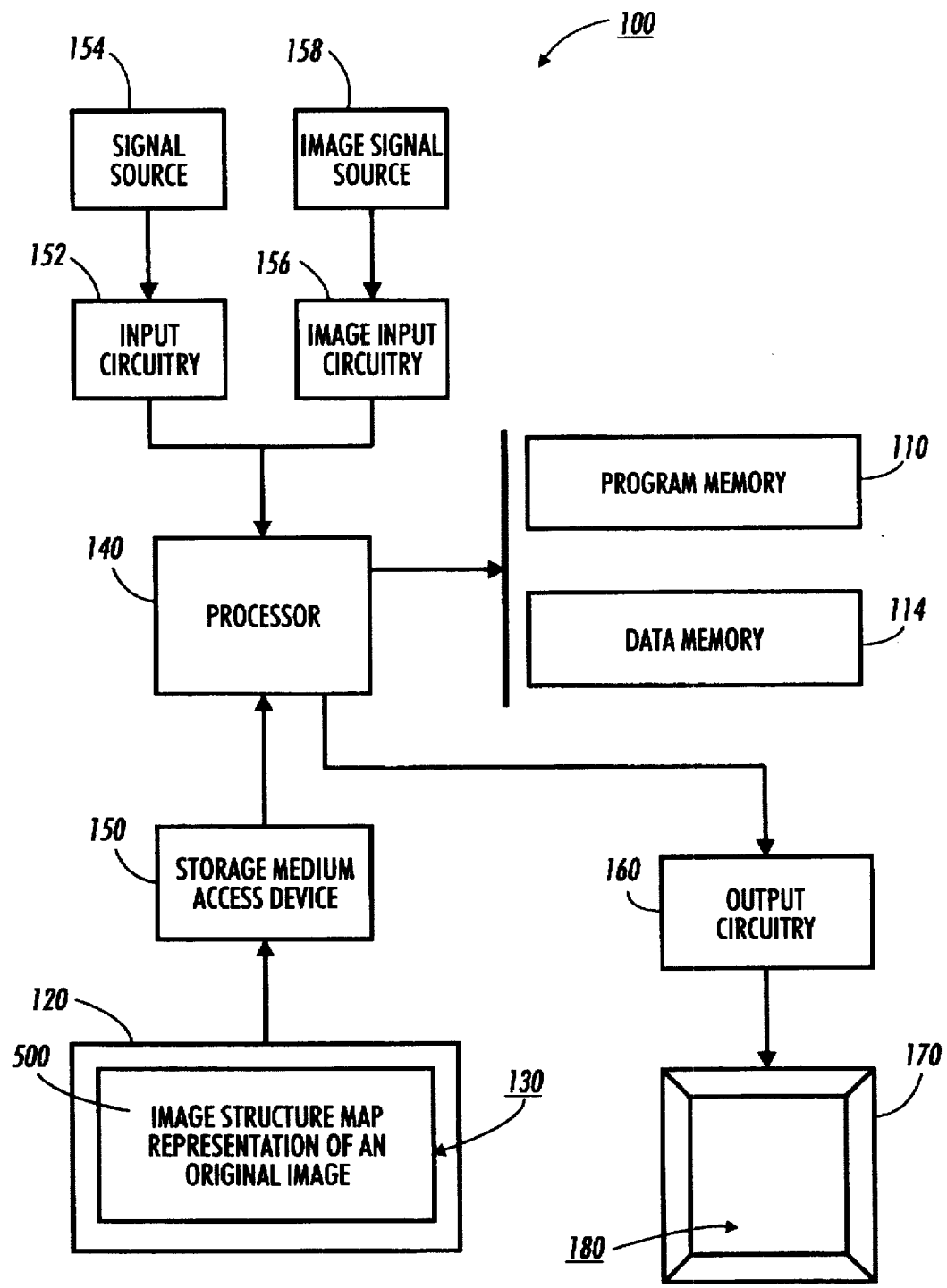
FIG. 29 is a simplified block diagram illustrating a machine in which the present invention may be used, and a data structure product of the present invention.

FIG. 29 is a block diagram of a generalized, processor-controlled machine 100. The image structure map of the present invention may be used in any machine having the common components, characteristics, and configuration of machine 100 illustrated in FIG. 29. For example, machine 100 may be a general purpose computer, a special purpose computer optimized for the types of operations performed by the present invention, or a combination of a general purpose computer and auxiliary special purpose hardware.

Machine 100 may, but need not, include input circuitry 152 for receiving signals from a signal source 154. Signal source 154 may include any signal producing source that produces signals of the type needed by the present invention. Such sources include user interaction devices controllable by a human user that produce signals in response to actions by the user, such as a pointing device or a keyboard. Another type of user interaction device is a stylus device that the user moves over a special data collecting surface, which might be display area 180 of device 170. Machine 100 may, but need not, include device 170, a conventional display device capable of presenting images. Machine 100 could also include a device called an electronic tablet, that is capable of presenting images and producing input signals captured from a user interaction input device that interacts with images on the display or tablet. Such an interaction device has circuitry (not shown) for controlling the interaction between the user and display features of images presented in the display area 180 of device 170. For example, a pointing device (not shown) may have buttons which, when clicked or released, result in signals being sent through input circuitry 152, or the pointing device may include a pressure sensitive tip switch (not shown) which results in signals being sent through input circuitry 152 when the user presses the tip switch against data collecting surface and display area 180 when making gestures. Alternatively, signal source 154 may be an operation (not shown) that processor 140 is executing that provides input signals of the type required for processor 140 to construct an image structure map according to the present invention. These input signals are forwarded via input input circuitry 152 to processor 140 and may be stored in data memory 114.

Machine 100 also includes image input circuitry 156 which receives signals defining an original image definition data structure from an image signal source 158. Image signal source 158 may be any image capture device, such as a scanning device, a digital camera, or an interface device that produces a digital image definition data structure from another type of image signal.

Processor 140 operates by accessing program memory 110 to retrieve instructions, which it then executes. When the machine is of the type that constructs an ISM from an original image, program memory 110 includes image structure map instructions 260 that implement the functions shown in flowchart 260 of FIG. 9, or will include instructions that implement the embodiment of the invention described in the flowcharts of FIGS. 21 through 27. Program memory 110 includes instructions for any subroutines needed to construct the ISM according to instructions 260. During execution of the instructions, processor 140 may access data memory 114 to obtain or store data necessary for performing its operations. Data memory 114 stores a local copy of the image structure map data structure 500 which would include the vertex data structures 520 of the type shown in FIG. 15, the fragment data structures 540 of the type shown in FIG. 16, and the region data structure 502 of the type shown in FIG. 17. Data memory 114 may also store original image definition data structure 10 and input image region boundary data received as input from a user or from an automatic segmentation operation. Data memory 114 also stores various other miscellaneous data, including, for example, the list of new hot pixels produced by operation 310 of FIG. 24 when machine 100 constructs an ISM according to the illustrated embodiment shown in FIGS. 21 through 27.

The actual manner in which the physical components of machine 100 are connected may vary, and may include hardwired physical connections between some or all of the components, as well as connections over wired or wireless communications facilities, such as through remote or local communications networks and infrared and radio connections. Program memory 110 or data memory 114, for example, may include memory that is physically connected to processor 140 as local memory, or that is remotely accessible to processor 140 by means of a wired or wireless communications facility.

FIG. 29 also shows data structure product 120, an article of manufacture that can be used in a machine that includes components like those included in machine 100. Data structure product 120 includes data storage medium 130 that can be accessed by storage medium access device 150. Data storage medium 130 stores an image structure map representation of an original image that has the data structure organization illustrated in FIG. 1, or in the illustrated embodiment shown in FIGS. 15, 16 and 17.

Data structure product 120 may be commercially available to a consumer in the form of a shrink-wrap package that includes data storage medium 130 and appropriate documentation describing the product. In that case, a data storage medium is a physical medium that can store data. Examples of data storage media include magnetic media such as floppy disks, diskettes and PC cards (also known as PCMCIA memory cards), optical media such as CD-ROMs, and semiconductor media such as semiconductor ROMs and RAMs. As used herein, "storage medium" covers one or more distinct units of a medium that together store a body of data. For example, a set of disks storing a single body of data would be a storage medium. A "storage medium access device" is a device with circuitry that can access data on a data storage medium. Examples of storage medium access devices include disk drives and CD-ROM readers.

Data structure product 120 may also be stored on a remotely-located storage device, such as a server, and may be commercially or otherwise available to a user in the form of a data stream indicating an image structure map representation of an image that is transmitted to the consumer over a communications facility from the remotely-located storage device. In the latter case, article 120 and data storage medium 130 are embodied in physical form as the remotely-located storage device; the consumer purchases or access a copy of the contents of data storage medium 130 containing an image structure map representation of an image, but typically does not purchase or acquire any rights in the actual remotely-located storage device. When data structure product 120 is provided in the form of a data stream transmitted to the consumer over a communications facility from the remotely-located storage device, the data stream is stored in some suitable local memory device of machine 100, which might be data memory 114, or a data storage medium locally accessible to machine 100 (not shown), which would then be accessible using storage medium access device 150.

Data storage medium 130 may also store instruction data (not shown) which is provided to processor 140 for execution when the image structure map of the present invention is to be used. For example, the stored data may include data indicating dynamic image structure map insertion instructions; when these instructions are provided to processor 140, and processor 140 executes them, the machine is operated to perform the operations for inserting an image region boundary into the image structure map data structure, as represented in boxes 264, 266, 268 and 270 in FIG. 9; if the image structure map is constructed according to the illustrated embodiment of the invention, dynamic image structure map insertion instructions perform the operations illustrated in the flowcharts of FIGS. 21–27.

The stored data may further include data indicating image segmentation instructions for automatically determining image region boundaries in an original image; when these instructions are provided to processor 140, and processor 140 executes them, the machine is operated to perform the operations for automatically segmenting the original image definition data structure into regions indicating a smoothly varying signal and producing image region boundary data; if and ISM is constructed according to the illustrated embodiment of the invention, then the image segmentation instructions automatically segment an original image into regions of constant color.

The stored instruction data may further provide functionality for interacting with the image represented by the ISM. In that case, the stored data may include data indicating input signal receiving instructions for receiving interaction request signals from a user; when these instructions are provided to processor 140, and processor 140 executes them, the machine is operated to perform operations for identifying the input signal requests, and for invoking a suitable operation in response.

The image structure map of the present invention provides an efficient and flexible image representation that accurately, compactly and explicitly represents the geometry, topology and signal properties of regions in an original image. The ISM includes, for each region in the original image, a region data structure that indicates the adjacent region boundary data items that form the region and a signal property descriptor indicating the value of signals computed for or assigned to the region. Region boundary data items represent image region boundaries that are determined to occur in the original image as a result of analyzing signal properties of original image locations. Vertices have machine representable values resulting from modifying infinite precision vertex values using a rounding operation that mathematically ensures topological and geometric consistency with the original image. A hierarchy of partitions of varying levels of detail allow for efficient and accurate spatial indexing of image regions. The ISM permits dynamic modification so that individual changes may be made without recomputing the entire ISM.

While the invention has been described in conjunction with a specific embodiment, this description is not intended to limit the invention in any way. Accordingly, the invention as described herein is intended to embrace all modifications and variations that are apparent to those skilled in the art and that fall within the scope of the appended claims.

What is claimed:

1. A data structure stored on a storage medium capable of being accessed and read by a processor-controlled machine; the data structure, referred to as an image structure map, representing an original image definition data structure, hereafter referred to as an original image, including image regions each having a topology and a geometry with respect to neighboring image regions; the machine including storage medium access circuitry for accessing and reading the image structure map data structure stored in the storage medium; the machine further including a processor connected for accessing instruction data for operating the machine; the image structure map data structure comprising:

a plurality of region data items; each region data item representing a respective one of a plurality of image regions in the original image; each image region formed by a set of image region boundaries determined to be included in the original image;

a signal property descriptor indicated by each region data item; the signal property descriptor having a value indicating a smoothly varying function of signals indicated by locations in the respective image region of the original image;

a plurality of region boundary data items indicated by each respective region data item indicating all adjacent image region boundaries forming the image region represented by the respective region data item;

a plurality of vertex data items each indicating a vertex location, wherein a vertex location refers to an endpoint location of a respective one of the image region boundaries or an intersection location between two image region boundaries;

each vertex data item indicating all of the region boundary data items representing image region boundaries adjacent to the vertex location represented by the vertex data item;

each vertex data item having a machine representable value computed by applying a rounding operation to an infinite precision value of the vertex location to produce the machine representable value; modifying the vertex location of an image region boundary according to the rounding operation producing a rounded image region boundary to be represented by a region boundary data item;

the region data items, the region boundary data items and the vertex data items collectively representing the original image as a partition of a two-dimensional (2D) plane induced by the image region boundaries into one or more disjoint image regions tiling the 2D plane; the region data items, the region boundary data items and the vertex data items being arranged in the image structure map so as to represent the topology and the geometry of the image regions determined to be included in the original image; and an unrounded image region boundary data item indicated by each region boundary data item; each unrounded image region boundary data item representing the respective image region boundary in the original image;

the unrounded image region boundary data item being used in place of the rounded image region boundary to determine an unrounded vertex of an intersection location with a second unrounded image region boundary data item; the rounding operation modifying the unrounded vertex to produce the machine representable value of the intersection location according to one or more rounding rules that preserve topological and geometrical consistency between unrounded locations in the original image and rounded locations in the image structure map.

2. The image structure map data structure of claim 1 wherein an image region boundary in the original image is determined by a discontinuity in a value of a smoothly varying signal property in the original image such that a coherent area of the original image having a substantially similar value of a smoothly varying signal property indicates an image region in the original image to be represented in the image structure map by a region data item.

3. The image structure map data structure of claim 1 further including a spatial indexing data structure for locating an image structure included in the image structure map; the image structure representing an area of the original image determined to include a selected image location in the original image.

4. The image structure map data structure of claim 3 wherein the spatial indexing data structure is two or more partitions arranged in a hierarchy; a bottom-level partition including region data items, region boundary data items and vertex data items collectively representing a detailed partition of the original image; a top-level partition and intermediate level partitions representing successively less detailed partitions of the original image than the bottom-level partition; the partitions in the hierarchy being related to each other by image structures common to all partitions.

5. The image structure map data structure of claim 1 wherein the image structure map supports an insertion operation for inserting a new image region boundary into the image structure map; and wherein, when the new image region boundary intersects at new unrounded vertex locations with an unrounded image region boundary stored in the image structure map, the new unrounded vertex locations are represented in the image structure map as rounded vertex locations having machine representable values produced by applying the rounding operation to the new unrounded vertex locations.

6. The image structure map data structure of claim 1 wherein each region data item in the image structure map indicates at least one subregion, referred to as a cell, having a standardized geometric shape; all of the cells indicated by a region data item collectively representing the respective image region represented by the region data item; and wherein, when an image region is represented in the image structure map as a collection of cells, searching for an intersection location of a line segment with a side of an image region is performed in a fixed amount of time per cell searched for the intersection location, providing a predictable level of efficiency for performing a search operation.

7. The image structure map data structure of claim 6 wherein, when the set of image region boundaries of an image region forms an image region having an irregular, nonstandard geometric shape, the image region is represented in the image structure map as including one or more attachment boundary data items indicating attachment boundaries added to locations within the image region to divide the image region into cells; each region data item indicating the attachment boundary data items.

8. The image structure map data structure of claim 6 wherein the standardized geometric shape is a trapezoid; the partition of the original image being referred to as a trapezoidal decomposition.

9. The image structure map data structure of claim 1 wherein the signal property descriptor indicates a function of a color value indicated by image locations in the original image determined to be included in an image region in the original image; and wherein an image region boundary in the original image is determined by a discontinuity in color value such that each image region in the original image indicates a coherent area of the original image having a substantially similar color value.

10. The image structure map data structure of claim 9 wherein the color descriptor indicating the function of the color of the image locations in the original image indicates a constant function; the color descriptor indicating a single color value for the image region.

11. The image structure map data structure of claim 9 wherein the color descriptor indicating the function of the color of the image locations in the original image is a linear function; the color descriptor indicating that the color values vary linearly within the image region.

12. The image structure map data structure of claim 1 wherein the signal property descriptor indicates a function of a scene object distance value indicated by image locations in the original image determined to be included in an image region in the original image; and wherein an image region boundary in the original image is determined by a discontinuity in distance value such that each image region in the original image indicates a coherent area of the original image having a substantially similar scene object distance value.

13. The image structure map data structure of claim 1 wherein the signal property descriptor indicates terrain data defined as being a function of height values above a fixed plane indicated by image locations in the original image determined to be included in an image region in the original image; and wherein an image region boundary in the original image is determined by a discontinuity in height values such that each image region in the original image indicates a coherent area of the original image having a substantially similar height value.

14. The image structure map data structure of claim 1 wherein the original image definition data structure indicates a digital image representation of a continuous-tone color image.

15. A data structure stored on a storage medium capable of being accessed and read by a processor-controlled machine; the data structure, referred to as an image structure map, representing an original image definition data structure, hereafter referred to as an original image, including image regions each having a topology and a geometry with respect to neighboring image regions; each image region being formed by a set of intersecting image region boundaries determined to be included in the original image; the machine including storage medium access circuitry for accessing and reading the image structure map data structure stored in the storage medium; the machine further including a processor connected for accessing instruction data for operating the machine; the image structure map data structure comprising:

a plurality of region data items collectively representing the original image as a partition of a two-dimensional (2D) plane induced by the intersecting image region boundaries into one or more disjoint image regions tiling the 2D plane; and a signal property descriptor indicated by each respective region data item; the signal property descriptor having a value indicating a smoothly varying function of signals indicated by locations in the image region represented by the respective region data item;

the plurality of region data items explicitly representing the topology and the geometry of the image regions determined to be included in the original image such that each respective region data item indicates all adjacent image region boundaries forming the image region represented by the respective region data item, and each respective one of a plurality of vertex data items indicates all of the image region boundaries adjacent to a vertex location represented by the vertex data item; a vertex location referring to an endpoint location of a respective one of the image region boundaries or an intersection location between two image region boundaries;

each region data item further indicating a plurality of subregions, each referred to as a cell and each having a standardized geometric shape; all of the cells indicated by a region data item collectively representing the respective image region represented by the region data item; the region data item representing the image region as being divided into cells when the set of intersecting image region boundaries determined to form the image region produces an image region having an irregular, nonstandard geometric shape;

representing image regions in the image structure map as a collection of cells providing a predictable level of efficiency for performing a search operation such that searching for an intersection location of a line segment with a side of an image region is performed in a fixed amount of time per cell searched for the intersection location.

16. The image structure map data structure of claim 15 wherein the standardized geometric shape is a trapezoid; the partition of the original image being referred to as a trapezoidal decomposition.

17. The image structure map data structure of claim 15 wherein each vertex data item has a machine representable value computed by applying a rounding operation to an infinite precision value of the vertex location of the respective image region boundary to produce the machine representable value; modifying the vertex location of an image region boundary according to the rounding operation producing a rounded image region boundary represented by a region boundary data item in the image structure map; and wherein the image structure map further includes an unrounded image region boundary data item indicated by each region boundary data item; each unrounded image region boundary data item representing the respective image region boundary in the original image;

the image region boundary represented by the unrounded image region boundary data item being used in place of the rounded image region boundary to determine an unrounded vertex of an intersection location with a second unrounded image region boundary data item; the rounding operation modifying the unrounded vertex to produce the machine representable value of the intersection location according to one or more rounding rules that preserve topological and geometrical consistency between unrounded locations in the original image and rounded locations in the image structure map.

18. The image structure map data structure of claim 15 wherein an image region boundary in the original image is determined by a discontinuity in a value of a smoothly varying signal property in the original image such that a coherent area of the original image having a substantially similar value of a smoothly varying signal property indicates an image region in the original image to be represented in the image structure map by a region data item.

19. The image structure map data structure of claim 15 wherein the signal property descriptor is a color descriptor indicating a function of a color value indicated by image locations determined to be included in an image region in the original image; and wherein an image region boundary in the original image is determined by a discontinuity in color value such that each image region in the original image indicates a coherent area of the original image having a substantially similar color.

20. A data structure stored on a storage medium capable of being accessed and read by a processor-controlled machine; the data structure, referred to as an image structure map, spatially indexing a plurality of image structures determined to be included in an original image definition data structure, hereafter referred to as an original image; the original image including image regions each having a topology and a geometry with respect to neighboring image regions; each image region being formed by a set of intersecting image region boundaries determined to be included in the original image; the machine including storage medium access circuitry for accessing and reading the image structure map data structure stored in the storage medium; the machine further including a processor connected for accessing instruction data for operating the machine; the image structure map data structure comprising:

a plurality of data items collectively representing the original image as a partition of a two-dimensional (2D) plane induced by the intersecting image region boundaries into one or more disjoint image regions tiling the 2D plane; the plurality of data items being referred to as a partition data structure and being arranged so as to represent the topology and the geometry of the image regions determined to be included in the original image;

the plurality of data items including region data items, each of which represents an image region determined to be included in the original image; an image region in the original image being determined by a discontinuity in a value of a smoothly varying signal property in the original image such that the image region is perceptually identifiable to a human viewer of the original image as a coherent area of the original image;

each region data item indicating a signal property descriptor having a value indicating a smoothly varying function of signals indicated by locations in the respective image region of the original image; and a spatial indexing data structure for locating an image structure in the image structure map the image structure representing an area of the original image determined to include a selected image location therein; the spatial indexing data structure including image structures organized in a manner as to support locating an image structure by performing a small number of bounded local searches of image structures to locate the image structure in the image structure map containing the selected image location therein.

21. The image structure map data structure of claim 20 wherein the spatial indexing data structure is two or more partition data structures arranged in a hierarchy; a bottom-level partition data structure representing a detailed partition of the original image; a top-level partition data structure and intermediate level partition data structures representing less detailed partitions of the original image than the bottom-level partition data structure; the partitions in the hierarchy being related to each other by image structures common to all partitions.

22. The image structure map data structure of claim 20 wherein the plurality of data items collectively representing the original image as a partition of a two-dimensional (2D) plane and included in the partition data structure includes a plurality of vertex data items each indicating a vertex location, wherein a vertex location refers to an endpoint location of a respective one of the image region boundaries or an intersection location between two image region boundaries; each vertex data item indicating all of the image region boundaries adjacent to the vertex location represented by the vertex data item; and where in each vertex data item has a machine representable value computed by applying a rounding operation to an infinite precision value of the vertex location of the respective image region boundary; the rounding operation modifying the infinite precision value to produce the machine representable value; modifying the vertex location of an image region boundary according to the rounding operation producing a rounded image region boundary represented by a region boundary data item in the image structure map.

23. The image structure map data structure of claim 20 wherein each region data item in the partition data structure of the image structure map indicates a plurality of subregions, each referred to as a cell and each having a standardized geometric shape; all of the cells indicated by a region data item collectively representing the respective image region represented by the region data item; and wherein, when an image region is represented in the image structure map as a collection of cells, searching for an intersection location of a line segment with a side of an image region is performed in a fixed amount of time per cell searched for the intersection location, providing a predictable level of efficiency for performing a search operation.

24. The image structure map data structure of claim 22 wherein the standardized geometric shape is a trapezoid; the partition of the original image being referred to as a trapezoidal decomposition.

25. The image structure map data structure of claim 23 wherein the image structure map further includes an unrounded image region boundary data item indicated by each region boundary data item; each unrounded image region boundary data item representing the respective image region boundary in the original image; the image region boundary represented by the unrounded image region boundary data item being used in place of the rounded image region boundary to determine an unrounded vertex of an intersection location with a second unrounded image region boundary data item; the rounding operation modifying the unrounded vertex to produce the machine representable value of the intersection location according to a set of one or more rounding rules that preserve topological and geometrical consistency between unrounded locations in the original image and rounded locations in the image structure map.

26. A data structure stored on a storage medium capable of being accessed and read by a processor-controlled machine; the data structure, referred to as an image structure map, representing an original image definition data structure, hereafter referred to as an original image; the machine including storage medium access circuitry for accessing and reading the image structure map data structure stored in the storage medium; the machine further including a processor connected for accessing instruction data for operating the machine; the image structure map data structure comprising:

a plurality of region data structures; each region data structure representing a respective one of a plurality of image regions in the original image; each image region formed by a set of image region boundaries determined to be included in the original image; each region data structure in the image structure map indicating at least one subregion, referred to as a cell, having a standardized geometric shape; all of the cells indicated by a region data structure collectively representing the respective image region represented by the region data structure;

a signal property descriptor indicated by each region data structure; the signal property descriptor having a value indicating a smoothly varying function of signals indicated by locations in the respective image region of the original image;

one or more attachment boundary data items representing attachment boundaries added to locations within the image region to divide the image region into cells when the set of image region boundaries determined to form an image region has an irregular, nonstandard geometric shape;

a plurality of fragment data structures each representing a portion of an image region boundary, referred to as a boundary fragment, between two vertex locations determined to be included in the original image; a vertex location referring to an endpoint location of a respective one of the image region boundaries or an intersection location between two image region boundaries determined to be included in the original image; each fragment data structure indicating attachment boundary data items representing the attachment boundaries having starting or ending locations on the boundary fragment represented by the fragment data structure; each fragment data structure forming one side of a cell and further indicating at least one additional fragment data structure forming a second side of a cell; the fragment data structure together with the attachment boundary data items and the at least one additional fragment data structure completely representing a cell;

a plurality of vertex data structures each indicating a vertex location; each vertex data structure indicating all of the fragment data structures representing boundary fragments adjacent to the vertex location represented by the vertex data structure;

each vertex data structure having a machine representable value computed by applying a rounding operation to an infinite precision value for the vertex location of a respective image region boundary; the rounding operation modifying the infinite precision value to produce the machine representable value; modifying the vertex location of an image region boundary according to the rounding operation producing a rounded boundary fragment represented by a fragment data structure;

the region data structures, the fragment data structures and the vertex data structures collectively representing the original image as a partition of a two-dimensional (2D) plane induced by the image region boundaries into one or more disjoint image regions tiling the 2D plane; the region data structures, the fragment data structures and the vertex data structures being arranged in the image structure map so as to represent the topology and the geometry of the image regions determined to be included in the original image; and an unrounded image region boundary data item indicated by each fragment data structure; each unrounded image region boundary data item representing one or more boundary fragments in the original image;

the unrounded image region boundary data item being used in place of the rounded boundary fragment to determine an unrounded vertex of an intersection location with a second unrounded image region boundary; the rounding operation modifying the unrounded vertex to produce the machine representable value of the intersection location according to a set of one or more rounding rules that preserve topological and geometrical consistency between unrounded image region boundaries in the original image and rounded boundary fragments in the image structure map; the rounding operation causing an image region boundary to be divided into boundary fragments at the machine representable value of the intersection location, each boundary fragment being represented in the image structure by a fragment data structure.

27. The image structure map data structure of claim 26 wherein the image structure map supports an insertion operation for inserting a new image region boundary into the image structure map;

wherein, when the new image region boundary intersects at a new unrounded vertex location with an unrounded image region boundary stored in the image structure map, the new unrounded vertex location is represented in the image structure map as a rounded vertex location having machine representable values produced by applying the rounding operation to the new unrounded vertex location; and wherein the rounding operation divides the unrounded image region boundary into two boundary fragments at the rounded vertex location such that the fragment data structure representing the portion of the unrounded image region boundary prior to the insertion operation is modified to produce a fragment data structure for each of the two boundary fragments produced by applying the rounding operation.

28. The image structure map data structure of claim 26 wherein the standardized geometric shape is a trapezoid; and wherein the attachment boundary data items are vertically positioned sides of a cell; the partition of the original image being referred to as a vertical cell decomposition.

29. The image structure map data structure of claim 26 wherein the original image definition data structure indicates a digital image representation of a continuous-tone color image.

30. The image structure map data structure of claim 26 wherein each fragment data structure representing a boundary fragment between two vertex locations further indicates floor and ceiling region data items, each indicating the region data structure of the image region located respectively above and below the boundary fragment in the original image represented by the fragment data structure; each fragment data structure being able to be used to traverse a 2D spatial area of image regions represented in the image structure map to locate an image structure included therein.

31. The image structure map data structure of claim 26 wherein each fragment data structure representing a portion of an image region boundary between two vertex locations further indicates a first data structure, referred to as a ceiling data structure, including ceiling attachment boundary data items each indicating an ending location of an attachment boundary meeting at the respective boundary fragment represented by the fragment data structure; each ceiling attachment boundary data item indicating a vertex data structure representing a starting location of the attachment boundary; and a second data structure, referred to as a floor data structure, including floor attachment boundary data items each indicating an ending location of an attachment boundary meeting at the respective boundary fragment represented by the fragment data structure; each floor attachment boundary data item indicating a vertex data structure representing a starting location of the attachment boundary;

the ceiling and floor attachment boundary data items providing the ability to traverse a 2D spatial area represented by the image structure map in order to locate a vertex of a boundary fragment of an image region positioned respectively above or below the boundary fragment represented by the respective fragment data structure.

32. The image structure map data structure of claim 26 further including a spatial indexing data structure for locating an image structure included in the image structure map representing an area of the original image determined to include a selected image location in the original image.

33. The image structure map data structure of claim 32 wherein the spatial indexing data structure is two or more partitions arranged in a hierarchy; a bottom-level partition including region data structures, fragment data structures and vertex data structures representing a detailed partition of the original image; a top-level and intermediate level partitions including fragment data structures and vertex data structures representing successively less detailed partitions of the original image than the bottom-level partition; the partitions in the hierarchy being related to each other by common image structures included in each level.

* * * * *